(12) United States Patent
Gallant et al.

(10) Patent No.: US 12,294,076 B2
(45) Date of Patent: May 6, 2025

(54) ELECTROCHEMICAL FORMATION OF SUBSTRATE COATINGS

(71) Applicant: Massachusetts Institute of Technology, Cambridge, MA (US)

(72) Inventors: Betar Gallant, Cambridge, MA (US); Haining Gao, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 18/457,214

(22) Filed: Aug. 28, 2023

(65) Prior Publication Data
US 2023/0402581 A1    Dec. 14, 2023

Related U.S. Application Data

(63) Continuation of application No. 16/909,630, filed on Jun. 23, 2020, now Pat. No. 11,791,454.

(60) Provisional application No. 62/891,192, filed on Aug. 23, 2019.

(51) Int. Cl.
| | |
|---|---|
| *H01M 4/1397* | (2010.01) |
| *H01M 4/02* | (2006.01) |
| *H01M 4/04* | (2006.01) |
| *H01M 4/136* | (2010.01) |
| *H01M 4/38* | (2006.01) |
| *H01M 4/50* | (2010.01) |
| *H01M 8/0245* | (2016.01) |

(52) U.S. Cl.
CPC ....... *H01M 4/1397* (2013.01); *H01M 4/0402* (2013.01); *H01M 4/045* (2013.01); *H01M 4/136* (2013.01); *H01M 4/388* (2013.01); *H01M 4/50* (2013.01); *H01M 8/0245* (2013.01); *H01M 2004/028* (2013.01); *H01M 2300/0034* (2013.01)

(58) Field of Classification Search
None
See application file for complete search history.

(56) References Cited

U.S. PATENT DOCUMENTS

| | | | |
|---|---|---|---|
| 3,325,318 | A | 6/1967 | Pauliukonis |
| 3,345,277 | A | 10/1967 | Ashley et al. |
| 3,459,596 | A | 8/1969 | Lord et al. |
| 3,573,987 | A | 4/1971 | Knight |
| 4,959,566 | A | 9/1990 | Dobran |
| 5,607,784 | A * | 3/1997 | Jalan ............ H01M 8/22 429/103 |
| 6,416,726 | B2 | 7/2002 | Izumikawa et al. |
| 8,535,834 | B1 | 9/2013 | Yoon |
| 11,453,948 | B2 | 9/2022 | Gallant et al. |
| 11,522,241 | B2 | 12/2022 | Gallant et al. |
| 11,735,739 | B2 | 8/2023 | Gallant et al. |
| 11,791,454 | B2 | 10/2023 | Gallant et al. |
| 12,009,499 | B2 | 6/2024 | Gallant et al. |
| 2009/0061079 | A1* | 3/2009 | Konishiike ....... C23C 14/562 427/78 |
| 2009/0280410 | A1 | 11/2009 | Zaguib et al. |
| 2013/0327648 | A1 | 12/2013 | Grant et al. |
| 2016/0336623 | A1 | 11/2016 | Nayar et al. |
| 2016/0351886 | A1 | 12/2016 | Braun et al. |
| 2017/0288281 | A1 | 10/2017 | Chiang et al. |
| 2019/0348672 | A1 | 11/2019 | Wang et al. |
| 2020/0071835 | A1 | 3/2020 | Gallant et al. |
| 2021/0028522 | A1 | 1/2021 | Gallant et al. |
| 2021/0057723 | A1 | 2/2021 | Gallant et al. |
| 2022/0367884 | A1* | 11/2022 | Gallant ............ H01M 4/381 |
| 2022/0367885 | A1* | 11/2022 | Gallant ............ H01M 6/168 |

FOREIGN PATENT DOCUMENTS

| | | | |
|---|---|---|---|
| CA | 2865636 | A1 | 5/2015 |
| CN | 107749492 | A1 | 3/2018 |
| GB | 2101394 | B | 1/1983 |
| WO | WO 2016/094551 | A1 | 6/2016 |
| WO | WO-2018067533 | A1 * | 4/2018 ............ H01M 12/04 |

OTHER PUBLICATIONS

He, M., Li, Y., Guo, R., Gallant, B.M.—Electrochemical Conversion of Nitrogen Trifluoride as a Gas-to-Solid Cathode in Li Batteries, J. Phys. Chem. Lett. 2018, 9, pp. 4700-4706, published on Jul. 27, 2018 (Year: 2018).*
International Search Report and Written Opinion mailed Dec. 9, 2020, for Application No. PCT/US2020/039155.
International Preliminary Report on Patentability mailed Mar. 3, 2022, for Application No. PCT/US2020/039155.
Andersson et al., Electrochemically lithiated graphite characterised by photoelectron spectroscopy. J Power Sources. 2003;119, 522-527. doi:10.1016/S0378-7753(03)00277-5.
Andrieux et al., Outer-sphere dissociative electron transfer to organic molecules: a source of radicals or carbanions? Direct and indirect electrochemistry of perfluoroalkyle bromides and iodides. J. Am. Chem. Soc. 1990; 112: 3509-20.
Aurbach et al., Identification of Surface-Films Formed on Lithium in Propylene Carbonate Solutions. J Electrochem Soc 134, 1611-1620, doi:Doi 10.1149/1.2100722 (1987).
Aurbach et al., Recent Studies of the Lithium Liquid Electrolyte Interface—Electrochemical, Morphological and Spectral Studies of a Few Important Systems. J Power Sources. 1995;54, 76-84, doi:Doi 10.1016/0378-7753(94)02044-4.
Aurbach et al., Recent studies on the correlation between surface chemistry, morphology, three-dimensional structures and performance of Li and Li—C intercalation anodes in several important electrolyte systems. J Power Sources. 1997;68, 91-98, doi:Doi 10.1016/S0378-7753(97)02575-5.
Aurbach et al., The Study of Electrolyte-Solutions Based on Ethylene and Diethyl Carbonates for Rechargeable Li Batteries .1. Li Metal Anodes. J Electrochem Soc 142, 2873-2882, doi:Doi 10.1149/1.2048658 (1995).

(Continued)

*Primary Examiner* — Anca Eoff
(74) *Attorney, Agent, or Firm* — Wolf, Greenfield & Sacks, P.C.

(57) ABSTRACT

Systems, articles, and methods generally related to the electrochemical formation of layers comprising halogen ions on substrates are described.

25 Claims, 27 Drawing Sheets

(56) References Cited

OTHER PUBLICATIONS

Aurbach et al., The Surface-Chemistry of Lithium Electrodes in Alkyl Carbonate Solutions. J Electrochem Soc 141, L1-L3, doi:Doi 10.1149/1.2054718 (1994).
Bates et al., Fabrication and Characterization of Amorphous Lithium Electrolyte Thin-Films and Rechargeable Thin-Film Batteries. J Power Sources 43, 103-110, doi:Doi 10.1016/0378-7753(93)80106-Y (1993).
Burke et al., Electrochemical reduction of sulfur hexafluoride in novel, air-independent power systems. ECS Trans. 2011; 35(33): 3-10.
Cheng et al., A Review of Solid Electrolyte Interphases on Lithium Metal Anode. Adv Sci 3, doi:UNSP 1500213 10.1002/advs. 201500213 (2016).
Choudhury et al., A highly reversible room-temperature lithium metal battery based on crosslinked hairy nanoparticles. Nat Commun 6, doi:ARTN 10101 10.1038/ncomms10101 (2015).
Choudhury et al., Lithium Fluoride Additives for Stable Cycling of Lithium Batteries at High Current Densities. Adv Electron Mater 2, doi:ARTN 150024610.1002/aelm.201500246 (2016).
Fong et al., Studies of Lithium Intercalation into Carbons Using Nonaqueous Electrochemical-Cells. J Electrochem Soc 137, 2009-2013, doi:Doi 10.1149/1.2086855 (1990).
Gao et al., Controlling fluoride-forming reactions for improved rate capability in lithium-perfluorinated gas conversion batteries. Adv Energ Mater. 2019; 9: 1900393.
Gauthier et al., Electrode-Electrolyte Interface in Li-Ion Batteries: Current Understanding and New Insights. J Phys Chem Lett 6, 4653-4672, doi:10.1021/acs.jpclett.5b01727 (2015).
Harry et al., Detection of subsurface structures underneath dendrites formed on cycled lithium metal electrodes. Nat Mater 13, 69-73, doi:10.1038/Nmat3793 (2014).
He et al., Electrochemical conversion of nitrogen trifluoride as a gas-to-solid cathode in Li batteries. J. Phys. Chem. Letts. Jul. 27, 2018; 9(16): 4700-6.
Jung et al. Lithium-free transition metal monoxides for positive electrodes in lithium-ion batteries. Nat Energy. 2017;2:16208.
Jung et al., Chemical origins of electrochemical overpotential in surface-conversion nanocomposite cathodes. Adv Energ Mater. 2019; 9: 1900503.
Jung et al., New iron-based intercalation host for lithium-ion batteries. Chem. Mater. 2018; 30: 1956-64.
Kanamura et al., Morphology and Chemical-Compositions of Surface-Films of Lithium Deposited on a Ni Substrate in Nonaqueous Electrolytes. J Electroanal Chem 394, 49-62, doi:Doi 10.1016/0022-0728(95)03972-J (1995).
Kanamura et al., Xps Analysis for the Lithium Surface Immersed in Gamma-Butyrolactone Containing Various Salts. Electrochim Acta 40, 913-921, doi:Doi 10.1016/0013-4686(93)E0020-M (1995).
Kanamura et al., Xps Analysis for the Lithium Surface Immersed in Tetrahydrofuran Containing Various Salts. Denki Kagaku 61, 1377-1382 (1993).
Kanamura et al., Xps Analysis of a Lithium Surface Immersed in Propylene Carbonate Solution Containing Various Salts. J Electroanal Chem 333, 127-142, doi:Doi 10.1016/0022-0728(92)80386-I (1992).
Kanamura et al., Xps Analysis of Lithium Surfaces Following Immersion in Various Solvents Containing Libf4. J Electrochem Soc 142, 340-347, doi:Doi 10.1149/1.2044000 (1995).
Kanno et al., Lithium ionic conductor thio-LISICON—The Li2S—GeS2—P2S5 system. J Electrochem Soc 148, A742-A746, doi:10.1149/1.1379028 (2001).
Khurana et al., Suppression of Lithium Dendrite Growth Using Cross-Linked Polyethylene/Poly(ethylene oxide) Electrolytes: A New Approach for Practical Lithium-Metal Polymer Batteries. J Am Chem Soc 136, 7395-7402, doi:10.1021/ja502133j (2014).
Li et al., Lithium-free transition metal monoxides for positive electrodes in lithium-ion batteries. Nat Energy. 2017; 2: 16208.
Li et al., Revealing Nanoscale Passivation and Corrosion Mechanisms of Reactive Battery Materials in Gas Environments. Nano Lett 17, 5171-5178, doi:10.1021/acs.nanolett.7b02630 (2017).
Lin et al., Conformal Lithium Fluoride Protection Layer on Three-Dimensional Lithium by Nonhazardous Gaseous Reagent Freon. Nano Lett. Jun. 14, 2017;17(6):3731-3737. doi:10.1021/acs.nanolett. 7b01020. Epub May 25, 2017. PMID: 28535068.
Lin et al., Reviving the lithium metal anode for high-energy batteries. Nat Nanotechnol 12, 194-206, doi:10.1038/Nnano.2017. 16 (2017).
Lu et al., Stable lithium electrodeposition in liquid and nanoporous solid electrolytes. Nat Mater 13, 961-969, doi:10.1038/Nmat4041 (2014).
Markevich et al., Very Stable Lithium Metal Stripping-Plating at a High Rate and High Areal Capacity in Fluoroethylene Carbonate-Based Organic Electrolyte Solution. Acs Energy Lett 2, 1321-1326, doi:10.1021/acsenergylett.7b00300 (2017).
Momma et al., Effect of the atmosphere on chemical composition and electrochemical properties of solid electrolyte interface on electrodeposited Li metal. J Power Sources 196, 6483-6487, doi:10. 1016/j.jpowsour.2011.03.095 (2011).
Monroe et al., The impact of elastic deformation on deposition kinetics at lithium/polymer interfaces. J Electrochem Soc 152, A396-A404, doi:10.1149/1.1850854 (2005).
Nazri et al., Composition of Surface-Layers on Li Electrodes in Pc, Liclo4 of Very Low Water-Content. J Electrochem Soc 132, 2050-2054, doi:Doi 10.1149/1.2114288 (1985).
Peled et al., Advanced model for solid electrolyte interphase electrodes in liquid and polymer electrolytes. J Electrochem Soc 144, L208-L210, doi:Doi 10.1149/1.1837858 (1997).
Peled et al., The role of SEI in lithium and lithium ion batteries. Mater Res Soc Symp p. 393, 209-221 (1995).
Peled, The Electrochemical-Behavior of Alkali and Alkaline-Earth Metals in Non-Aqueous Battery Systems—the Solid Electrolyte Interphase Model. J Electrochem Soc 126, 2047-2051, doi:Doi 10.1149/1.2128859 (1979).
Qian et al. High rate and stable cycling of lithium metal anode. Nat Commun 6, doi:ARTN636210.1038/ncomms7362 (2015).
Tikekar et al., Design principles for electrolytes and interfaces for stable lithium-metal batteries. Nat Energy 1, 1-7, doi:Artn 16114 10.1038/Nenergy.2016.114 (2016).
Tomita et al., Synthesis and charge-discharge properties of LiF—NiO composite as a cathode material for Li-ion batteries. J. Power Sources. 2016; 329: 406-11.
Wu et al., Electrochemical behaviors of a Li3N modified Li metal electrode in secondary lithium batteries. J Power Sources 196, 8091-8097, doi:10.1016/j.jpowsour.2011.05.035 (2011).
Yan et al. Ultrathin Two-Dimensional Atomic Crystals as Stable Interfacial Layer for Improvement of Lithium Metal Anode. Nano Lett 14, 6016-6022, doi:10.1021/nl503125u (2014).
Zhang et al., Origin of the High Capacity Manganese-Based Oxyfluoride Electrodes for Rechargeable Batteries. Chem Materials 2018 30 (15), 5362-5372. DOI:10.1021/acs.chemmater.8b02182.
Zhang et al., Triggering the In Situ Electrochemical Formation of High Capacity Cathode Material from MnO. Adv. Sci. News. 2017; 7: 162200.
Zheng et al. Interconnected hollow carbon nanospheres for stable lithium metal anodes. Nat Nanotechnol. 2014;9, 618-623, doi:10. 1038/Nnano.2014.152.

* cited by examiner

ELECTROCHEMICAL FORMATION OF SUBSTRATE COATINGS

RELATED APPLICATIONS

This application is a continuation of U.S. patent application Ser. No. 16/909,630, filed Jun. 23, 2020, and entitled "ELECTROCHEMICAL FORMATION OF SUBSTRATE COATINGS," which claims priority under 35 U.S.C. § 119(e) to U.S. Provisional Patent Application No. 62/891,192, filed Aug. 23, 2019, and entitled "ELECTROCHEMICAL FORMATION OF SUBSTRATE COATINGS," the disclosure of each of which is incorporated herein by reference in its entirety.

GOVERNMENT SPONSORSHIP

This invention was made with Government support under FA8702-15-D-0001 awarded by the U.S. Air Force. The Government has certain rights in the invention.

TECHNICAL FIELD

Systems, articles, and methods generally related to the electrochemical formation of layers comprising halogen ions on substrates are described.

BACKGROUND

Substrate layers comprising halogen ions, such as lithium fluoride (LiF) coatings, have a wide range of applications in devices with various functions, such as electrode materials in lithium and lithium-ion (Li-ion) batteries, cathodes of solar cells, and broadband optical devices. In particular, when applied to electrodes in Li- and/or Li-ion batteries, LiF coatings have been shown to effectively improve the capacity and cyclability of the cathodes, as well as increase the stability of anode materials. However, conventional fluorination methods, including high energy ball-milling and/or reacting substrates with fluorine-containing reactants (e.g., $NH_4HF_2$ and $F_2$), are limited due to the impractically high energy requirements and/or the toxicity of the reactants. Accordingly, improved systems, articles, and methods related to halogenated coatings on substrates are desirable.

SUMMARY

Systems, articles, and methods generally related to the electrochemical formation of layers comprising halogen ions on substrates are described. The subject matter of the present invention involves, in some cases, interrelated products, alternative solutions to a particular problem, and/or a plurality of different uses of one or more systems and/or articles.

According to certain embodiments, a method of forming a halogenation layer on a substrate of an electrochemical cell is described, the method comprising reacting an oxidized alkali metal ion with a reduced halogenated compound to form a halogenation layer on at least a portion of the substrate.

In some embodiments, a method of forming a halogenation layer on a substrate of an electrochemical cell comprising a halogenated compound is described, the method comprising reducing at least a portion of the halogenated compound, thereby providing a reduced halogenated compound, and reacting an oxidized alkali metal ion with the reduced halogenated compound to form a halogenation layer on at least a portion of the substrate.

In certain embodiments, a method of forming a halogenation layer on a substrate of an electrochemical cell comprising an alkali metal and a halogenated compound is described, the method comprising oxidizing at least a portion of the alkali metal, thereby providing an oxidized alkali metal ion, reducing at least a portion of the halogenated compound, thereby providing a reduced halogenated compound, and reacting the oxidized alkali metal ion with the reduced halogenated compound to form a halogenation layer on at least a portion of the substrate.

According to some embodiments, a method of forming a halogenation layer on a substrate of an electrochemical cell is described, the method comprising discharging an electrochemical cell, wherein the electrochemical cell comprises an alkali metal and a halogenated compound, oxidizing at least a portion of the alkali metal, thereby providing an oxidized alkali metal ion, reducing at least a portion of the halogenated compound, thereby providing a reduced halogenated compound, and reacting the oxidized alkali metal ion with the reduced halogenated compound to form a halogenation layer on at least a portion of the substrate.

In certain embodiments, a method of incorporating a halogen ion on and/or in a substrate of an electrochemical cell is described, the method comprising reacting an oxidized alkali metal ion with a reduced halogenated compound to form a halogenation layer on at least a portion of the substrate, and electrochemically splitting at least a portion of the halogenation layer, thereby providing an alkali metal ion and a halogen ion, wherein the halogen ion is incorporated on and/or in the substrate.

According to some embodiments, a method of incorporating a halogen ion on and/or in a substrate of an electrochemical cell is described, the method comprising discharging an electrochemical cell, wherein the electrochemical cell comprises an alkali metal and a halogenated compound, oxidizing at least a portion of the alkali metal, thereby providing an oxidized alkali metal ion, reducing at least a portion of the halogenated compound, thereby providing a reduced halogenated compound, reacting the oxidized alkali metal ion with the reduced halogenated compound to form a halogenation layer on at least a portion of the substrate, charging the electrochemical cell, and electrochemically splitting at least a portion of the halogenation layer, thereby providing an alkali metal ion and a halogen ion, wherein the halogen ion is incorporated on and/or in the substrate.

In certain embodiments, a sealed electrochemical cell is described, wherein the sealed electrochemical cell comprises a cathode comprising a halogenation layer, an anode comprising an alkali metal, and a halogenated compound, wherein the halogenation layer comprises a reaction product between the alkali metal that has been oxidized and the halogenated compound that has been reduced.

According to some embodiments, a sealed electrochemical cell is described, wherein the sealed electrochemical cell comprises a cathode comprising a halogenation layer and/or a plurality of halogen ions incorporated on and/or in the cathode, an anode comprising an alkali metal, and a halogenated compound, wherein the halogenation layer comprises a reaction product between the alkali metal that has been oxidized and the halogenated compound that has been reduced.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
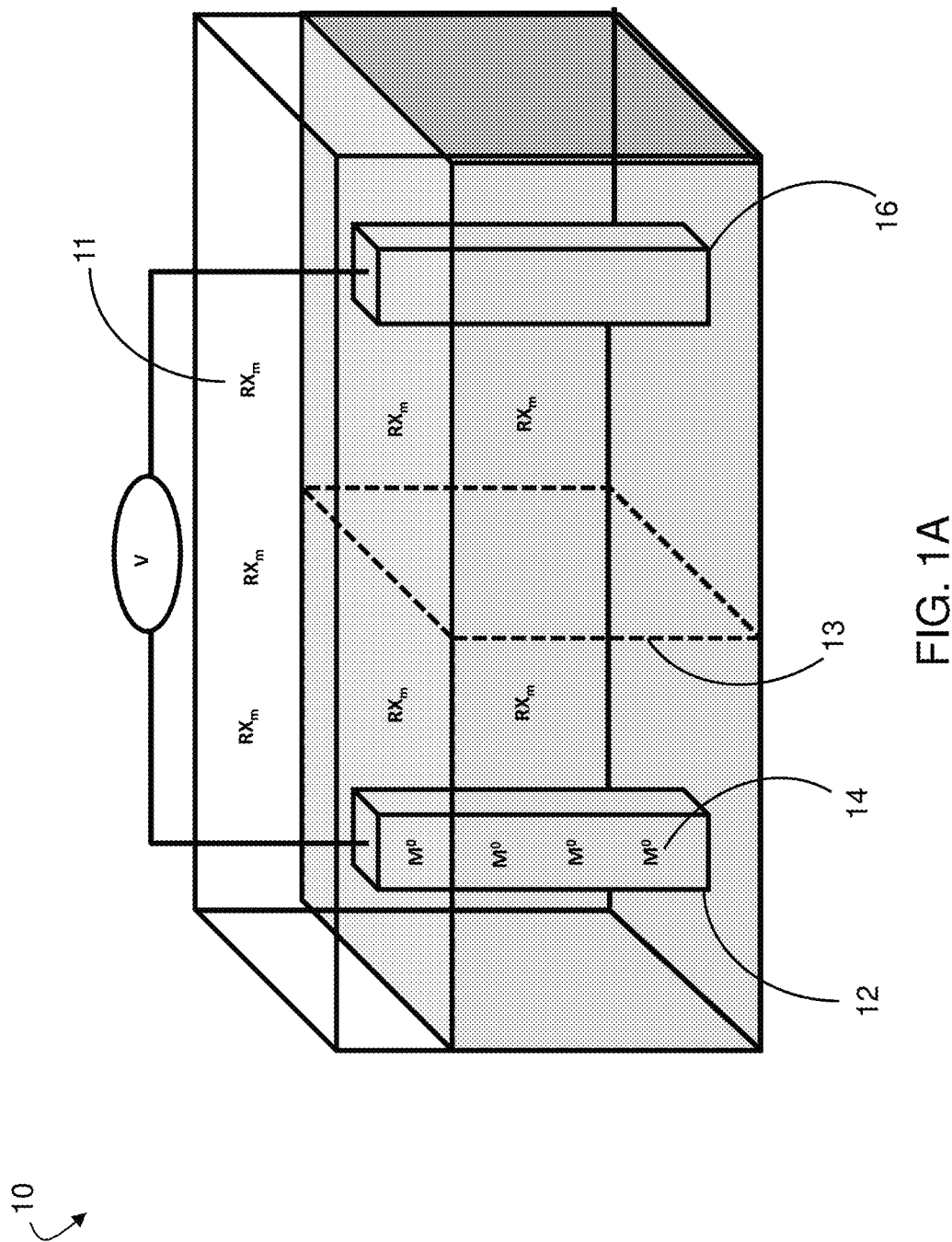
FIG. 1A shows, according to some embodiments, a schematic diagram of an electrochemical cell comprising an alkali metal and a halogenated compound.

Described herein are systems, articles, and methods related to layers containing halogen ions. The Inventors have realized that there is an opportunity for innovation in the field of electrochemical power systems (e.g. Li-ion batteries). Conventional electrodes utilized in Li-ion batteries, such as, for example, lithium cobalt oxide ($LiCoO_2$), have poor thermal stability. In addition, lithium nickel-manganese-cobalt oxide (NCM) and lithium nickel-cobalt aluminum oxide (NCA) provide enhanced capacities, but suffer from poor cyclability. The Inventors have therefore appreciated that there is an unmet need for electrodes with both high energy density and increased stability.

In some embodiments, a novel electrochemical route for the formation of coatings comprising halogen ions on substrates is generally described. The coating comprising halogen ions (e.g., a chemical compound comprising halogen ions) is described herein as a halogenation layer. The halogenation layer is formed by discharging an electrochemical cell comprising an alkali metal (e.g., a Li anode) and a halogenated compound (e.g., non-toxic gaseous $SF_6$ or $NF_3$, liquid $C_6F_{13}$). As a result of the electrochemical discharge, the alkali metal is oxidized and the halogenated compound is reduced. In certain embodiments, the resulting halogenation layer comprises the product of the reaction between the oxidized alkali metal ion and the reduced halogenated compound, such as an alkali metal salt (e.g., LiF). The halogenation layer may be formed on a substrate (e.g., a cathode) of the electrochemical cell, which may comprise carbon, metal oxides, metal sulfides, and/or metal fluorides. Advantageously, the components of the electrochemical cell may be chosen such that the discharge potential of the cell at which the halogenation layer is formed is within the stability window of the electrolyte, thus providing the formation of a substantially clean halogenation layer without contaminants, such as, for example, electrolyte reduction products.

By tuning the discharge conditions (e.g., discharge capacity, current density, temperature), the morphology of the halogenation layer can be precisely controlled, which is advantageous for controlling the crystallinity, thickness, and/or structure of the halogenation layer. As a result of finely-tuning the morphology, the halogenation layer may be conformal, nano-scale, and in intimate contact with the substrate, making the resulting substrates suitable for applications in battery materials (e.g., Li-ion batteries) and other devices.

Furthermore, halogen ions may be incorporated on and/or in the substrate upon charging the electrochemical cell once the halogenation layer is formed on the substrate. For example, the alkali metal salt (e.g., LiF) in the halogenation layer may electrochemically split as a result of charging the electrochemical cell, therefore providing an alkali metal ion (Li$^+$) and a halogen ion (e.g., F$^-$). The alkali metal ion may be reduced back to an alkali metal at the anode, while the halogen ion is incorporated in the lattice of the substrate. The halogenation layer therefore acts as a reservoir of halogen ions to be incorporated on and/or in substrate of the electrochemical cell as the cell is cycled (e.g., charged and discharged). The substrate comprising the halogenation layer and/or the halogen ions may be used as a cathode in electrochemical cells, such as a primary or a secondary battery (e.g., Li and Li-ion cells), to provide lower charging potentials, increased capacities, and increased cyclabilites.

Halogen (e.g., fluorine) modification is a promising treatment for electrode materials of Li and Li-ion batteries due to the potential to increase discharge voltage, improve stability, and enhance capacity. Conventional halogenation (e.g., fluorination) of substrates (e.g., electrode materials) has mainly been achieved using treatment with fluorinated reactants in solution or the gaseous phase. Neither solution route nor gaseous route reactions, however, are favored in practical use due to the toxic reactants needed and/or the impractically high energy requirements. Solution reactions, for example, tend to use highly toxic and corrosive fluorine-containing reactants, such as $NH_4HF_2$ and/or $NH_4F$, followed by calcination at elevated temperatures (e.g., 400° C. or higher). In addition, fluorination using highly toxic $F_2$ gas needs to be carried out under a well-controlled atmosphere, for example by using a fluidized bed fluorination reactor. Other conventional fluorination methods utilize solid state reactions between substrates and fluorinated reactants. Such solid state reactions, which tend to be favored industrially due to their lower toxicity, are typically conducted by ball-milling and sintering. A long ball-mill time (e.g., ~2 days) results in fine particles but comes at the expense of higher energies. Directly heating alkali metal fluorides with other precursors to higher than 600° C. for extended lengths of time (e.g., ~10 hours) is also an alternative fluorination route. Even though they may be implemented industrially, these solid-state fluorination reactions are not ideal for practical application because of their unfavorable reaction conditions and high energy requirements. Furthermore, such aggressive processes afford poor control over the fluorination mechanism and the resulting material structure.

Alternatively, the methods described herein achieve fluorination using the reduction (e.g., electrochemical reduction) of non-toxic fluorinated gases (e.g., $SF_6$ and $NF_3$) or fluorinated liquids (e.g., $C_6F_{13}I$, $C_4F_9I$, and $C_3F_7I$). This approach opens up new opportunities for fluorination of electrode materials that may address some of the critical limitations of current methods, namely, high energy, poor morphology control, and/or aggressive reaction conditions and mechanisms. The electrochemical reduction of halogen-containing compounds provides a more facile and controllable processing approach that yields a halogenation layer comprising nanosized alkali metal salt particles intimately coated on the surface of a substrate (e.g., electrode). Moreover, the halogenation layer forms within the stability window of the electrolyte, and thus, can be cleanly decoupled from intrinsic co-reduction or co-oxidation products that accompany the formation of conventional substrate layers in other electrochemical approaches. Furthermore, the halogenation layer described herein allows further cycling of electrochemical cells with lower overpotentials to trigger alkali metal salt (e.g., LiF) splitting and further incorporation of halogen ions into the substrate. The systems, articles, and methods described herein therefore provide new opportunities for the fabrication of fluorinated cathode materials for Li and Li-ion batteries.

The methods described herein also provide novel concepts in the design and preparation of other functional materials with alkali metal salt (e.g., LiF) coatings. LiF coatings used in solar cells and other optical devices, for example, are mainly obtained through deposition processes, such as thermal deposition and atomic layer deposition (ALD). In general, vapor deposition of LiF coatings is conventionally conducted at elevated temperatures (e.g., ~300° C.). In contrast, the methods described herein form well-controlled alkali metal salt coatings at room temperature, thus effectively decreasing fabrication complexity and improving energy efficiency as compared to conventional deposition techniques.

The halogenation layer is first formed by discharging the electrochemical cell, which is then followed, in some embodiments, by cycling the electrochemical cell to trigger the alkali metal salt splitting reaction (e.g., under the same cell conditions). In certain embodiments, upon subsequent cycles after formation of the halogenation layer and incorporation of the halogen ion into the substrate, discharge may occur at a potential higher or lower than that of the halogenation layer-forming reaction, so that sustained halogenation layer formation can be continued or avoided as required. Therefore, the halogenation layer formation reaction is amenable as a simple added step in electrochemical cell fabrication, where devices (e.g., batteries) may be assembled under an active gas headspace (e.g. of $SF_6$ and/or $NF_3$), or with an electrolyte comprising a fluorinated liquid (e.g., $C_6F_{13}I$), which is then used to form and sustain the halogenation layers and their derived materials upon charge and cycling. A simple gas-addition step is industrially-compatible and would not require other changes to the electrochemical cell assembly process.

According to certain embodiments, a method of forming a halogenation layer on a substrate of an electrochemical cell is described. In some embodiments, the method comprises reacting a metal (e.g., an alkali metal) with a halogenated compound (e.g., a fluorinated compound) under suitable electrochemical conditions to form the halogenation layer on a substrate of an electrochemical cell. In certain embodiments, for example, the method comprises discharging an electrochemical cell comprising an alkali metal (e.g., Li) and a halogenated compound (e.g., $SF_6$) such that the alkali metal is oxidized (e.g. $Li^+$) and the halogenated compound is reduced (e.g., $S^{2-}$ and $F^-$). The discharge conditions are explained in greater detail herein. In some embodiments, the oxidized alkali metal ion (e.g., $Li^-$) and a portion of the reduced halogenated compound (e.g., $F^-$) react (e.g., at an interface of the substrate) to form a reaction product (e.g. LiF), such that a halogenation layer comprising the reaction product is formed on the substrate of the electrochemical cell.

According to some embodiments, the electrochemical cell comprises a first electrode and a second electrode. FIG. 1A, shows, for example, a schematic diagram of an electrochemical cell comprising an alkali metal and a halogenated compound. As shown in FIG. 1A, electrochemical cell 10 comprises first electrode 12 and second electrode 16. In certain embodiments, first electrode 12 is an anode and the second electrode 16 is a cathode. The anode may be in ionic communication with the cathode, such that ions may move from the anode to cathode and vice versa. In some embodiments, the anode and cathode may be mechanically and/or electrically isolated from one another (e.g., in separate containers). In some embodiments, first electrode 12 (e.g., the anode) is or comprises metal 14. In certain embodiments, second electrode 16 (e.g., the cathode) is or comprises the substrate. Various components of the electrochemical cell, including anode active materials, cathode active materials, electrolytes, and the like are described in further detail herein.

In some embodiments, the electrochemical cell comprises a metal (e.g., an alkali metal). Referring to FIG. 1A, for example, electrochemical cell 10 comprises metal 14. Metal 14 in FIG. 1A is represented by the formula $M^0$, wherein M is a metal atom (e.g., a neutral alkali metal) in an oxidation state of 0. The electrochemical cell may comprise any of a variety of suitable metals. In some embodiments, the metal has a standard reduction potential of less than or equal to about −1.4 V versus the standard hydrogen electrode (SHE) (e.g., lithium, sodium, calcium, magnesium, aluminum). In certain embodiments, the metal is an alkali metal (e.g., lithium, sodium) or an alkaline earth metal (e.g., calcium, magnesium). In certain embodiments, first electrode 12 (e.g., anode) is or comprises metal 14 (e.g., alkali metal). In some other embodiments, metal 14 is another component of the electrochemical cell other than the anode, or is in another area of the electrochemical cell. For example, in certain embodiments, the metal is suspended, dispersed, or dissolved in a liquid electrolyte of the electrochemical cell. In certain embodiments, the electrochemical cell comprises an alkali metal, such as lithium (Li), sodium (Na), potassium (K), rubidium (Rb), and/or cesium (Cs). Other metals are possible.

In certain non-limiting embodiments, electrochemical cell 10 comprises first electrode 12 (e.g., anode) comprising metal 14, wherein metal 14 is Li.

According to some embodiments, the electrochemical cell comprises a substrate. Referring to FIG. 1A, for example, electrochemical cell 10 comprises second electrode 16 (e.g. cathode), which is or comprises the substrate. In certain other embodiments, the substrate is another component of the electrochemical cell that is different from the cathode or is in another area of the electrochemical cell. For example, in certain embodiments, the substrate is suspended and/or dispersed in a liquid electrolyte of the electrochemical cell. The substrate may comprise any of a variety of suitable materials. In certain embodiments, for example, the substrate comprises carbon, a metal, a metal oxide, a metal sulfide, and/or a metal fluoride. In some embodiments, the substrate comprises graphite, graphene, carbon powder (e.g., Vulcan carbon, carbon black, and the like), and/or a carbon gas diffusion layer (GDL). In certain embodiments, the substrate comprises a metal oxide, such as, for example MnO and/or NiO, though other metal oxides are possible. In some embodiments, the substrate comprises a metal that is capable of reacting with fluorine, such as bismuth (Bi), iron (Fe), and/or cobalt (Co). In some embodiments, for example, the substrate comprises $FeF_2$ and/or $CoF_2$. Other substrate materials are possible. Without wishing to be bound by theory, the substrate composition may be provided such that the surface of the substrate promotes nucleation of a metal salt (e.g., an alkali metal salt) such that growth of the metal salt is favored on the substrate.

In certain, non-limiting embodiments, electrochemical cell 10 comprises second electrode 16 (e.g., cathode), which is a substrate comprising MnO particles mixed with carbon powder (e.g., Vulcan carbon).

The electrochemical cell may comprise the substrate in any of a variety of suitable mass loadings. For example, the electrochemical cell may comprise the substrate with a mass loading greater than or equal to 0.1 mg/cm², greater than or equal to 0.2 mg/cm², greater than or equal to 0.4 mg/cm², greater than or equal to 0.6 mg/cm², greater than or equal to 0.8 mg/cm², greater than or equal to 1.0 mg/cm², greater than or equal to 1.2 mg/cm², greater than or equal to 1.4 mg/cm², greater than or equal to 1.6 mg/cm², or greater than or equal to 1.8 mg/cm². In certain embodiments, the electrochemical cell comprises the substrate with a mass loading less than or equal to 2.0 mg/cm², less than or equal to 1.8 mg/cm², less than or equal to 1.6 mg/cm², less than or equal to 1.4 mg/cm², less than or equal to 1.2 mg/cm², less than or equal to 1.0 mg/cm², less than or equal to 0.8 mg/cm², less than or equal to 0.6 mg/cm², less than or equal to 0.4 mg/cm², or less than or equal to 0.2 mg/cm². Combinations of the above recited ranges are also possible (e.g., the electrochemical cell comprises the substrate with a mass loading greater than or equal to 0.1 mg/cm² and less than or equal to 2.0 mg/cm², the electrochemical cell comprises the substrate with a mass loading greater than or equal to 0.8 mg/cm² and less than or equal to 1.2 mg/cm²). Other ranges are also possible.

In certain embodiments, the electrochemical cell comprises a substrate comprising carbon. In some such embodiments, the electrochemical cell comprises the substrate comprising carbon with a mass loading greater than or equal to 0.3 mg/cm², greater than or equal to 0.4 mg/cm², greater than or equal to 0.6 mg/cm², greater than or equal to 0.8 mg/cm², greater than or equal to 1.0 mg/cm², or greater than or equal to 1.2 mg/cm². In certain embodiments, the electrochemical cell comprises the substrate comprising carbon with a mass loading less than or equal to 1.4 mg/cm², less than or equal to 1.2 mg/cm², less than or equal to 1.0 mg/cm², less than or equal to 0.8 mg/cm², less than or equal to 0.6 mg/cm², or less than or equal to 0.4 mg/cm². Combinations of the above recited ranges are also possible (e.g., the electrochemical cell comprises the substrate comprising carbon with a mass loading greater than or equal to 0.3 mg/cm² and less than or equal to 1.4 mg/cm², the electrochemical cell comprises the substrate comprising carbon with a mass loading greater than or equal to 0.6 mg/cm² and less than or equal to 1.0 mg/cm²). Other ranges are also possible.

In some embodiments, the electrochemical cell comprises a substrate comprising a metal oxide (e.g., MnO). In some such embodiments, the electrochemical cell comprises the substrate comprising a metal oxide with a mass loading greater than or equal to 0.4 mg/cm², greater than or equal to 0.6 mg/cm², greater than or equal to 0.8 mg/cm², greater than or equal to 1.0 mg/cm², greater than or equal to 1.2 mg/cm², greater than or equal to 1.4 mg/cm², greater than or equal to 1.6 mg/cm², or greater than or equal to 1.8 mg/cm². In certain embodiments, the electrochemical cell comprises the substrate comprising a metal oxide with a mass loading less than or equal to 1.9 mg/cm², less than or equal to 1.8 mg/cm², less than or equal to 1.6 mg/cm², less than or equal to 1.4 mg/cm², less than or equal to 1.2 mg/cm², less than or equal to 1.0 mg/cm², less than or equal to 0.8 mg/cm², or less than or equal to 0.6 mg/cm². Combinations of the above recited ranges are also possible (e.g., the electrochemical cell comprises the substrate comprising a metal oxide with a mass loading greater than or equal to 0.4 mg/cm² and less than or equal to 1.8 mg/cm², the electrochemical cell comprises the substrate comprising a metal oxide with a mass loading greater than or equal to 1.0 mg/cm² and less than or equal to 1.2 mg/cm²). Other ranges are also possible.

According to certain embodiments, the electrochemical cell comprises a halogenated compound. Referring to FIG. 1A, for example, electrochemical cell 10 comprises halogenated compound 11. Halogenated compound 11 in FIG. 1A is represented by the formula $RX_m$, wherein X is a halogen (e.g., a fluorine ion), R is an inorganic group (e.g., nitrogen, sulfur) or an organic group (e.g., optionally substituted aliphatic group, halogenated aliphatic group, fluorinated aliphatic group, perfluorinated alkyl group), and m is 1-10.

In certain embodiments, the halogenated compound is or comprises a fluorinated gas. The fluorinated gas may be a perfluorinated gas. In some embodiments, for example, the fluorinated gas is $SF_6$ and/or $NF_3$. Other fluorinated gases are also possible.

In certain embodiments, at least a portion of the gaseous halogenated compound may be dissolved in the electrolyte (e.g., the electrolyte solution). In some such cases, the concentration of the gaseous halogenated compound dissolved in the electrolyte may be relatively high. For example, in certain embodiments, the concentration of the gaseous halogenated compound dissolved in the electrolyte is greater than or equal to 1 mM, greater than or equal to 2 mM, greater than or equal to 3 mM, greater than or equal to 4 mM, greater than or equal to 5 mM, greater than or equal to 10 nM, greater than or equal to 50 mM, greater than or equal to 100 mM, greater than or equal to 200 mM, or greater than or equal to 300 mM at 25° C. and 1 atm. In certain embodiments, the concentration of the gaseous halogenated compound dissolved in the electrolyte is less than or equal to 400 mM, less than or equal to 300 mM, less than or equal to 200 mM, less than or equal to 100 mM, less than or equal to 50 mM, less than or equal to 10 mM, less than or equal to 5 mM, less than or equal to 4 mM, less than or equal to 3 mM, or less than or equal to 2 mM at 25° C. and 1 atm. Combinations of the above recited ranges are also possible (e.g., the concentration of the gaseous halogenated compound dissolved in the electrolyte is greater than or equal to 1 mM and less than or equal to 300 mM, the concentration of the gaseous halogenated compound dissolved in the electrolyte is greater than or equal to 5 nM and less than or equal to 10 mM). Other ranges are also possible.

In some embodiments, at least a portion of the gaseous halogenated compound may occupy a headspace in the system, if present. In certain embodiments, at least a portion of the gaseous halogenated compound may occupy a headspace of the system and be dissolved in the electrolyte (e.g., electrolyte solution).

In some embodiments, the halogenated compound is or comprises a fluorinated liquid. The fluorinated liquid may be an iodo-fluorcarbon (e.g., $C_6F_{13}I$, $C_4F_9I$, $C_3F_7I$, etc.). In certain embodiments, the fluorinated liquid is phenylsulfur pentafluoride ($C_6H_5SF_5$). Other fluorinated liquids are also possible.

According to some embodiments, at least a portion of the liquid halogenated compound may be dissolved and/or mixed with the electrolyte (e.g., electrolyte solution). In some embodiments, for example, the liquid halogenated compound may be present in the electrolyte in an amount of greater than or equal to 1 vol. %, greater than or equal to 2 vol. %, greater than or equal to 5 vol. % greater than or equal to 10 vol. %, greater than or equal to 20 vol. %, greater than or equal to 30 vol. %, greater than or equal to 40 vol. %, greater than or equal to 50 vol. %, greater than or equal to 60 vol. %, greater than or equal to 70 vol. %, greater than or equal to 80 vol. %, or greater than or equal to 90 vol. %. In certain embodiments, the liquid halogenated compound may be present in the electrolyte in an amount less than or equal to 99 vol. %, less than or equal to 90 vol. %, less than or equal to 80 vol. %, less than or equal to 70 vol. %, less than or equal to 60 vol. %, less than or equal to 50 vol. %, less than or equal to 40 vol. %, less than or equal to 30 vol. %, less than or equal to 20 vol. %, less than or equal to 10 vol. %, less than or equal to 5 vol. %, or less than or equal to 2 vol. %. Combinations of the above recited ranges are also possible (e.g., the liquid halogenated compound may be present in the electrolyte in amount greater than or equal to 1 vol. % and less than or equal to 99 vol. %, the liquid halogenated compound may be present in the electrolyte in an amount greater than or equal to 40 vol. % and less than or equal to 60 vol. %). Other ranges are also possible.

In certain non-limiting embodiments, the electrolyte (e.g., electrolyte solution) is or comprises the liquid halogenated compound.

In some embodiments, in order to facilitate formation of the halogenation layer, a current and/or voltage is applied to the electrochemical cell. In certain embodiments, the electrochemical cell comprising an alkali metal and a halogenated compound may be cycled (e.g., charged and discharged). According to some embodiments, for example, the electrochemical cell is discharged. The electrochemical cell may be discharged to any of a variety of suitable capacities. In certain embodiments, the discharge capacity may depend on the components of the electrochemical cell (e.g., the composition of the anode, cathode, electrolyte, etc.) and/or the amount of the components in the electrochemical cell (e.g., the loading of the anode, cathode, electrolyte, etc.).

In some embodiments, the electrochemical cell is discharged to a capacity greater than or equal to 0.05 $mAh/cm^2$, greater than or equal to 1 $mAh/cm^2$, greater than or equal to 2 $mAh/cm^2$, greater than or equal to 3 $mAh/cm^2$, greater than or equal to 4 $mAh/cm^2$, greater than or equal to 5 $mAh/cm^2$, greater than or equal to 6 $mAh/cm^2$, greater than or equal to 7 $mAh/cm^2$, greater than or equal to 8 $mAh/cm^2$, or greater than or equal to 9 $mAh/cm^2$. In certain embodiments, the electrochemical cell is discharged to a capacity less than or equal to 10 $mAh/cm^2$, less than or equal to 9 $mAh/cm^2$, less than or equal to 8 $mAh/cm^2$, less than or equal to 7 $mAh/cm^2$, less than or equal to 6 $mAh/cm^2$, less than or equal to 5 $mAh/cm^2$, less than or equal to 4 $mAh/cm^2$, less than or equal to 3 $mAh/cm^2$, less than or equal to 2 $mAh/cm^2$, or less than or equal to 1 $mAh/cm^2$. Combinations of the above recited ranges are also possible (e.g., the electrochemical cell is discharged to a capacity greater than or equal to 0.05 $mAh/cm^2$ and less than or equal to 10 $mAh/cm^2$, the electrochemical cell is discharged to a capacity greater than or equal to 4 $mAh/cm^2$ and less than or equal to 6 $mAh/cm^2$). Other ranges are also possible.

In certain embodiments, the electrochemical cell is fully discharged.

According to certain embodiments, the substrate (e.g., the cathode) may comprise carbon such that the electrochemical cell is loaded with between greater than or equal to 0.3 $mg/cm^2$ and less than or equal to 1.4 $mg/cm^2$ of carbon. In some such embodiments, the electrochemical cell is discharged to a capacity greater than or equal to 700 mAh/gc, greater than or equal to 1000 mAh/gc, greater than or equal to 2000 mAh/gc, greater than or equal to 3000 mAh/gc, greater than or equal to 4000 mAh/gc, greater than or equal to 5000 mAh/gc, greater than or equal to 6000 mAh/gc, or greater than or equal to 7000 mAh/gc. In certain embodiments, the electrochemical cell is discharged to a capacity less than or equal to 8000 mAh/gc, less than or equal to 7000 mAh/gc, less than or equal to 6000 mAh/gc, less than or equal to 5000 mAh/gc, less than or equal to 4000 mAh/gc, less than or equal to 3000 mAh/gc, less than or equal to 2000 mAh/gc, or less than or equal to 1000 mAh/gc. Combinations of the above recited ranges are also possible (e.g., the electrochemical cell is discharged to a capacity greater than or equal to 700 mAh/gc and less than or equal to 8000 mAh/gc, the electrochemical cell is discharged to a capacity greater than or equal to 2000 mAh/gc and less than or equal to 3000 mAh/gc). Other ranges are also possible.

In some embodiments, the substrate (e.g., the cathode) may comprise a metal oxide (e.g., MnO) such that the electrochemical cell is loaded with between greater than or equal to 0.4 mg/cm$^2$ and less than or equal to 1.9 mg/cm$^2$ of MnO. In some such embodiments, the electrochemical cell is discharged to a capacity greater than or equal to 400 mAh/$g_{MnO}$, greater than or equal to 1000 mAh/$g_{MnO}$, greater than or equal to 2000 mAh/$g_{MnO}$, greater than or equal to 3000 mAh/$g_{MnO}$, or greater than or equal to 4000 mAh/$g_{MnO}$. In certain embodiments, the electrochemical cell is discharged to a capacity less than or equal to 5000 mAh/$g_{MnO}$, less than or equal to 4000 mAh/$g_{MnO}$, less than or equal to 3000 mAh/$g_{MnO}$, less than or equal to 2000 mAh/$g_{MnO}$, or less than or equal to 1000 mAh/$g_{MnO}$. Combinations of the above recited ranges are also possible (e.g., the electrochemical cell is discharged to a capacity greater than or equal to 400 mAh/$g_{MnO}$ and less than or equal to 5000 mAh/$g_{MnO}$, the electrochemical cell is discharged to a capacity greater than or equal to 1000 mAh/$g_{MnO}$ and less than or equal to 2000 mAh/$g_{MnO}$). Other ranges are also possible.

The electrochemical cell may be discharged at any of a variety of suitable current densities. In some embodiments, the current density at which the electrochemical cell is discharged may affect the morphology (e.g., average particle size) of the resulting halogenation layer, which is described herein in further detail. In certain embodiments, the discharge capacity may depend on the components of the electrochemical cell (e.g., the composition of the anode, cathode, electrolyte, etc.) and/or the amount of the components in the electrochemical cell (e.g., the loading of the anode, cathode, electrolyte, etc.). According to some embodiments, the electrochemical cell is discharged at a current density greater than or equal to 1 microampere/cm$^2$, greater than or equal to 5 microamperes/cm$^2$, greater than or equal to 50 microamperes/cm$^2$, greater than or equal to 100 microamperes/cm$^2$, greater than or equal to 150 microamperes/cm$^2$, greater than or equal to 200 microamperes/cm$^2$, or greater than or equal to 250 microamperes/cm$^2$. In some embodiments, the electrochemical cell is discharged at a current density less than or equal to 300 microamperes/cm$^2$, less than or equal to 250 microamperes/cm$^2$, less than or equal to 200 microamperes/cm$^2$, less than or equal to 150 microamperes/cm$^2$, less than or equal to 100 microamperes/cm$^2$, less than or equal to 50 microamperes/cm$^2$, or less than or equal to 5 microamperes/cm$^2$. Combinations of the above recited range are also possible (e.g., the electrochemical cell is discharged at a current density of greater than or equal to 1 microampere/cm$^2$ and less than or equal to 300 microamperes/cm$^2$, the electrochemical cell is discharged at a current density of greater than or equal to 100 microamperes/cm$^2$ and less than or equal to 150 microamperes/cm$^2$). Other ranges are also possible.

In some embodiments, the electrochemical cell is discharged at a current density greater than or equal to 50 mA/gc, greater than or equal to 100 mA/$g_c$, greater than or equal to 150 mA/$g_c$, greater than or equal to 200 mA/$g_c$, greater than or equal to 250 mA/$g_c$, greater than or equal to 300 mA/$g_c$, greater than or equal to 350 mA/$g_c$, greater than or equal to 400 mA/$g_c$, or greater than 450 mA/$g_c$. In certain embodiments, the electrochemical cell is discharged to a capacity less than or equal to 500 mA/$g_c$, less than or equal to 450 mA/$g_c$, less than or equal to 400 mA/$g_c$, less than or equal to 350 mA/$g_c$, less than or equal to 300 mA/$g_c$, less than or equal to 250 mA/$g_c$, less than or equal to 200 mA/$g_c$, less than or equal to 150 mA/$g_c$, or less than or equal to 100 mA/$g_c$. Combinations of the above recited ranges are also possible (e.g., the electrochemical cell is discharged to a capacity greater than or equal to 50 mA/$g_c$ and less than or equal to 500 mA/$g_c$, the electrochemical cell is discharged to a capacity greater than or equal to 200 mA/$g_c$ and less than or equal to 300 mA/$g_c$). Other ranges are also possible.

The electrochemical cell may be discharged at any of a variety of suitable temperatures. In some embodiments, the temperature of the electrochemical cell during discharge may affect the morphology (e.g., average particle size) of the resulting halogenation layer, which is described herein in further detail. In certain embodiments, the electrochemical cell is discharged at a temperature greater than or equal to 0° C., greater than or equal to 10° C., greater than or equal to 20° C., greater than or equal to 30° C., greater than or equal to 40° C., greater than or equal to 50° C., greater than or equal to 60° C., or greater than or equal to 70° C. In some embodiments, the electrochemical cell is discharged at a temperature less than or equal to 80° C., less than or equal to 70° C., less than or equal to 60° C., less than or equal to 50° C., less than or equal to 40° C., less than or equal to 30° C., less than or equal to 20° C., or less than or equal to 0° C. Combinations of the above recited ranges are also possible (e.g., the electrochemical cell is discharged at a temperature greater than or equal to 0° C. and less than or equal to 80° C., the electrochemical cell is discharged at a temperature greater than or equal to 20° C. and less than or equal to 30° C.). Other ranges are also possible.

In certain non-limiting embodiments, the electrochemical cell is discharged at room temperature (e.g., greater than or equal to about 20° C. and less than or equal to about 25° C.).

Figure 1B:
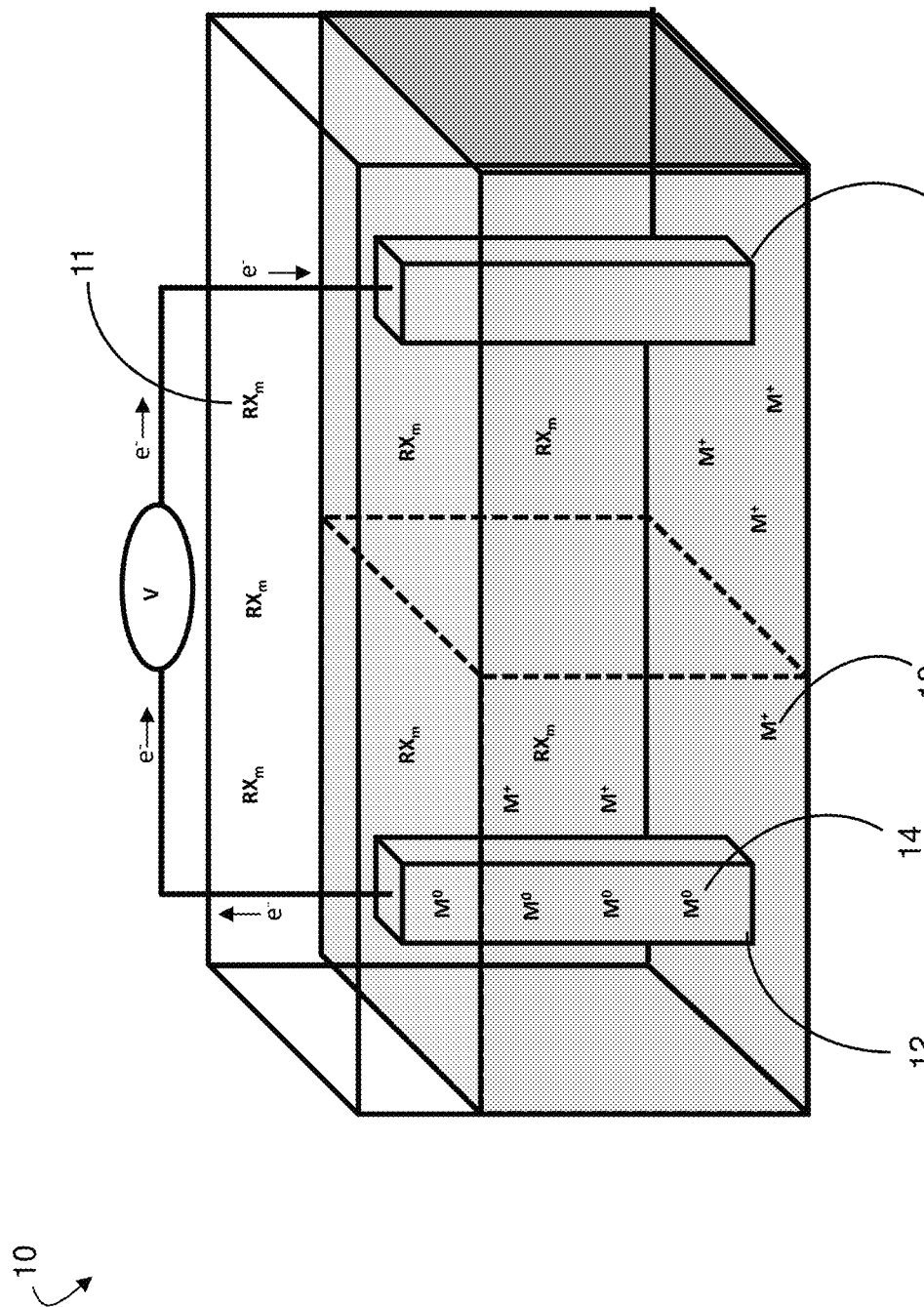
FIG. 1B shows, according to some embodiments, a schematic diagram of an electrochemical cell comprising an oxidized alkali metal ion and a halogenated compound.

According to certain embodiments, the method comprises oxidizing at least a portion of the alkali metal, thereby providing an oxidized alkali metal ion. FIG. 1B shows, according to some embodiments, a schematic diagram of an electrochemical cell comprising an oxidized alkali metal ion and a halogenated compound. As shown in FIG. 1B, electrochemical cell 10 may be discharged, thereby providing electrons from first electrode 12 (e.g., anode) comprising metal 14 (e.g., alkali metal). In some embodiments, as a result of discharging electrochemical cell 10, metal 14 is oxidized, thereby providing oxidized metal 18 (e.g., oxidized alkali metal ion). Oxidized metal 18 in FIG. 1B is represented by the formula M$^+$, wherein M is a metal atom (e.g., a cationic alkali metal ion) in an oxidized (e.g., +1) oxidation state. In some embodiments, the oxidized metal 14 is suspended, dispersed, and/or dissolved in the electrolyte (e.g., electrolyte solution) of the electrochemical cell.

In certain, non-limiting embodiments, electrochemical cell 10 comprises oxidized metal 14, wherein oxidized metal 14 is Li$^+$.

In certain embodiments, the method comprises reducing at least a portion of the halogenated compound, thereby providing a reduced halogenated compound. In some embodiments, reducing at least a portion of the halogenated compound may convert one or more atoms (e.g., one atom, two or more atoms, three or more atoms, etc.) of the halogenated compound from a first oxidation state to a second oxidation state. The oxidation number of the first oxidation state of the atom may be greater than the oxidation number of the second oxidation state. In some embodiments, the atom that is converted from a first oxidation state to a second oxidation state is a halogenated atom. As used, herein, the term "halogenated atom" refers to an atom that is bound (e.g., covalently, non-covalently, and the like) to one or more halogen atoms. In some embodiments, one or more halogen atoms may be attached to the halogenated atom via a covalent bond. In certain embodiments, one or more halogen atoms may be attached to the halogenated atom via a non-covalent bond. In general, the halogenated compound may comprise one or more halogenated atoms.

In some embodiments, the conversion of the halogenated atom from the first oxidation state to the second oxidation state results in the removal of one or more halogen atoms (e.g., two or more halogen atoms, three or more halogen atoms, four or more halogen atoms, five or more halogen atoms, six or more halogen atoms, all halogen atoms) attached (e.g., covalently, non-covalently) to the halogenated atom. For example, the change in oxidation state may result in the cleavage of one or more halogenated atom-halogen bonds (e.g., two or more cleavages, three or more cleavages, four or more cleavages, six or more cleavages, cleavage of all halogenated atom-halogen bonds). In certain embodiments, the change in oxidation state results in the conversion of the halogenated atom to a reduced, non-halogenated atom. For instance, in some embodiments, the change in oxidation state may covert an atom bound to one or more halogen atoms to a reduced product that is not bound to a halogen atom. In a non-limiting embodiment, for example, the change in the oxidation state of the sulfur atom in $SF_6$ from $S^{6+}$ to $S^{2-}$ may result in the cleavage of all six sulfur-fluorine bonds. In some embodiments, cleavage of a halogenated atom-halogen bond may result in the formation of a halogen ion. In a non-limiting embodiment, for example, the cleavage of one or more halogenated atom-halogen bonds in $SF_6$ may result in the formation of a one or more $F^-$ atoms.

In some embodiments, the atom(s) in the second oxidation state (e.g., the reduced, non-halogenated atom) may be capable of forming one or more chemical bonds (e.g., covalent bond, non-covalent bond). In some embodiments, the atom(s) in the second oxidation state may form a chemical bond (e.g., covalent bond) with another atom in the second oxidation state (e.g., the reduced, non-halogenated atom). For example, in a non-limiting embodiment, $NF_3$ may be reduced to form nitrogen atoms and fluorine atoms, and the nitrogen atoms may react with one another to form inert nitrogen gas ($N_2$).

Figure 1C:
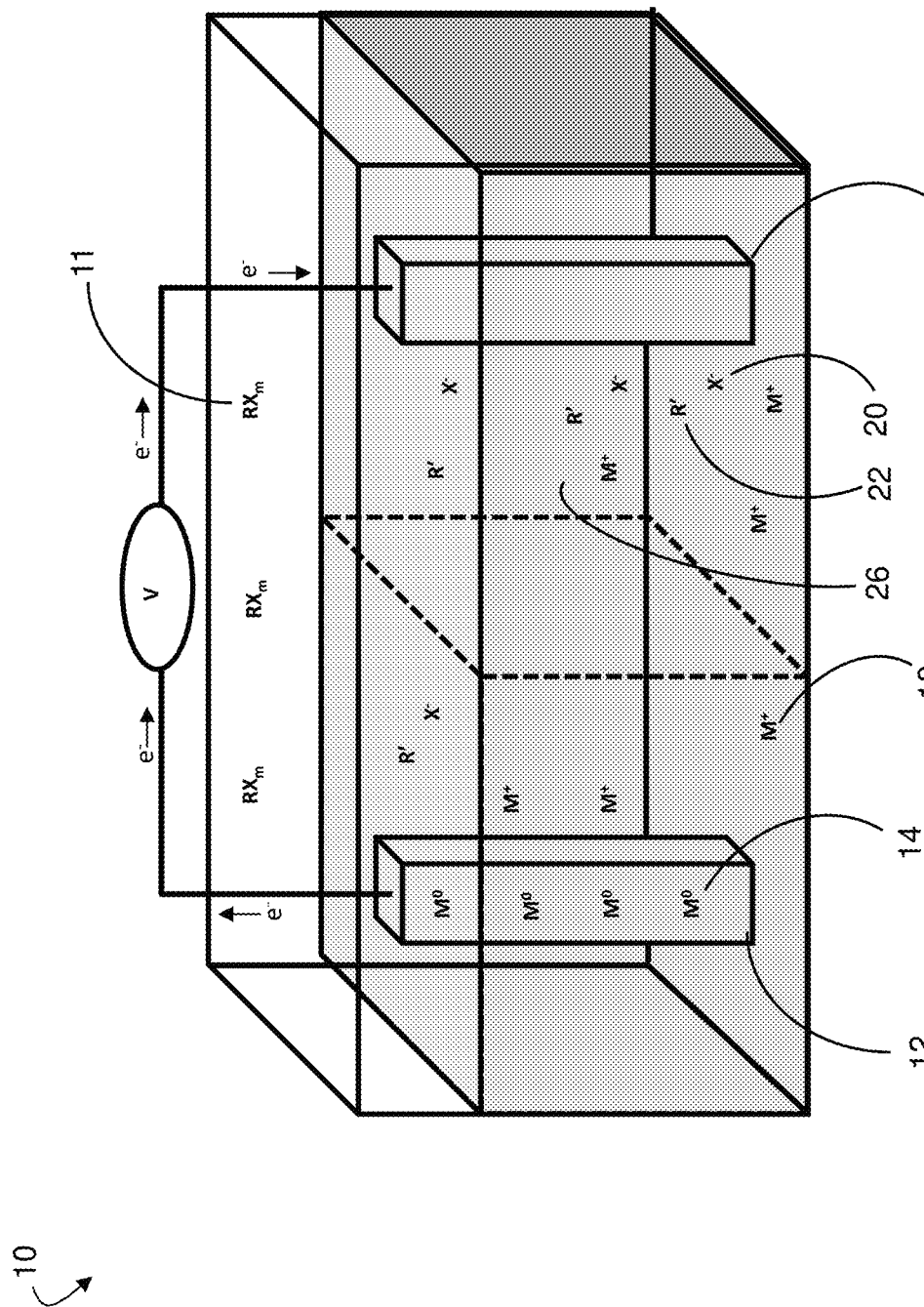
FIG. 1C shows, according to some embodiments, a schematic diagram of an electrochemical cell comprising an oxidized alkali metal ion and a reduced halogenated compound.

FIG. 1C shows, according to some embodiments, a schematic diagram of an electrochemical cell comprising an oxidized alkali metal ion and a reduced halogenated compound. As shown in FIG. 1C, electrochemical cell 100 may be discharged, thereby providing electrons from first electrode 12 (e.g., anode). In certain embodiments, as a result of discharging electrochemical cell 10, halogenated compound 11 is reduced, thereby providing a reduced halogenated compound. In certain embodiments, the reduced halogenated compound may comprise one or more reduced products 22 (e.g., a reduced, non-halogenated atom) and one or more halogen ions 20. Reduced product 22 in FIG. 1C is represented by R', wherein R' is a reduced inorganic group (e.g., nitrogen, sulfur) or a reduced organic group (e.g., optionally substituted aliphatic group, halogenated aliphatic group, fluorinated aliphatic group, perfluorinated alkyl group). Halogen ion 20 is represented by $X^-$, where X is a halogen ion (e.g., a monoanionic fluorine). In certain embodiments, reduced product 22 and/or halogen ion 20 resulting from the reduction of the halogenated compound may be dissolved in electrolyte 26 (e.g., electrolyte solution).

In certain, non-limiting embodiments, electrochemical cell 10 comprises reduced product 22 and halogen ion 20, wherein reduced product 22 is $S^{2-}$ and halogen ion 20 is $F^-$.

In other non-limiting embodiments, electrochemical cell 10 comprises reduced product 22 and halogen ion 20, wherein reduced product 22 is $N_2$ and halogen ion 20 is $F^-$.

Figure 1D:
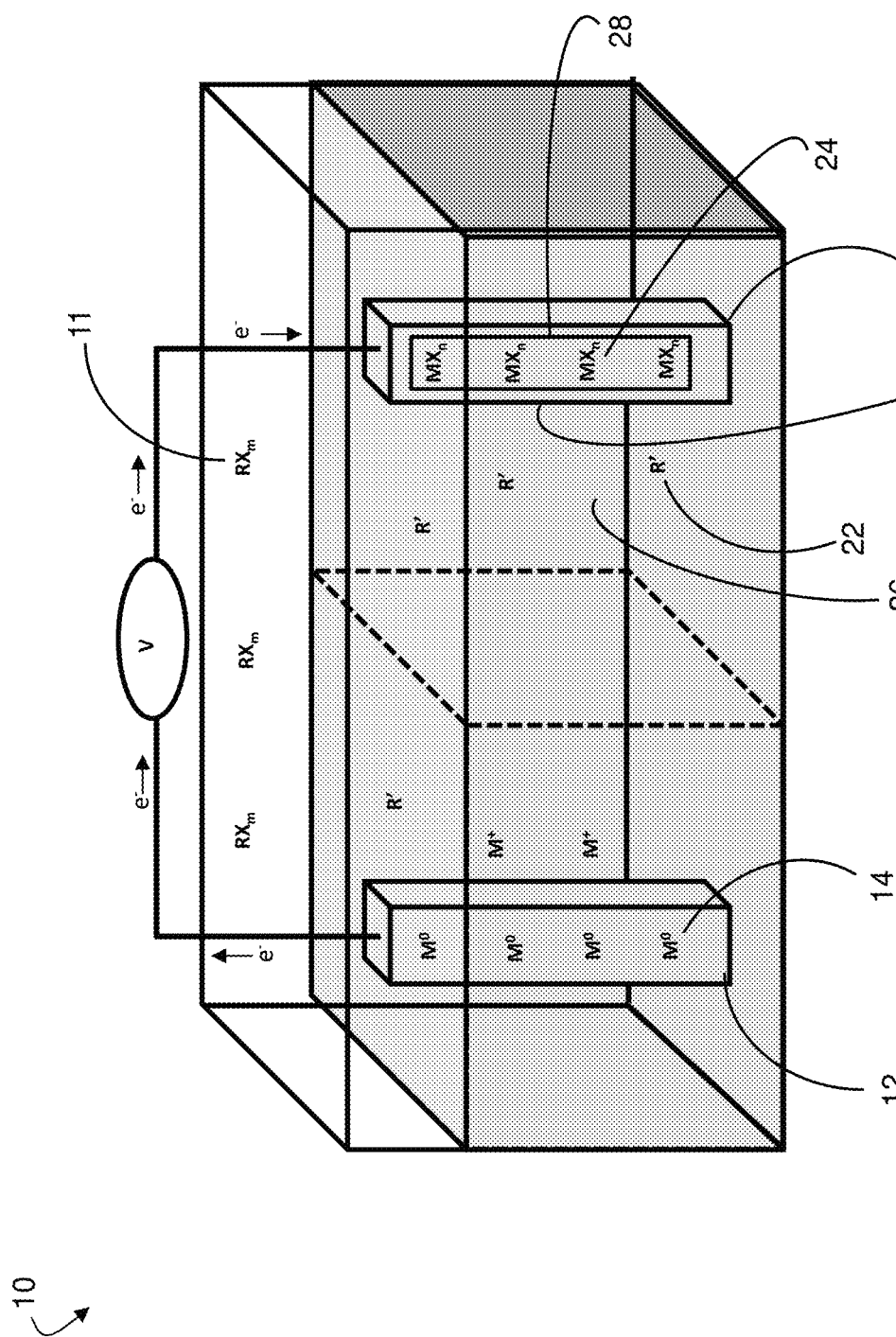
FIG. 1D shows, according to some embodiments, a schematic diagram of an electrochemical cell comprising a substrate comprising a halogenation layer.

According to some embodiments, the method comprises reacting the oxidized alkali metal ion with the reduced halogenated compound to form the halogenation layer on at least a portion of the substrate. In certain embodiments, for example, the reduced halogenated compound comprises a halogen ion that reacts with the oxidized alkali metal ion to form a reaction product comprising a metal salt (e.g., an alkali metal salt). In certain embodiments, the reaction product comprising the metal salt (e.g., the alkali metal salt) deposits on the substrate (e.g., on a surface of the substrate) to form the halogenation layer. FIG. 1D shows, according to some embodiments, a schematic diagram of an electrochemical cell comprising substrate comprising a halogenation layer. As shown in FIG. 1D, second electrode 16 (e.g., cathode) comprises halogenation layer 28 comprising metal salt 24. Metal salt 24 in FIG. 1D is represented by the formula $MX_n$, wherein M is a metal atom (e.g., an alkali metal ion), X is a halogen (e.g., a fluoride ion), and n is 1-3.

In some non-limiting embodiments, second electrode 16 (e.g., cathode) comprises halogenation layer 28 comprising metal salt 24, wherein metal salt 24 is LiF.

In some embodiments, the metal that reacts with one or more halogen ions may be selected, such that the reaction between the metal and the one or more halogen ions is an exergonic reaction. Without being bound by theory, it is believed that the exergonic reaction facilitates the electrochemical reaction and minimizes the presence of potential hazardous reaction products and/or contaminants within the halogenation layer.

The reaction between the oxidized alkali metal ion and the reduced halogenated compound may occur in the electrochemical cell (e.g., in the electrolyte solution of the electrochemical cell). In certain embodiments, for example, the reaction between the oxidized alkali metal ion and the reduced halogenated compound occurs at or near an electrified interface in an electrochemical cell. As used herein, the term "electrified interface" generally refers to the interface between two dissimilar materials in which an interfacial potential difference exists. For instance, in some embodiments, the electrified interface may be the interface between a first material (e.g., an electrode) and a second material (e.g., an electrolyte), which has a different composition than the first material. In some embodiments, the reaction between the oxidized alkali metal ion and the reduced halogenated compound occurs at the electrified interface between the substrate (e.g., cathode) and the electrolyte (e.g., electrolyte solution). For example, referring to FIG. 1D, the reaction between the oxidized alkali metal ion and the reduced halogenated compound may occur at electrified interface 28 between second electrode 16 (e.g., cathode) and electrolyte 26 (e.g., electrolyte solution). In some embodiments, as a result of the reaction between the oxidized alkali metal ion and the reduced halogenated compound occurring at electrified interface 28 between second electrode 16 (e.g., cathode) and electrolyte 26, at least a portion of the reaction product comprising metal salt 24 (e.g., an alkali metal salt) deposits on second electrode 16 (e.g., cathode) as halogenation layer 28. In some embodiments, the reaction between the oxidized alkali metal ion and the reduced halogenated compound occurring at electrified interface 28 (e.g., between second electrode 16 and electrolyte 26) may provide a high concentration of the reaction product comprising metal salt 24 at electrified interface 28. In certain embodiments, electrified interface 28 (e.g., between second electrode 16 and electrolyte 26) may become saturated and/or supersaturated with the reaction product comprising metal salt 24 such that metal salt 24 deposits onto second electrode 16 (e.g., cathode) as halogenation layer 28.

Without wishing to be bound by theory, several non-limiting examples of electrochemical reactions are provided below. In one example, the halogenated compound is $SF_6$ and the anode comprises Li. In some such embodiments, the reaction at the anode may be $8Li \rightarrow 8Li^+ + 8e^-$ and the reaction at the cathode may be $SF_6 + 8e^- + 8Li^+ \rightarrow 6LiF + Li_2S$, wherein the halogenation layer comprises LiF. In another example, the halogenated compound is $SF_6$ and the anode comprises Na. In some such embodiments, the reaction at the anode may be $8Na \rightarrow 8Na^+ + 8e^-$ and the reaction at the cathode may be $SF_6 + 8e^- + 8Na^+ \rightarrow 6NaF + Na_2S$, wherein the halogenation layer comprises NaF. In another example, the halogenated compound is $NF_3$ and the anode comprises Li. In some such embodiments, the reaction at the anode may be $6Li \rightarrow 6Li^+ + 6e^-$ and the reaction at the cathode may be $2NF_3 + 6e^- + 6Li \rightarrow 6LiF + N_{2(g)}$, wherein the halogenation layer comprises LiF. In another example, the halogenated compound is $NF_3$ and the anode comprises sodium. In some such embodiments, the reaction at the anode may be $6Na \rightarrow 6Na^+ + 6e^-$ and the reaction at the cathode may be $2NF_3 + 6e^- + 6Na^+ \rightarrow 6NaF + N_{2(g)}$, wherein the halogenation layer comprises NaF. One of ordinary skill in the art would understand other electrochemical reactions that may occur based on general knowledge in the field and the description provided herein.

Figure 2A:
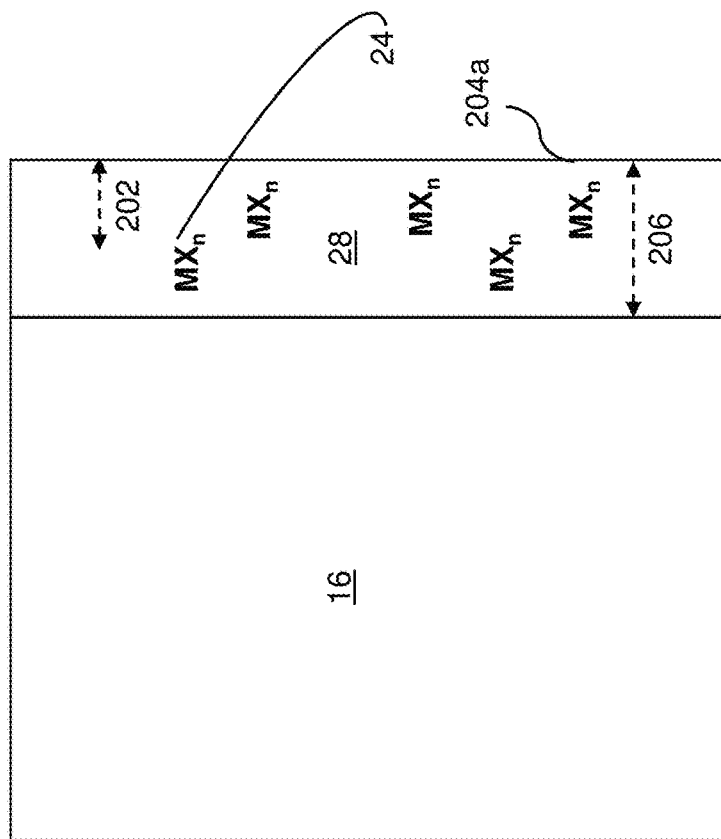
FIG. 2A shows, according to some embodiments, a schematic cross-sectional diagram of a substrate comprising a halogenation layer.

According to certain embodiments, an article is described, wherein the article comprises a substrate comprising a halogenation layer. FIG. 2A shows, according to some embodiments, a schematic cross-sectional diagram of a substrate comprising a halogenation layer. As shown in FIG. 2A, for example, article 100 comprises second electrode 16 (e.g., cathode) comprising halogenation layer 28. The use of a halogenation layer may be beneficial because, in some cases, the halogenation layer provides a reservoir of fluoride ions that may be donated into and/or throughout the substrate during cycling of the electrochemical cell, which is explained herein in greater detail.

In some embodiments, the halogen layer protects the substrate that it is disposed on from deterioration and/or decay that may be caused by external forces (e.g., a solvent and/or electrolyte of an electrochemical cell). In some embodiments, the halogenation layer is configured to protect at least a portion of the substrate (e.g., electrode) from corrosion. Corrosion of a substrate (e.g., electrode) is caused, in some cases, by cycling an electrochemical cell comprising the substrate, therefore causing subsequent reactivity between the substrate and the solvent and/or electrolyte of the electrochemical cell. Other external forces in the electrochemical cell may additionally cause corrosion of the substrate, such as gases dissolved in the solvent of the electrochemical cell.

According to some embodiments, the halogenation layer comprises a metal salt. In some embodiments, the metal salt is an alkali metal salt. The alkali metal salt may be an alkali metal fluoride. Referring to FIG. 2A, for example, second electrode 16 (e.g., cathode) may comprise halogenation layer 28 comprising metal salt 24 (e.g., alkali metal salt).

In certain non-limiting embodiments, the halogenation layer comprises LiF.

In certain embodiments, the halogenation layer comprises a plurality of particles. The plurality of particles may have any of a variety of suitable average particle sizes. For example, in some embodiments, the plurality of particles comprises a plurality of nanostructures (e.g., nanoparticles) having an average particle size (e.g., average particle diameter). Other particles are possible (e.g., nanotubes, nanowires, nanorods, nanosheets, etc.). In certain embodiments, the plurality of particles have an average particle size of greater than or equal to 1 nm, greater than or equal to 10 nm, greater than or equal to 50 nm, greater than or equal to 100 nm, greater than or equal to 150 nm, greater than or equal to 200 nm, greater than or equal to 250 nm, greater than or equal to 300 nm, greater than or equal to 350 nm, greater than or equal to 400 nm, or greater than or equal to 450 nm. In some embodiments, the plurality of particles have an average particle size of less than or equal to 500 nm, less than or equal to 450 nm, less than or equal to 400 nm, less than or equal to 350 nm, less than or equal to 300 nm, less than or equal to 250 nm, less than or equal to 200 nm, less than or equal to 150 nm, less than or equal to 100 nm, less than or equal to 50 nm, or less than or equal to 10 nm. Combinations of the above recited ranges are also possible (e.g., the plurality of particles have an average particle size of greater than or equal to 1 nm and less than or equal to 500 nm, the plurality of particles have an average particle size of greater than or equal to 50 nm and less than or equal to 200 nm). Other ranges are also possible. The average particle size of the plurality of particles may be determined using SEM, TEM, and/or atomic force microscopy (AFM).

According to certain embodiments, the halogenation layer may have any of a variety of suitable average thicknesses. For example, referring to FIG. 2A, halogenation layer 28 may have thickness 206, which may be measured at several locations throughout the halogenation layer and averaged. In some embodiments, the average thickness of the halogenation layer is less than or equal to 1 micrometer, less than or equal to 0.9 micrometers, less than or equal to 0.8 micrometers, less than or equal to 0.7 micrometers, less than or equal to 0.6 micrometers, less than or equal to 0.5 micrometers, less than or equal to 0.4 micrometers, less than or equal to 0.3 micrometers, less than or equal to 0.2 micrometers, less than or equal to 0.1 micrometers, or less than or equal to 0.05 micrometers. In certain embodiments, the average thickness of the halogenation layer is greater than or equal to 0.01 micrometers, greater than or equal to 0.05 micrometers, greater than or equal to 0.1 micrometers, greater than or equal to 0.2 micrometers, greater than or equal to 0.3 micrometers, greater than or equal to 0.4 micrometers, greater than or equal to 0.5 micrometers, greater than or equal to 0.6 micrometers, greater than or equal to 0.7 micrometers, greater than or equal to 0.8 micrometers, or greater than or equal to 0.9 micrometers. Combinations of the above recited ranges are also possible (e.g., the average thickness of the halogenation layer is less than or equal to 1 micrometer and greater than or equal to 0.01 micrometers, the average thickness of the halogenation layer is less than or equal to 0.6 micrometers and greater than or equal to 0.3 micrometers). Other ranges are also possible. The thickness of the halogenation layer may be determined using X-ray photoelectron spectroscopy (XPS) depth profiling, SEM, and/or TEM.

In some embodiments, the halogenation layer substantially covers the surface area of the substrate. For example, in certain embodiments, greater than or equal to 10%, greater than or equal to 20%, greater than or equal to 30%, greater than or equal to 40%, greater than or equal to 50%, greater than or equal to 60%, greater than or equal to 70%, greater than or equal to 80%, greater than or equal to 85%, greater than or equal to 90%, greater than or equal to 95%, greater than or equal to 98%, or greater than or equal to 99% of the surface area of the substrate is covered by the halogenation layer. In some cases, less than or equal to 100%, less than or equal to 99%, less than or equal to 98%, less than or equal to 97%, less than or equal to 90%, less than or equal to 85%, less than or equal to 80%, less than or equal to 70%, less than or equal to 60%, less than or equal to 50%, less than or equal to 40%, less than or equal to 30%, or less than or equal to 20% of the surface area of the substrate is covered by the halogenation layer. Combinations of the above recited ranges are also possible (e.g., greater than or equal to 10% and less than or equal to 100% of the surface area of the substrate is covered by the halogenation layer, greater than or equal to 50% and less than or equal to 70% of the substrate is covered by the halogenation layer). Other ranges are also possible.

In some embodiments, at least a portion of the halogenation layer is amorphous. It may be advantageous, in certain embodiments, for at least a portion of the halogenation layer to be amorphous because an amorphous halogenation layer may coat a higher surface area of the substrate than a halogenation layer that is crystalline but otherwise equivalent. Resultantly, in certain embodiments when the halogenation layer is amorphous, a higher amount of halogen ions (e.g., $F^-$) may be incorporated on and/or in the substrate when the electrochemical cell is charged (e.g., after formation of the halogenation layer), which is explained in further detail herein.

In some embodiments, at least a portion of the halogenation layer is polycrystalline and/or crystalline. For example, in certain embodiments, the halogenation layer comprises nanocrystals (e.g., cubic nanocrystals) with various average particle sizes (e.g., greater than or equal to 10 nm, greater than or equal to 50 nm, greater than or equal to 100 nm, greater than or equal to 200 nm, etc.). In certain embodiments, the crystalline halogenation layer comprises one or more crystallographic defects (e.g., a point defect) and/or grain boundaries, so that the halogenation layer may conduct ions (e.g., from the substrate, through the halogenation layer, and to an atmosphere surrounding the article). Methods of determining the crystallinity of the halogenation layer include, for example, TEM (e.g., electron diffraction in TEM) and/or X-ray diffraction (XRD).

The halogenation layer may comprise a substantially small amount of contaminants, as compared to an alkali metal layer comprising a layer containing halogen ions that is formed by conventional methods (e.g., ball-milling or reacting substrates with toxic fluorine-containing reactants). Layers containing halogen ions formed on substrates by conventional methods may comprise contaminants such as electrolyte decomposition products, though other contaminants are possible. In some embodiments, the halogenation layer described herein comprises a substantially small amount of electrolyte decomposition products and/or other contaminants. It may be advantageous for the halogenation layer to comprise a substantially small amount of contaminants, in some embodiments, in order to cleanly incorporate halogen ions (e.g., $F^-$) on and/or in the substrate when the electrochemical cell is charged (e.g., following formation of the halogenation layer), which is explained herein in greater detail.

In some embodiments, the amount of contaminants may be measured at the surface of the halogenation layer. For example, referring to FIG. 2A, the amount of contaminants at surface 204a of halogenation layer 28 may be measured. In certain embodiments, the amount of contaminants (e.g., electrolyte decomposition products) at the surface of the halogenation layer may be substantially low. According to certain embodiments, for example, the amount of contaminants (e.g., electrolyte decomposition products) at the surface of the halogenation layer is less than or equal to 2 mol. %, less than or equal to 1.5 mol. %, less than or equal to 1 mol. %, less than or equal to 0.5 mol. %, or less than or equal to 0.1 mol. % versus the total moles of the halogenation layer. In some embodiments, the amount of contaminants (e.g., electrolyte decomposition products) at the surface of the halogenation layer is greater than or equal to 0.01 mol. %, greater than or equal to 0.1 mol. %, greater than or equal to 0.5 mol. %, greater than or equal to 1 mol %, or greater than or equal to 1.5 mol. % versus the total moles of the halogenation layer. The amount of contaminants at the surface of the halogenation layer may be determined by XPS, SEM (e.g., coupled with energy-dispersive X-ray spectroscopy), and/or TEM (e.g., coupled with electron energy loss spectroscopy).

According to certain embodiments, the amount of contaminants in the halogenation layer may be measured at a certain depth of the halogenation layer (e.g., at a depth of 0.01 micrometers, at depth of 0.1 micrometers, at a depth of 0.2 micrometers, at a depth of 0.5 micrometers etc.). For example, as shown in FIG. 2A, in some embodiments the amount of contaminants in halogenation layer 28 may be measured at depth 202.

In certain embodiments, the amount of contaminants (e.g., electrolyte decomposition products) in the halogenation layer measured at a depth of about 0.01 micrometers may be substantially low. In some embodiments, for example, the amount of contaminants (e.g., electrolyte decomposition products) at a depth of about 0.01 micrometers in the halogenation layer is less than or equal to 7 mol. %, less than or equal to 6 mol. %, less than or equal to 5 mol. %, less than or equal to 4 mol. %, less than or equal to 3 mol. %, less than or equal to 2 mol. %, less than or equal to 1 mol. %, less than or equal to 0.5 mol. %, or less than or equal to 0.1 mol. % versus the total moles of the halogenation layer. In certain embodiments, the amount of contaminants (e.g., electrolyte decomposition products) at a depth of about 0.01 micrometers in the halogenation layer is greater than or equal to 0.01 mol. %, greater than or equal to 0.1 mol. %, greater than or equal to 0.5 mol. %, greater than or equal to 1 mol. %, greater than or equal to 2 mol. %, greater than or equal to 3 mol. %, greater than or equal to 4 mol. %, greater than or equal to 5 mol. %, or greater than or equal to 6 mol. %. versus the total moles of the halogenation layer. Combinations of the above recited ranges are also possible (e.g., the amount of contaminants in the halogenation layer is less than or equal to 7 mol. % and greater than or equal to 0.01 mol. %, the amount of contaminants in the halogenation layer is less than or equal to 5 mol. % and greater than or equal to 3 mol. %). Other ranges are also possible. The amount of contaminants in the halogenation layer (e.g., at a depth of 0.1 micrometers) may be determined by XPS, SEM (e.g., coupled with energy-dispersive X-ray spectroscopy), and/or TEM (e.g., coupled with electron energy loss spectroscopy).

In some embodiments, the amount of contaminants in the halogenation layer is not dependent on the depth of which the contaminants are measured. For example, in certain non-limiting embodiments, the amount of contaminants in the halogenation layer at a first depth (e.g., 0.01 micrometers) does not vary substantially from the amount of contaminants in the halogenation layer at a second depth that is different from the first depth (e.g., 0.5 micrometers). In certain embodiments, the amount of contaminants in the halogenation layer at a first depth may not vary by more than 1%, more than 2%, more than 3%, more than 4%, or more than 5% from the amount of contaminants in the halogenation layer a second depth that is different from the first depth.

According to some embodiments, the electrochemical cell comprises an electrolyte. In some embodiments, the electrolyte is an electrolyte solution comprising, for example, an ionic salt dissolved in a solvent. The solvent may be water or an organic solvent. In certain embodiments, the electrolyte comprises any of a variety of suitable solvents. For example, the electrolyte may comprise a glyme and/or a carbonate. In some embodiments, the electrolyte comprises dimethyl sulfoxide (DMSO), tetrahydrofuran (THF), dimethylformamide (DMF), ethylene carbonate (EC), dimethyl carbonate (DMC), and/or TEGDME. Other solvents are also possible. The electrolyte may comprise any of a variety of suitable ionic salts. For example, the electrolyte may comprise lithium perchlorate ($LiClO_4$), lithium hexafluorophosphate ($LiPF_6$), lithium bis(trifluoromethanesulfonyl)imide (LiTFSI). Other ionic salts are also possible (e.g., Na derivatives of any of the aforementioned salts). Further details regarding the electrolyte function and composition are described herein.

In certain non-limiting embodiments, the electrolyte comprises $LiCiO_4$ dissolved in EC, DMC, and/or TEGDME.

In some embodiments, the electrolyte (e.g., electrolyte solution) comprises a halogen-binding agent (e.g., a fluoride-binding agent) in place of or in addition to the ionic salt. It may be advantageous to include a halogen-binding agent to affect the morphology and/or structure of the halogenation layer. For example, in certain embodiments, the halogenation layer may have a porous, three-dimensional structure when the halogenation layer is formed in the presence of a halogen-binding agent. In some embodiments, the halogen-binding agent may actively bind a halogen ion (e.g., F) as it is formed. Without wishing to be bound by theory, the halogen-binding agent may promote solubilization of the halogen ion in the electrolyte solution (e.g., to a greater extent than when the halogen-binding agent is not employed), therefore effectively allowing more of the halogen ion to be dissolved before the electrolyte solution (e.g., at the electrified interface between the electrolyte solution and the cathode) becomes saturated and/or supersaturated with the halogen ion. In certain embodiments, the halogen-binding agent softly and gradually releases the halogen ion to react with the oxidized alkali metal ion, thereby depositing the metal salt (e.g., the alkali metal slat) on the substrate. In some embodiments, the metal salt deposits on metal salt that has already nucleated on the substrate, therefore providing three-dimensional growth. In certain embodiments, the halogen-binding agent is tris(pentafluorophenyl)borane (TPFB), tri(hexafluoroisopropyl)borate (THFIPB), tripropyl borate (TPB), and/or 2-(pentafluorophenyl)tetrafluoro-1,3,benzodioxaborole.

The electrolyte solution may comprise the halogen-binding agent in any of a variety of suitable concentrations. In certain embodiments, for example, the electrolyte solution comprises the halogen-binding agent in an amount greater than or equal to 10 mM, greater than or equal to 20 mM, greater than or equal to 50 mM, greater than or equal to 100 mM, greater than or equal to 200 mM, greater than or equal to 300 mM. In certain embodiments, the electrolyte solution comprises the halogen-binding agent in an amount less than or equal to 400 mM, less than or equal to 300 mM, less than or equal to 200 mM, less than or equal to 100 mM, less than or equal to 50 mM, or less than or equal to 20 mM. Combinations of the above recited ranges are also possible (e.g., the electrolyte solution comprises the halogen-binding agent in an amount greater than or equal to 10 mM and less than or equal to 400 mM, the electrolyte solution comprises the halogen-binding agent in an amount greater than or equal to 100 mM and less than or equal to 200 mM. Other ranges are also possible.

In some embodiments, the halogenation layer comprises a plurality of particles with average particle size greater than or equal to 10 nm, greater than or equal to 50 nm, greater than or equal to 100 nm, or greater than or equal to 150 nm when the halogenation layer is formed in the presence of a halogen-binding agent. In some embodiments, the halogenation layer comprises a plurality of particles with average particle size less than or equal to 200 nm, less than or equal to 150 nm, less than or equal to 100 nm, or less than or equal to 50 nm when the halogenation layer is formed in the presence of a halogen-binding agent. Combinations of the above recited ranges are also possible (e.g., the halogenation layer comprises a plurality of particles with average particle size greater than or equal to 10 nm and less than or equal to 200 nm when the halogenation layer is formed in the presence of a halogen-binding agent, the halogenation layer comprises a plurality of particles with average particle size greater than or equal to 50 nm and less than or equal to 150 nm when the halogenation layer is formed in the presence of a halogen-binding agent). Other ranges are also possible.

According to certain embodiments, various conditions related to discharging the electrochemical cell may be changed in order to finely-tune and/or control the morphology (e.g., average particle size) of the halogenation layer. For example, in certain embodiments, the discharge current density and/or the discharge temperature may affect the morphology of the halogenation layer.

In certain embodiments, the average particle size of the plurality of particles is inversely proportional to the discharge current density. For example, in some cases, an increase in the discharge current density provides a decrease in the average particle size of the plurality of particles. According to some embodiments, the number of the plurality of particles per unit area of the substrate is proportional to the current density. In some embodiments, for example, an increase in the discharge current density provides an increase in the number of the plurality of particles per unit area of the substrate, therefore leading to a higher percent surface area of the substrate covered by the halogenation layer. Without wishing to be bound by theory, a lower rate of discharge current density provides a slower growth rate for the halogenation layer, therefore providing larger, more crystalline nuclei. Alternatively, in some embodiments, a faster rate of discharge current density provides a faster growth rate for the halogenation layer, therefore providing smaller, more amorphous nuclei.

In some embodiments, the average particle size of the plurality of particles is proportional to the discharge temperature. In certain embodiments, for example, an increase in discharge temperature provides an increase in the average particle size of the plurality of particles. In certain embodiments, the electrochemical cell may be discharged at room temperature (e.g., greater than or equal to about 20° C. and less than or equal to about 25° C.), and the plurality of particles may have an average particle size of greater than or equal to 20 nm, greater than or equal to 40 nm, greater than or equal to 60 nm, greater than or equal to 80 nm, or greater than or equal to 100 nm. In some embodiments, the electrochemical cell may be discharged at room temperature (e.g., greater than or equal to about 20° C. and less than or equal to about 25° C.), and the plurality of particles may have an average particle size of less than or equal to 120 nm, less than or equal to 100 nm, less than or equal to 80 nm, less than or equal to 60 nm, or less than or equal to 40 nm. Combinations of the above recited ranges are also possible (e.g., the electrochemical cell may be discharged at room temperature and the plurality of particles have an average particle size of greater than or equal to 20 nm and less than or equal to 120 nm, the electrochemical cell may be discharged at room temperature and the plurality of particles have an average particle size of greater than or equal 60 nm and less than or equal to 80 nm). Other ranges are also possible.

In certain embodiments, an increased discharge temperature (e.g., increased as compared to room temperature, such as greater than or equal to 30° C., greater than or equal to 40° C., greater than or equal to 50° C., greater than or equal to 60° C., or greater than or equal to 70° C.) provides an average particle size of greater than or equal to 100 nm, greater than or equal to 150 nm, greater than or equal to 200 nm, greater than or equal to 250 nm, greater than or equal to 300 nm, greater than or equal to 350 nm, greater than or equal to 400 nm, or greater than or 450 nm. In some embodiments, an increased discharge temperature (e.g., greater than or equal to 30° C., greater than or equal to 40° C., greater than or equal to 50° C., greater than or equal to 60° C., or greater than or equal to 70° C.) provides an average particle size of less than or equal to 500 nm, less than or equal to 450 nm, less than or equal to 400 nm, less than or equal to 350 nm, less than or equal to 300 nm, less than or equal to 250 nm, less than or equal to 200 nm, or less than or equal to 150 nm. Combinations of the above recited ranges are also possible (e.g., an increased discharge temperature provides a plurality of particles with an average particle size of greater than or equal to 100 nm and less than or equal to 500 nm, an increased discharge temperature provides a plurality of particles with an average particle size of greater than or equal to 300 nm and less than or equal to 400 nm). Other ranges are also possible.

In certain embodiments, after formation of the passivation layer on the substrate (e.g., cathode), the electrochemical cell may be charged. The electrochemical cell may be charged to any of a variety of the aforementioned capacities (e.g., greater than or equal to 0.05 mAh/cm$^2$ and less than or equal to 10 mAh/cm$^2$). In certain embodiments, the electrochemical cell may be fully charged. The electrochemical cell may be charged at any of a variety of the aforementioned current densities (e.g., greater than or equal to 5 microamperes/cm$^2$ and less than or equal to 300 microamperes/cm$^2$). Additionally, the electrochemical cell may be charged at any of a variety of the aforementioned temperatures (e.g., greater than or equal to 0° C. and less than or equal to 80° C.).

It may be advantageous to use a substrate comprising a halogenation layer as an electrode (e.g., cathode) when cycling (e.g., charging and discharging) an electrochemical cell (e.g., a Li-ion battery). Pristine MnO (e.g., without a halogenation layer), for example, when used as a cathode, yields negligible capacity (e.g., less than or equal to 80 mAh/$g_{MnO}$ over a voltage range of 2-5 V vs. Li) on discharge due to the lack of built-in Li host sites. In some embodiments, the substrate comprising the halogenation layer described herein has a built-in reservoir of halogen ions. In certain embodiments, for example, upon charging, the metal salt (e.g., alkali metal salt) of the halogenation layer can be electrochemically split. The alkali metal salt may be split, for example, into its substituents of a metal ion (e.g., Li$^+$) and a halogen ion (e.g., F$^-$). In certain embodiments, the metal ion (e.g., Li$^+$) migrates to the anode and is reduced to a metal (e.g., Li$^0$), and the halogen ion (e.g., F$^-$) is capable of being electrochemically incorporated on and/or in the substrate as at least a portion of the substrate (e.g. MnO) is oxidized during charging.

Figure 1E:
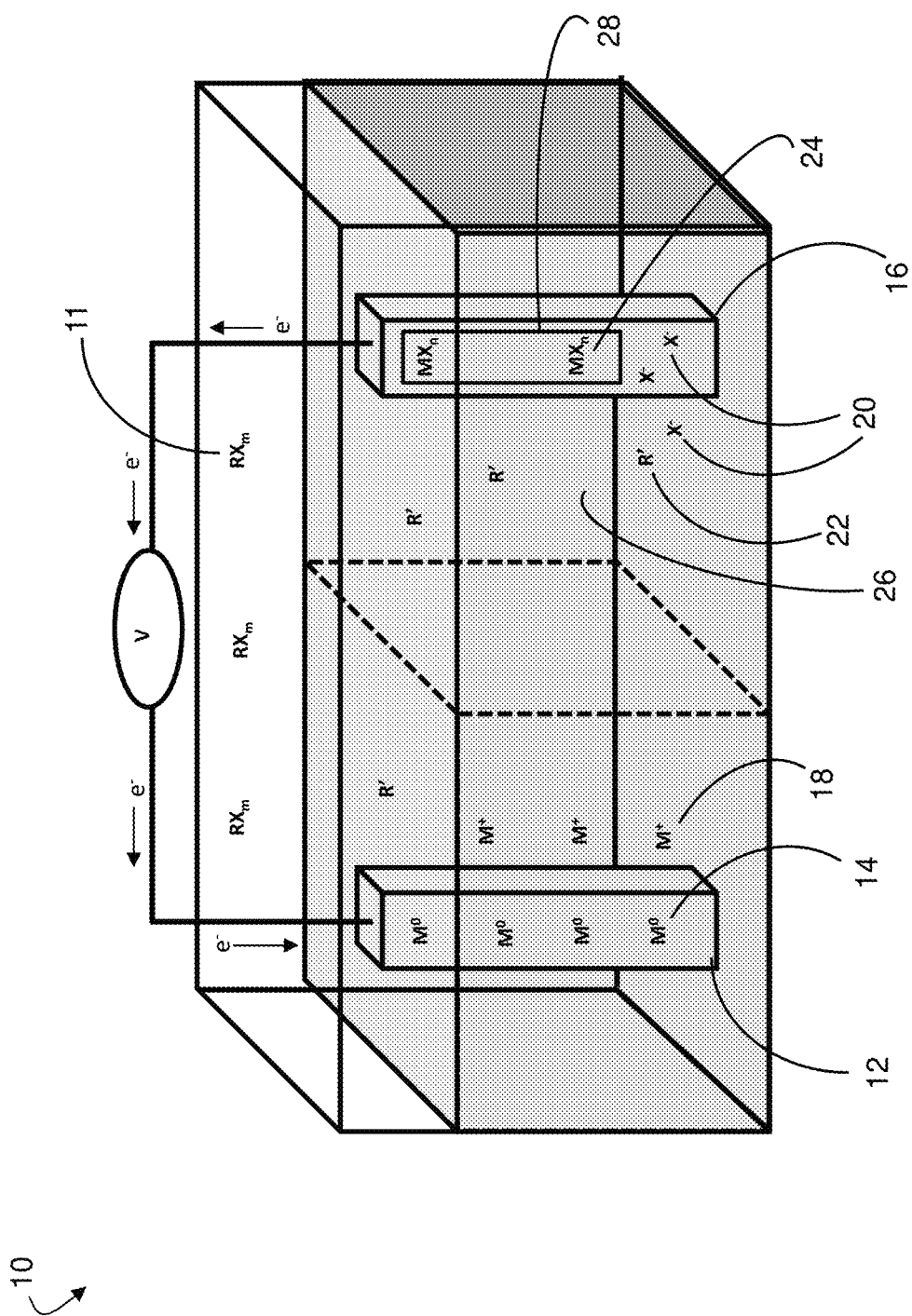
FIG. 1E shows, according to certain embodiments, a schematic diagram of an electrochemical cell comprising a substrate comprising halogen ions.

According to some embodiments, the method comprises electrochemically splitting at least a portion of the halogenation layer that has formed on the substrate (e.g., the cathode). FIG. 1E shows, according to certain embodiments, a schematic diagram of an electrochemical cell comprising a substrate comprising halogen ions. As shown in FIG. 1E, electrochemical cell 10 may be charged, thereby providing electrons from second electrode 16 (e.g., cathode). As a result of charging electrochemical cell 10, at least a portion of halogenation layer 28 (e.g., metal salt 24) is electrochemically split, thereby providing metal ion 18 and halogen ion 20. Metal ion 18 may be reduced, thereby providing metal 14 (e.g., alkali metal) at first electrode 12 (e.g., anode) and halogen ion 20 (e.g., monoanionic fluorine).

In certain non-limiting embodiments, halogenation layer 28 comprises metal salt 24, wherein metal salt 24 is LiF. Upon charging electrochemical cell 10, LiF is electrochemically split into Li$^+$ and F$^-$. The Li$^+$ metal ion may be reduced, in some embodiments, thereby providing metal 14 at first electrode 12 (e.g., anode) and halogen ion 20, wherein metal 14 is Li and halogen ion 20 is F$^-$.

Figure 2B:
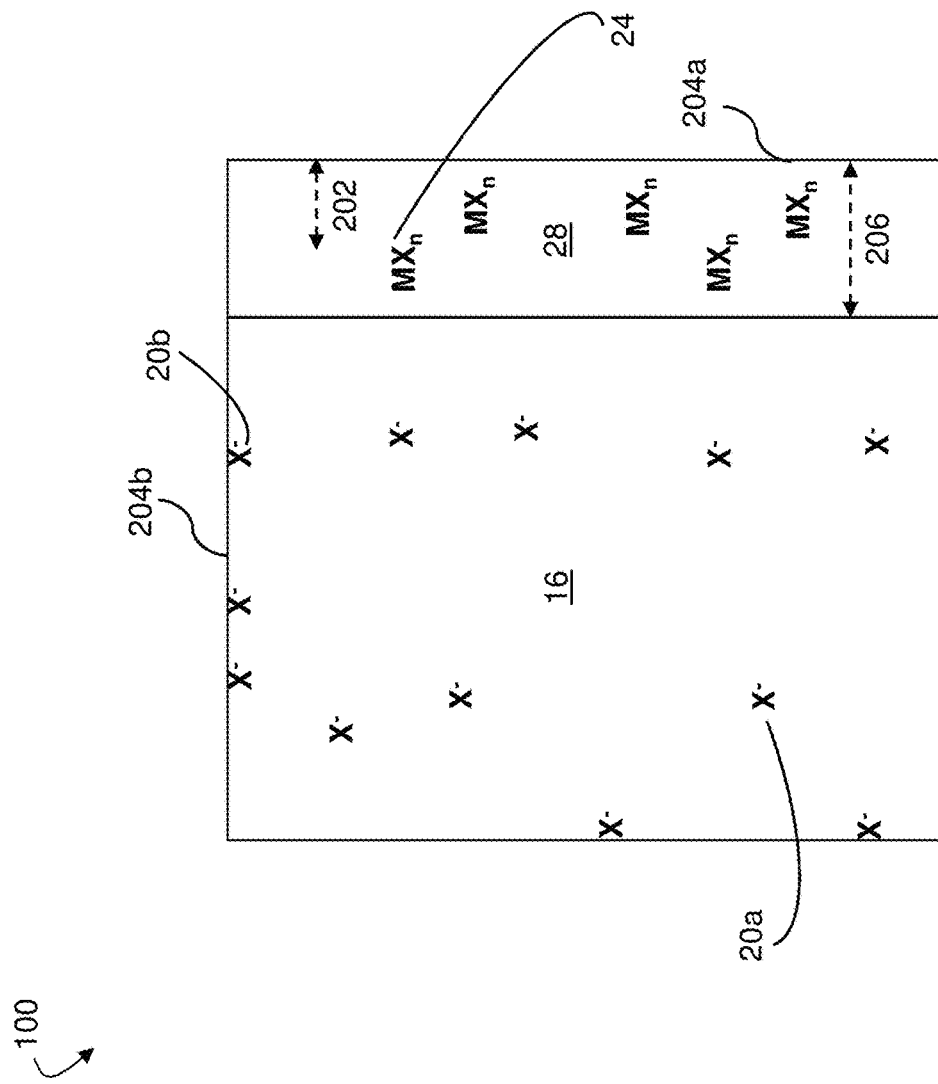
FIG. 2B shows, according to some embodiments, a schematic cross-sectional diagram of a substrate comprising halogen ions.

In some embodiments, after charging the electrochemical cell, splitting at least a portion of the halogenation layer into a metal ion and a halogen ion, and reducing the metal ion at the anode, the halogen ion (e.g., F$^-$) is incorporated on and/or in the substrate (e.g., second electrode). In certain embodiments, the halogen ion is incorporated on and/or in the substrate as a result of at least a portion of the substrate being oxidized (e.g., from charging the electrochemical cell). In some embodiments, the halogen ion is incorporated on a surface of the substrate and/or in a pore of the substrate. FIG. 2B shows, according to some embodiments, a schematic cross-sectional diagram of a substrate comprising halogen ions. Referring to FIG. 2B, for example, halogen ion 20b may be incorporated on surface 204b of second electrode 16 (e.g., substrate).

In some embodiments, the halogen ion is incorporated in the lattice of the substrate. Referring to FIG. 2B, for example, halogen ion 20a may be incorporated in the lattice of second electrode 16 (e.g., substrate). Without wishing to be bound by theory, incorporation of the halogen ion in the lattice of the substrate may affect the lattice structure and/or electronic structure of the substrate. For example, in certain embodiments, the lattice structure may distort as a result of the oxidation of at least a portion of the substrate, therefore allowing for the incorporation of the halogen ion in the lattice substrate. In certain non-limiting embodiments, the substrate may comprise a metal (e.g., Mn), and the valence state of the metal may change upon charging the electrochemical cell (e.g., due to oxidation of the metal), therefore allowing for incorporation of the halogen ion in the lattice of the substrate. Changes in the lattice and/or electronic structure of the substrate may be evaluated using Raman spectroscopy, XPS, SEM (e.g., coupled with energy-dispersive X-ray spectroscopy), and/or TEM (e.g., coupled with electron energy loss spectroscopy).

In certain embodiments, the amount of the halogen ion (e.g., F$^-$) incorporated on and/or in the substrate will depend on the charge capacity, the charge current density, and/or the applied potential.

Without wishing to be bound by theory, the incorporation of one or more halogen ions into the substrate comprising a metal oxide (e.g., MnO) may result in an interaction between the halogen ion and the oxide of the metal oxide. In some embodiments, the interaction between the halogen ion and the oxide may be a bond (e.g., a covalent bond, a non-covalent bond), resulting in an oxyhalogen (e.g., an oxyfluoride) phase. In certain embodiments, the oxyhalogen phase is a core-shell structure (e.g., an oxide core and halogen shell and/or a halogen core and oxide shell). In some embodiments, the oxyhalogen phase is a bulk oxyhalogen phase. According to certain embodiments, after incorporation of the halogen ion into the substrate, the resulting material is structurally and compositionally stable, such that only metal ions (e.g., Li$^+$) cycle in and out.

In some embodiments, the electrochemical cell may be cycled after incorporation of the halogen ion on and/or in the substrate (e.g., in the lattice of the substrate). Without wishing to be bound by theory, in some embodiments, the incorporation of one or more halogen ions on and/or in the second electrode may provide an electrode material with an increased electrochemical performance (e.g., as compared to pristine electrode material without the incorporation of one or more halogen ions but is otherwise equivalent), such as an increase in alkali metal cycling capacity. For example, in certain embodiments, an electrode (e.g., cathode) comprising one or more halogen ions incorporated on and/or in the electrode may exhibit greater than or equal to a 50% increase in capacity (e.g., alkali metal cycling capacity), greater than or equal to a 100% increase in capacity, greater than or equal to a 150% increase in capacity, greater than or equal to a 200% increase in capacity, or greater than or equal to a 250% increase in capacity as compared to pristine electrode material without the incorporation of one or more halogen ions but is otherwise equivalent.

In some embodiments, it is possible for the halogen ion to continue being incorporated on and/or in the substrate during subsequent cycling of the electrochemical cell. For example, in certain embodiments, the electrochemical cell may be cycled in the presence of the halogenated compound (e.g., $SF_6$, $NF_3$), resulting in continuous formation of the halogenation layer (e.g., during discharge) and continuous incorporation of the halogen ion on and/or in the substrate (e.g., during charge).

As described herein, the halogenation layer may be formed on at least a portion of the substrate (e.g., cathode), in certain embodiments. The substrate (e.g., cathode) may comprise, in certain embodiments, an active anode material, such as graphite. In some such embodiments, after formation of the halogenation layer on at least a portion of the substrate, the substrate may be lithiated by, for example, subjecting the substrate comprising the halogenation layer to low potentials (e.g., less than 1 V). In certain embodiments, the lithiated substrate comprising the halogenation layer may be removed from the electrochemical cell and used, for example, as an anode in another electrochemical cell.

According to certain embodiments, a system is described, wherein the system comprises a sealed electrochemical cell. In some such embodiments, the electrochemical cell is a closed system with respect to fluid (e.g., gas, liquid) transfer, such that the system comprises a seal that prevents fluid exchange with the outside environment. In certain embodiments, the electrochemical cell (e.g., the sealed electrochemical cell) is a battery, such as a Li battery or a Li-ion battery. According to certain embodiments, the electrochemical cell (e.g., sealed electrochemical cell) comprises a cathode comprising a halogenation layer and/or a plurality of halogen ions incorporated on and/or in the substrate, an anode comprising an alkali metal, and a halogenated compound. In certain embodiments, as described herein, the halogenation layer comprises a reaction product between the alkali metal that has been oxidized and the halogenated compound that has been reduced.

Substrates comprising alkali metal fluoride (e.g., LiF) halogenation layers are increasingly promising as electrode materials in electrochemical cells. Instead of energy intensive techniques and/or toxic reactants used in conventional fluorination methods, the methods described herein form halogenation layers comprising nanoscale particles with controlled morphologies in a facile manner. The substrate comprising a halogenation layer exhibits attractive performance when used as an electrode (e.g., cathode) in an electrochemical cell. In certain embodiments, for example, the substrate comprising an alkali metal fluoride halogenation layer may be utilized in Li and Li-ion batteries. In certain non-limiting embodiments, for example, LiF coated on MnO prepared using the methods described herein delivers a high reversible capacity (e.g., ~275 mAh/g) when used as a cathode in an electrochemical cell, indicating the formation of practical Li-storage materials starting from simple, non-toxic precursors. Therefore, the methods provide novel approaches to fluorinated electrode materials with low cost and significant safety advantages, as compared to conventional fluorination methods.

In addition, the substrates comprising alkali metal fluoride halogenation layers may be used for optical devices and/or solar cells. For example, in certain embodiments, it may be advantageous to utilize a halogenation layer comprising LiF in an optical device and/or solar cell, as LiF has a wide bandgap and high dielectric constant. Conventional methods of forming LiF films in optical devices and solar cells utilize physical vapor deposition techniques, such as thermal deposition at elevated temperatures (e.g., ~300° C.). Alternatively, the methods described herein are suitable for forming halogenation layers with various thicknesses on a wide variety of substrates at room temperature.

As noted above, in certain embodiments, the electrochemical cell comprises one or more electrodes. For example, in certain embodiments, the electrochemical cell comprises an anode and a cathode. According to some such embodiments, the electrochemical cell may be a rechargeable battery or a non-rechargeable battery. In certain embodiments, for example, the battery is a lithium-based rechargeable battery. In some other embodiments, the battery is a primary battery that allows for the safer and/or more complete utilization of the alkali metal (e.g., Li). In some embodiments, the battery (e.g., rechargeable battery) may be used in transportation (e.g., electric vehicles) or grid-storage applications (e.g., electrical power grids for the storage of renewable energy).

The anode may comprise a variety of anode active materials. As used herein, the term "anode active material" refers to any electrochemically active species associated with the anode. In some embodiments, the anode active material is a metal. The metal may have a standard reduction potential of less than or equal to about −1.4 V versus the standard hydrogen electrode (SHE). For instance, the metal and/or the anode may have a standard reduction potential versus SHE of less than or equal to about −1.5 V, less than or equal to about −1.6 V, less than or equal to about −1.8 V, less than or equal to about −2.0 V, less than or equal to about −2.2 V, less than or equal to about −2.4 V, or less than or equal to about −2.5 V. In some embodiments the anode active material may comprise lithium, sodium, calcium, magnesium, aluminum, and/or combinations thereof. In some embodiments, the anode active material may comprise an alkali metal (e.g., lithium, sodium, rubidium, cesium, francium) and/or an alkaline earth metal (e.g., beryllium, magnesium, calcium, strontium, barium, radium). In certain embodiments, the anode active material may comprise an alkali metal (e.g., lithium, sodium). In some cases, the anode may comprise an alkaline earth metal (e.g., magnesium, calcium).

In certain embodiments, the anode active material comprises Li. Suitable Li-containing anode active materials for use in the anode include, but are not limited to, lithium metal such as lithium foil and lithium deposited on a substrate, and lithium alloys (e.g., lithium-aluminum alloys and lithium-tin alloys). While these materials may be preferred in some embodiments, other cell chemistries are also contemplated. In some embodiments, the electrodes may comprise one or more binder materials (e.g., polymers, etc.).

In some embodiments, the anode may have a thickness of less than or equal to 1500 micrometers, less than or equal to 1250 micrometers, less than or equal to 1000 micrometers, less than or equal to 750 micrometers, less than or equal to 500 micrometers, or less than or equal to 200 micrometers. In certain embodiments, the anode may have a thickness of at least 1 micrometer, at least 5 micrometers, at least 10 micrometers, at least 25 micrometers, at least 50 micrometers, at least 100 micrometers, or at least 150 micrometers. Combinations of the above-referenced ranges are also possible (e.g., from 1 micrometer to 1500 micrometers). Other ranges are also possible.

In some embodiments, the anode may comprise a passivation layer on at least a portion (e.g., substantially all) of one or more surfaces (e.g., two surfaces, all surfaces, surfaces in contact with the electrolyte). The passivation layer may, for example, prevent direct reactions between the halogenated compound and the anode (e.g., metal in the anode). In some embodiments, the passivation layer may comprise organic compounds, oxides, halides, or combination thereof including but not limited to alkali or metal oxides, carbonates, reduction products of the electrolyte, nitrides, fluorides, chlorides, or a physical protective barrier such as a polymer or conductive ceramic. The passivation layer can be formed in a separate chemical step, can be physically placed within the electrochemical cell, or can be formed chemically or electrochemically in situ within the electrochemical cell. In some embodiments, the layer comprises a metal salt.

The cathode may comprise a variety of cathode active materials. As used herein, the term "cathode active material" refers to any electrochemically active species associated with the cathode. In some embodiments, the cathode active material comprises one or more metal oxides. In some embodiments, an intercalation cathode (e.g., a lithium-intercalation cathode) may be used. Non-limiting examples of suitable materials that may intercalate ions of an electroactive material (e.g., alkaline metal ions) include metal oxides, titanium sulfide, and iron sulfide. In some embodiments, the cathode is an intercalation cathode comprising a lithium transition metal oxide or a lithium transition metal phosphate. In certain embodiments, a conversion cathode may be used. Non-limiting examples of conversion cathodes include cathodes comprising sulfur (e.g., Li—S) and cathodes comprise $O_2$ (e.g., Li—$O_2$).

In some embodiments, the cathode may have a thickness of less than or equal to 2000 micrometers, less than or equal to 1500 micrometers, less than or equal to 1250 micrometers, less than or equal to 1000 micrometers, less than or equal to 750 micrometers, less than or equal to 500 micrometers, or less than or equal to 200 micrometers. In some embodiments, the cathode may have a thickness of at least 1 micrometer, at least 5 micrometers, at least 10 micrometers, at least 25 micrometers, at least 50 micrometers, at least 100 micrometers, or at least 150 micrometers. Combinations of the above-referenced ranges are also possible (e.g., from 1 micrometer to 2000 micrometers). Other ranges are also possible.

In general, the cathode may have any suitable surface area. Without being bound by theory, it is believed that efficiency and extent of the electrochemical reaction increases with the surface area of the cathode. In some embodiments, a cathode with a relatively high surface area may be used. For instance, the cathode may have a surface area of greater than or equal to about 10 $m^2$/g, greater than or equal to about 20 $m^2$/g, greater than or equal to about 30 $m^2$/g, greater than or equal to about 40 $m^2$/g, or greater than or equal to about 50 $m^2$/g.

As described above, according to some embodiments, the electrochemical cell comprises an electrolyte. The electrolytes used in electrochemical cells can function as a medium for the storage and transport of ions, and in the special case of solid electrolytes and gel electrolytes, these materials may additionally function as a separator between the anode and the cathode. Any liquid, solid, or gel material capable of storing and transporting ions may be used, so long as the material facilitates the transport of ions (e.g., Li ions) between the anode and the cathode. The electrolyte is generally electronically non-conductive to prevent short circuiting between the anode and the cathode. The electrolyte can comprise one or more ionic electrolyte salts to provide ionic conductivity and one or more liquid electrolyte solvents, gel polymer materials, or polymer materials. Suitable non-aqueous electrolytes may include organic electrolytes comprising one or more materials selected from the group consisting of liquid electrolytes, gel polymer electrolytes, and solid polymer electrolytes.

In some cases, the electrochemical chemical cell comprises a liquid electrolyte. In some embodiments, the electrolyte includes a non-aqueous electrolyte. Suitable non-aqueous electrolytes may include organic electrolytes such as liquid electrolytes, gel polymer electrolytes, and solid polymer electrolytes. These electrolytes may optionally include one or more ionic electrolyte salts (e.g., to provide or enhance ionic conductivity). Examples of useful non-aqueous liquid electrolyte solvents include, but are not limited to, non-aqueous organic solvents, such as, for example, N-methyl acetamide, acetonitrile, acetals, ketals, esters (e.g., esters of carbonic acid), carbonates (e.g., dimethyl carbonate, diethyl carbonate, ethyl methyl carbonate, propylene carbonate, ethylene carbonate, fluoroethylene carbonate, difluoroethylene carbonate), sulfones, sulfites, sulfolanes, suflonimidies (e.g., bis(trifluoromethane)sulfonimide lithium salt), aliphatic ethers, acyclic ethers, cyclic ethers, glymes, polyethers, phosphate esters (e.g., hexafluorophosphate), siloxanes, dioxolanes, N-alkylpyrrolidones, nitrate containing compounds, substituted forms of the foregoing, and blends thereof. Examples of acyclic ethers that may be used include, but are not limited to, diethyl ether, dipropyl ether, dibutyl ether, dimethoxymethane, trimethoxymethane, 1,2-dimethoxyethane, diethoxyethane, 1,2-dimethoxypropane, and 1,3-dimethoxypropane. Examples of cyclic ethers that may be used include, but are not limited to, tetrahydrofuran, tetrahydropyran, 2-methyltetrahydrofuran, 1,4-dioxane, 1,3-dioxolane, and trioxane. Examples of polyethers that may be used include, but are not limited to, diethylene glycol dimethyl ether (diglyme), triethylene glycol dimethyl ether (triglyme), tetraethylene glycol dimethyl ether (tetraglyme), higher glymes, ethylene glycol divinyl ether, diethylene glycol divinyl ether, triethylene glycol divinyl ether, dipropylene glycol dimethyl ether, and butylene glycol ethers. Examples of sulfones that may be used include, but are not limited to, sulfolane, 3-methyl sulfolane, and 3-sulfolene. Fluorinated derivatives of the foregoing are also useful as liquid electrolyte solvents. In some cases, mixtures of the solvents described herein may also be used.

In some cases, aqueous solvents can be used for electrolytes for lithium cells. Aqueous solvents can include water, which can contain other components such as ionic salts. As noted above, in some embodiments, the electrolyte can include species such as lithium hydroxide, or other species rendering the electrolyte basic, so as to reduce the concentration of hydrogen ions in the electrolyte.

In certain embodiments, the electrochemical cell comprises gel electrolyte. Examples of useful gel polymer electrolytes include, but are not limited to, those comprising one or more polymers selected from the group consisting of polyethylene oxides, polypropylene oxides, polyacrylonitriles, polysiloxanes, polyimides, polyphosphazenes, polyethers, sulfonated polyimides, perfluorinated membranes (NAFION resins), polydivinyl polyethylene glycols, polyethylene glycol diacrylates, polyethylene glycol dimethacrylates, derivatives of the foregoing, copolymers of the foregoing, crosslinked and network structures of the foregoing, and blends of the foregoing, and optionally, one or more plasticizers. In some embodiments, a gel polymer electrolyte comprises between 10-20%, 20-40%, between 60-70%, between 70-80%, between 80-90%, or between 90-95% of a heterogeneous electrolyte by volume.

According to certain embodiments, the electrochemical cell comprises solid electrolyte. For example, in some embodiments, one or more solid polymers can be used to form an electrolyte. Examples of useful solid polymer electrolytes include, but are not limited to, those comprising one or more polymers selected from the group consisting of polyethers, polyethylene oxides, polypropylene oxides, polyimides, polyphosphazenes, polyacrylonitriles, polysiloxanes, derivatives of the foregoing, copolymers of the foregoing, crosslinked and network structures of the foregoing, and blends of the foregoing.

In addition to electrolyte solvents, gelling agents, and polymers as known in the art for forming electrolytes, the electrolyte may further comprise one or more ionic electrolyte salts, also as known in the art, to increase the ionic conductivity.

In some embodiments, the electrolyte comprises at least one lithium salt. For example, in some cases, the at least one lithium salt is selected from the group consisting of LiSCN, LiBr, LiI, $LiSO_3CH_3$, $LiNO_3$, $LiPF_6$, $LiBF_4$, $LiB(Ph)_4$, $LiClO_4$, $LiAsF_6$, $Li_2SiF_6$, $LiSbF_6$, $LiAlCl_4$, lithium bis-oxalatoborate, $LiCF_3SO_3$, $LiN(SO_2F)_2$, $LiC(CnF_{2n+1}SO_2)_3$, wherein n is an integer in the range of from 1 to 20, and $(C_nF_{2n+1}SO_2)_mXLi$ with n being an integer in the range of from 1 to 20, m being 1 when X is selected from oxygen or sulfur, m being 2 when X is selected from nitrogen or phosphorus, and m being 3 when X is selected from carbon or silicon.

In some embodiments, an electrochemical cell includes a separator. The separator generally comprises a polymeric material (e.g., polymeric material that does or does not swell upon exposure to electrolyte). In some embodiments, the separator is located between the electrolyte and an electrode (e.g., a first electrode, a second electrode, an anode, a cathode). In certain embodiments, the separator is located between the first electrode (e.g., anode) and the second electrode (e.g., the cathode). For example, referring to FIG. 1A, separator 13 may be located between first electrode 12 (e.g. anode) and second electrode 16 (e.g., cathode). The separator may be configured to inhibit (e.g., prevent) physical contact between a first electrode and a second electrode, which could result in short circuiting of the electrochemical cell. The separator may be configured to be substantially electronically non-conductive, which can inhibit the degree to which the separator causes short circuiting of the electrochemical cell.

The term "aliphatic," as used herein, includes both saturated and unsaturated, nonaromatic, straight chain (i.e., unbranched), branched, acyclic, and cyclic (i.e., carbocyclic) hydrocarbons, which are optionally substituted with one or more functional groups. As will be appreciated by one of ordinary skill in the art, "aliphatic" is intended herein to include, but is not limited to, alkyl, alkenyl, alkynyl, cycloalkyl, cycloalkenyl, and cycloalkynyl moieties. Thus, as used herein, the term "alkyl" includes straight, branched, and cyclic alkyl groups. An analogous convention applies to other generic terms such as "alkenyl", "alkynyl", and the like. Furthermore, as used herein, the terms "alkyl", "alkenyl", "alkynyl", and the like encompass both substituted and unsubstituted groups. In certain embodiments, as used herein, "aliphatic" is used to indicate those aliphatic groups (cyclic, acyclic, substituted, unsubstituted, branched, or unbranched) having 1-20 carbon atoms. Aliphatic group substituents include, but are not limited to, any of the substituents described herein, that result in the formation of a stable moiety (e.g., aliphatic, alkyl, alkenyl, alkynyl, heteroaliphatic, heterocyclic, aryl, heteroaryl, acyl, oxo, imino, thiooxo, cyano, isocyano, amino, azido, nitro, hydroxyl, thiol, halo, aliphaticamino, heteroaliphaticamino, alkylamino, heteroalkylamino, arylamino, heteroarylamino, alkylaryl, arylalkyl, aliphaticoxy, heteroaliphaticoxy, alkyloxy, heteroalkyloxy, aryloxy, heteroaryloxy, aliphaticthioxy, heteroaliphaticthioxy, alkylthioxy, heteroalkylthioxy, arylthioxy, heteroarylthioxy, acyloxy, and the like, each of which may or may not be further substituted).

The terms "halide" and "halogen" as used herein refer to an atom selected from the group consisting of fluorine, chlorine, bromine, and iodine.

As used herein, "halogenated aliphatic" is a substituted aliphatic group as defined herein wherein one or more of the hydrogen atoms are independently replaced by a halogen, e.g., fluoride, bromide, chloride, or iodide. As used herein, "halogenated alkyl" is a substituted alkyl group as defined herein wherein one or more of the hydrogen atoms are independently replaced by a halogen, e.g., fluoride, bromide, chloride, or iodide. "Perhalogenated alkyl" is a subset of halogenated alkyl, and refers to an alkyl group wherein all of the hydrogen atoms are independently replaced by a halogen, e.g., fluoride, bromide, chloride, or iodide. In some embodiments, the halogenated alkyl moiety has 1 to 8 carbon atoms ("$C_{1-8}$ haloalkyl"). In some embodiments, the haloalkyl moiety has 1 to 6 carbon atoms ("$C_{1-6}$ haloalkyl"). In some embodiments, all of the halogenated aliphatic or alkyl halogenated hydrogen atoms are replaced with fluoro to provide a "perfluorinated aliphatic" or a "perfluorinated alkyl" group, respectively. Examples of halogenated alkyl groups include —$CF_3$, —$CF_2CF_3$, and —$CF_2CF_2CF_3$.

It will be appreciated that the above groups and/or compounds, as described herein, may be optionally substituted with any number of substituents or functional moieties. That is, any of the above groups may be optionally substituted. As used herein, the term "substituted" is contemplated to include all permissible substituents of organic compounds, "permissible" being in the context of the chemical rules of valence known to those of ordinary skill in the art. In general, the term "substituted" whether proceeded by the term "optionally" or not, and substituents contained in formulas of this invention, refer to the replacement of hydrogen radicals in a given structure with the radical of a specified substituent. When more than one position in any given structure may be substituted with more than one substituent selected from a specified group, the substituent may be either the same or different at every position. It will be understood that "substituted" also includes that the substitution results in a stable compound, e.g., which does not spontaneously undergo transformation such as by rearrangement, cyclization, elimination, etc. In some cases, "substituted" may generally refer to replacement of a hydrogen with a substituent as described herein. However, "substituted," as used herein, does not encompass replacement and/or alteration of a key functional group by which a molecule is identified, e.g., such that the "substituted" functional group becomes, through substitution, a different functional group. For example, a "substituted phenyl group" must still comprise the phenyl moiety and cannot be modified by substitution, in this definition, to become, e.g., a pyridine ring. In a broad aspect, the permissible substituents include acyclic and cyclic, branched and unbranched, carbocyclic and heterocyclic, aromatic and nonaromatic substituents of organic compounds. Illustrative substituents include, for example, those described herein. The permissible substituents can be one or more and the same or different for appropriate organic compounds. For purposes of this invention, the heteroatoms such as nitrogen may have hydrogen substituents and/or any permissible substituents of organic compounds described herein which satisfy the valencies of the heteroatoms. Furthermore, this invention is not intended to be limited in any manner by the permissible substituents of organic compounds. Combinations of substituents and variables envisioned by this invention are preferably those that result in the formation of stable compounds useful for the formation of an imaging agent or an imaging agent precursor. The term "stable," as used herein, preferably refers to compounds which possess stability sufficient to allow manufacture and which maintain the integrity of the compound for a sufficient period of time to be detected and preferably for a sufficient period of time to be useful for the purposes detailed herein.

Examples of substituents include, but are not limited to, halogen, azide, alkyl, aralkyl, alkenyl, alkynyl, cycloalkyl, hydroxyl, alkoxyl, amino, nitro, sulfhydryl, imino, amido, phosphonate, phosphinate, carbonyl, carboxyl, silyl, ether, alkylthio, sulfonyl, sulfonamido, ketone, aldehyde, ester, heterocyclyl, aromatic or heteroaromatic moieties, —CF3, —CN, aryl, aryloxy, perhaloalkoxy, aralkoxy, heteroaryl, heteroaryloxy, heteroarylalkyl, heteroaralkoxy, azido, amino, halide, alkylthio, oxo, acylalkyl, carboxy esters, carboxamido, acyloxy, aminoalkyl, alkylaminoaryl, alkylaryl, alkylaminoalkyl, alkoxyaryl, arylamino, aralkylamino, alkylsulfonyl, carboxamidoalkylaryl, carboxamidoaryl, hydroxyalkyl, haloalkyl, alkylaminoalkylcarboxy, aminocarboxamidoalkyl, cyano, alkoxyalkyl, perhaloalkyl, arylalkyloxyalkyl, and the like.

The following examples are intended to illustrate certain embodiments of the present invention, but do not exemplify the full scope of the invention.

Example 1

The following example describes controlling the morphology of a LiF coating on a carbon substrate.

The reaction conditions of the fluorine-gas reduction can be tuned to precisely control the morphology of the resulting LiF coating. GDL was chosen as a substrate in order to have suitable visual contrast to examine the morphology of the LiF coating. The $SF_6$ reduction reaction was conducted in a Swagelok-type electrochemical cell, with Li metal as anode, GDL as cathode, and DMSO as electrolyte solvent. The $SF_6$ gas was introduced into the electrochemical cell by purging $SF_6$ gas into the headspace and pressurizing to ~1.6 bar. The current density and capacity were normalized to the geometric area of GDL.

Figure 3A:
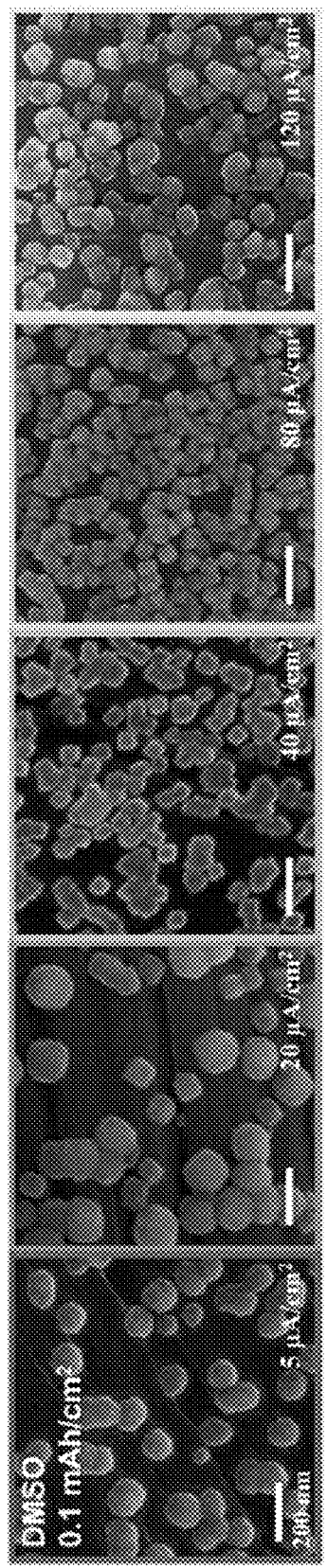
FIG. 3A shows, according to some embodiments, scanning electron microscopy (SEM) images of LiF morphologies obtained at low-discharge capacity in the presence of sulfur hexafluoride ($SF_6$) as a function of current density rate.
Figure 3B:
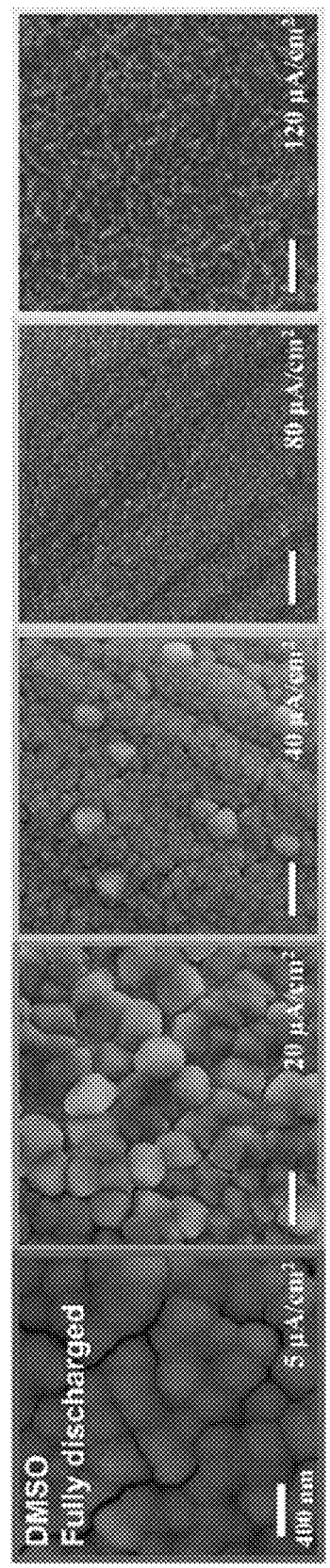
FIG. 3B shows, according to some embodiments, SEM images of various LiF morphologies obtained at full-discharge capacity in the presence of $SF_6$ as a function of current density rate.

The morphologies of the LiF coating layers were investigated using SEM. Low-capacity (e.g., 0.1 mAh/cm$^2$) morphologies as a function of rate are shown in FIG. 3A, with full-capacity morphologies as a function of rate shown in FIG. 3B. The low-capacity morphology reflects the influence of rate on the nucleation process. As the current density increased, the number of particles per unit area increased significantly, together with a much smaller average particle size and larger coverage of the carbon surface are. Meanwhile, fully-discharged electrodes generally showed flat and uniformly-covered surfaces, with decreasing average particle sizes at higher rates.

Figure 4A:
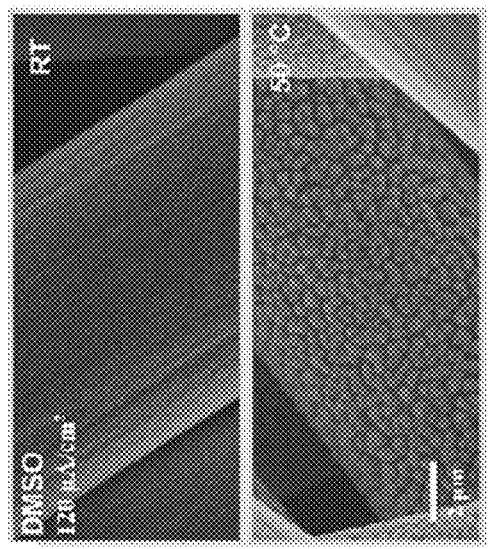
FIG. 4A shows, according to some embodiments, SEM images of various LiF morphologies obtained at full-discharge capacity in the presence of $SF_6$ at room temperature (RT) and at 50° C.
Figure 4B:
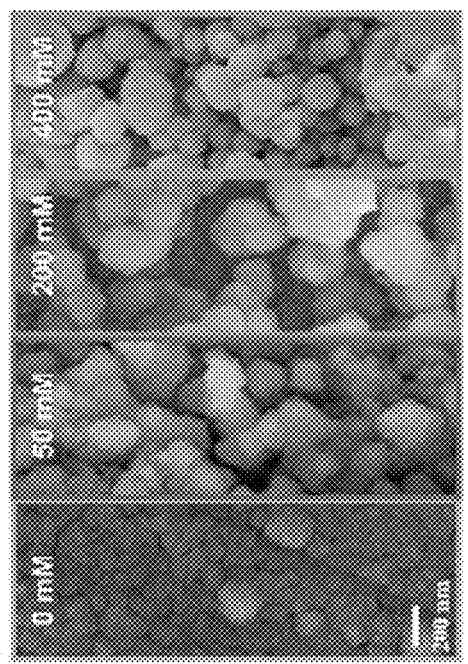
FIG. 4B shows, according to some embodiments, SEM images of various LiF morphologies obtained at full-discharge capacity in the presence of $SF_6$ and different concentrations of fluoride-binding agent.

In addition, the shape and distribution of the LiF coating was controlled by varying other discharge conditions, resulting in changes to the LiF coating morphology. For example, discharge at higher temperatures yielded smooth LiF particles with larger average particle size. As shown in FIG. 4A, at 120 microamperes/cm$^2$, the LiF coating formed at room temperature exhibited an average particle sizes of ~48 nm. In contrast, at 50° C., a uniform LiF coating that covered the carbon fibers was observed, with a substantially larger average particle size (~350 nm) with rounded edges. In addition, a three-dimensional LiF coating with a porous structure (rather than a two-dimensional, flat LiF coating) was formed by adding a fluoride-binding agent, tris(pentafluorophenyl)borane (TPFPB), into the electrolyte, as shown in FIG. 4B.

Example 2

The following example describes the characterization of a LiF coating on a transition metal oxide.

Figure 5A:
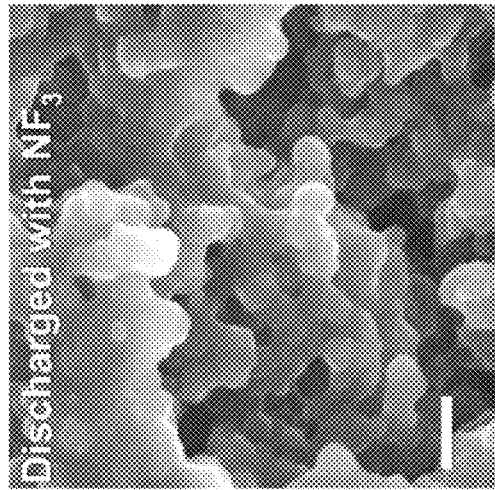
FIG. 5A shows, according to some embodiments, a SEM image of a pristine electrode.
Figure 5B:
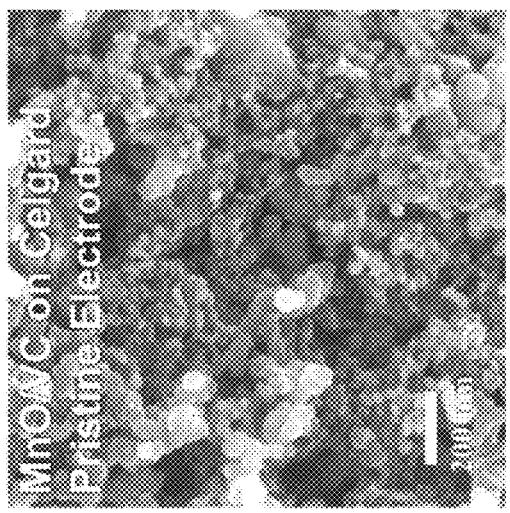
FIG. 5B shows, according to some embodiments, a SEM image of an electrode fully discharged in a Li cell containing nitrogen trifluoride ($NF_3$)
Figure 5C:
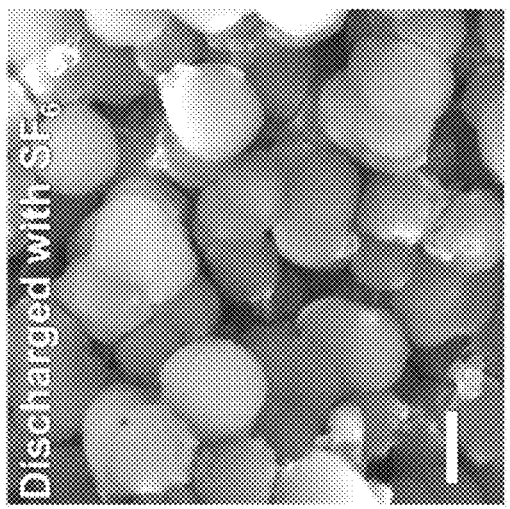
FIG. 5C shows, according to some embodiments, a SEM image of an electrode fully discharged in a Li cell containing $SF_6$.
Figure 5E:
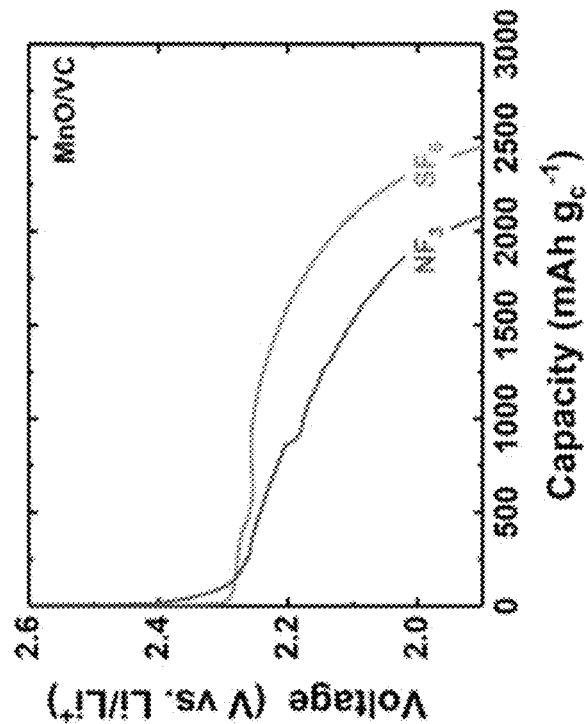
FIG. 5E shows, according to some embodiments, galvanostatic discharge profile for Li—$SF_6$ and Li—$NF_3$ cells.
Figure 5D:
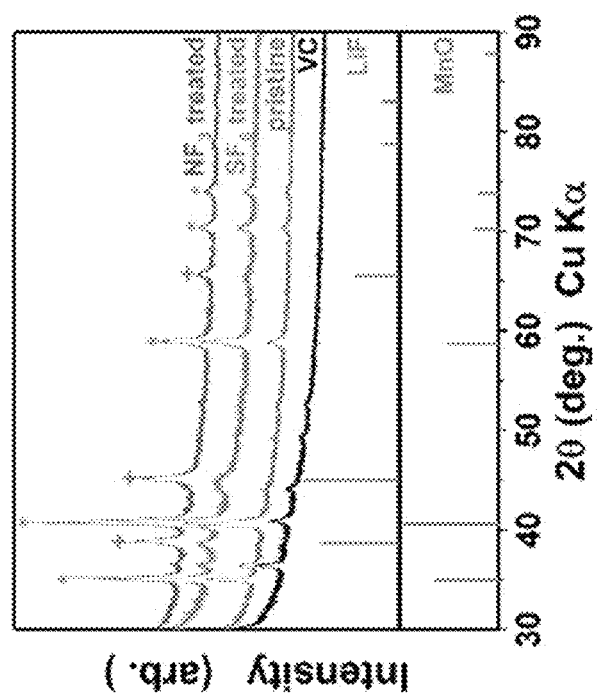
FIG. 5D shows, according to some embodiments, X-ray diffraction (XRD) data for the electrodes shown in FIGS. 5A-5C.

Manganese oxide (MnO) was chosen as the substrate for the LiF coating because MnO/LiF composites have the potential to trigger electrochemical splitting of LiF (e.g., due to the oxidation of Mn during charge) and deliver a high capacity. MnO particles were mixed with Vulcan carbon on Celgard and discharged in Li cells containing either $NF_3$ or $SF_6$. As shown in FIGS. 5A-5C, a uniform coating was observed on cathodes discharged in both gases. XRD data confirmed that the products formed in both cases were mainly LiF, as shown in FIG. 5D. As is shown in FIG. 5D, LiF is the only crystallized phase in discharge products that is detectable from XRD. Typical galvanostatic discharge profiles were observed, as shown in FIG. 5E. The discharge potentials (~2.3 V for $SF_6$ cells and ~2.2 V for $NF_3$ cells) are similar to that using only VC as electrodes, indicating that the existence of MnO in cathode substrate will not drastically affect the reduction behavior of $SF_6$ and $NF_3$.

Figure 6A:
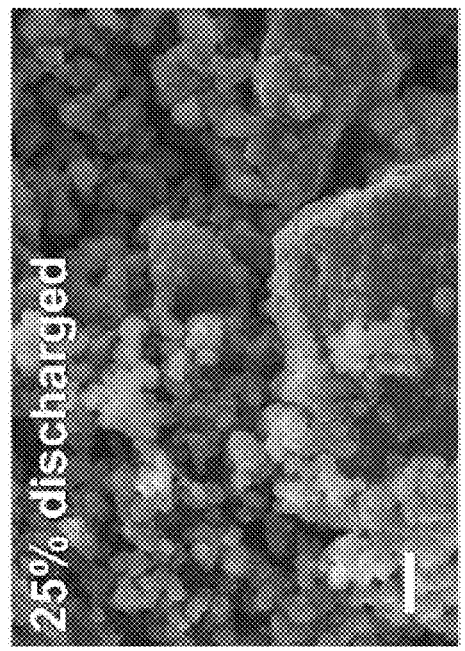
FIG. 6A shows, according to some embodiments, a SEM image of a pristine electrode prior to discharging in a Li cell.
Figure 6B:
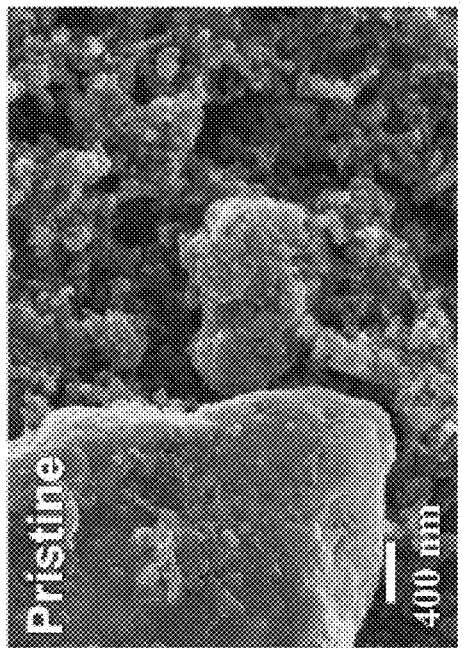
FIG. 6B shows, according to some embodiments, a SEM image of an electrode discharged to 25% capacity in the presence of $SF_6$.
Figure 6C:
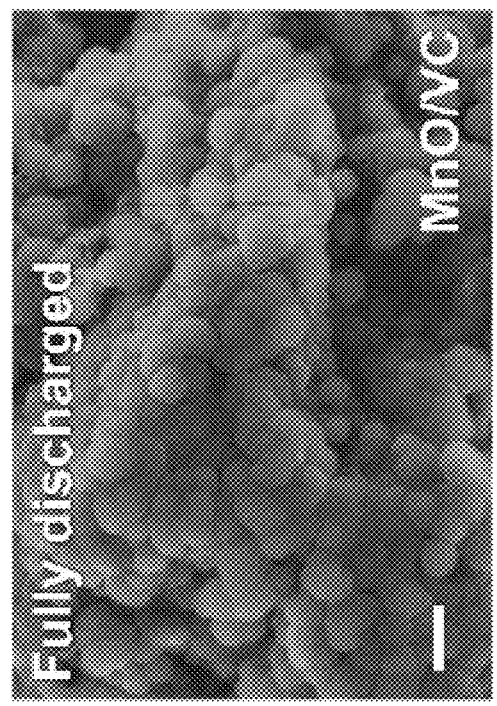
FIG. 6C shows, according to some embodiments, a SEM image of an electrode discharged to full capacity in the presence of $SF_6$.

Despite the difference in conductivity between MnO and the carbon additive, LiF uniformly coated both materials. The conductivity difference between MnO and Vulcan carbon induced preferential deposition of LiF at the early stage of discharge. The morphology of the MnO/Vulcan carbon electrode at different states of discharge was evaluated by SEM and is shown in FIGS. 6A-6C. As shown in FIG. 6B, LiF mainly formed on Vulcan carbon (smaller particles) instead of MnO/Vulcan carbon agglomerates (larger particles). When the cell was fully discharged, however, the conductivity effect no longer dominated, as the LiF coating was uniformly formed on the particles, as shown in FIG. 6C.

Example 3

The following example describes the utilization of LiF-coated MnO as a cathode material for Li-ion batteries.

Figure 7A:
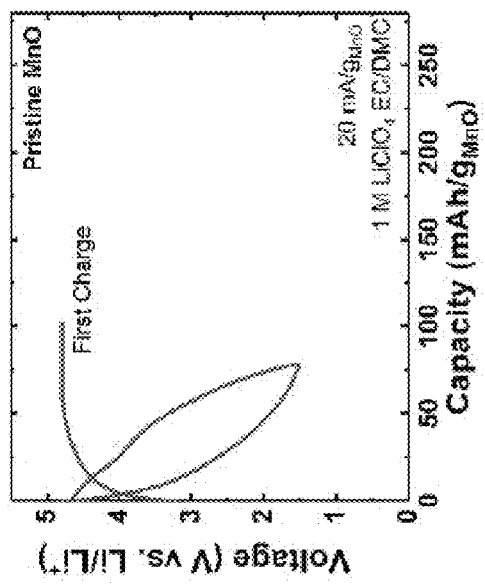
FIG. 7A shows, according to some embodiments, an electrochemical profile of the first charge and cycle for a pristine manganese(II) oxide (MnO)/Vulcan carbon electrode.

A promising application of the LiF-coated materials is utilization as cathodes in Li-ion batteries. Pristine MnO, when used as a cathode, yielded negligible capacity (e.g., <80 mAh/$g_{MnO}$) on discharge due to the lack of built-in Li host sites. See, for example, FIG. 7A In addition, charging did not alter the pristine MnO structure, but instead showed only capacitive-like charging behavior. In contrast, LiF-coated MnO has a built-in source of fluoride. Upon charging, the LiF can be electrochemically split, with Li migrating to the anode side, and F then available to be electrochemically incorporated in the MnO as the oxidation state of Mn increases during charge. Indeed, upon first charge of the LiF-coated material, a significant voltage plateau and capacity were observed that were not present without LiF, indicative of the LiF splitting reaction. Upon the subsequent discharge, the modified MnO material exhibited attractive electrochemical performance: a capacity of 276 mAh/$g_{MnO}$ was achieved, with an average discharge of 2.65 V (see FIG. 8A).

Figure 7B:
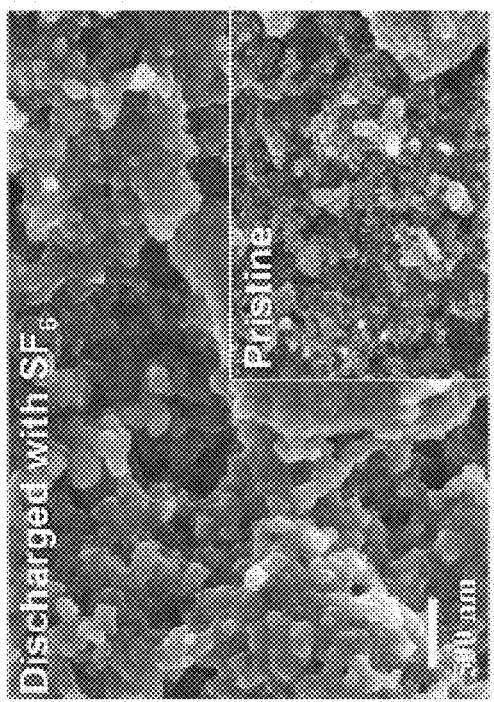
FIG. 7B shows, according to some embodiments, a SEM image of an electrode fully discharged in a Li cell containing $SF_6$ with 1 M $LiClO_4$/tetraethylene glycol dimethyl ether (TEGDME) electrolyte.
Figure 7D:
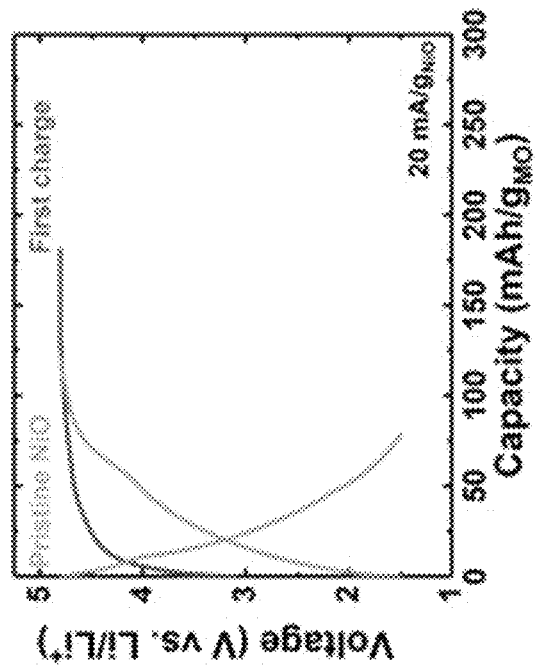
FIG. 7D shows, according to some embodiments, an electrochemical profile and the first charge and cycle for a pristine nickel(II) oxide (NiO)/Vulcan carbon electrode.
Figure 7E:
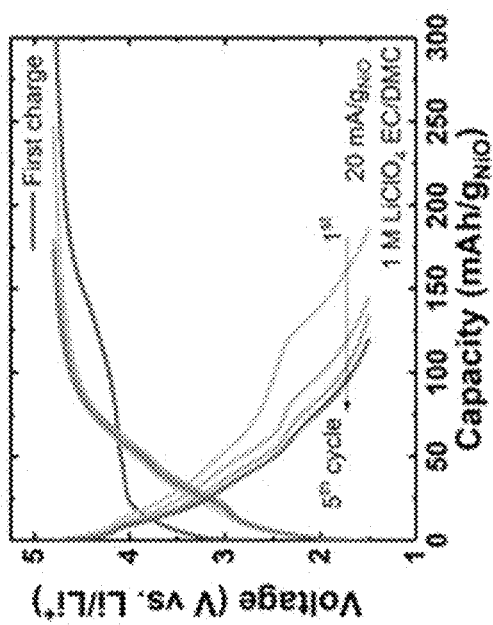
FIG. 7E shows, according to some embodiments, an electrochemical profile of the first charge and cycling of LiF—NiO/Vulcan carbon electrode.
Figure 7C:
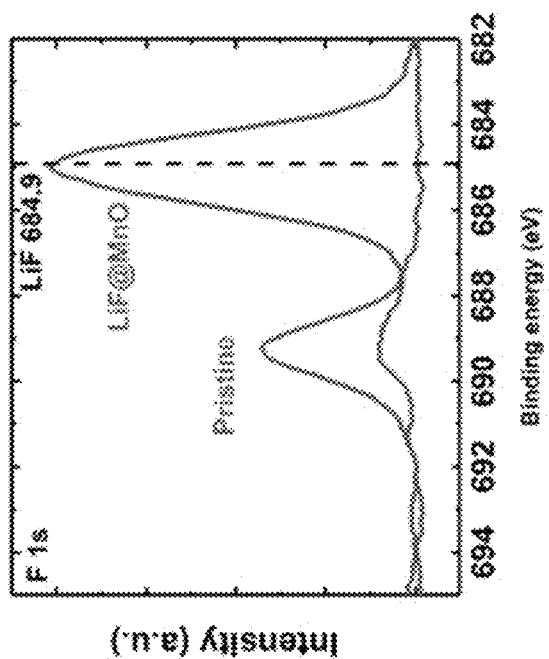
FIG. 7C shows, according to some embodiments, F is X-ray photoelectron spectroscopy (XPS) spectra of the electrode shown in FIG. 7B after discharge.

The LiF coating was pre-formed by a "standard" discharge protocol: discharging the Li cell containing $SF_6$ with 0.1 M $LiCiO_4$/TEGDME electrolyte at 100 mA/$g_c$. As is shown in FIG. 7B, a LiF coating layer with an average particle size of ~71 nm (based on measurements of 30 particles) was uniformly formed on the surface of the electrode prior to charge. Note that no LiF peaks were detected by XRD, probably due to the nano-crystallinity of the LiF formed, therefore X-ray photoelectron spectroscopy (XPS) was conducted to identify the composition of the coating layer. From the F is spectra (FIG. 7C), strong LiF peak at 684.9 eV were observed for the discharged electrode. The existence of LiF was also confirmed from $^{19}$F nuclear magnetic resonance (NMR) spectroscopy.

The discharged cathode was then extracted from the Li—$SF_6$ cell, rinsed, dried, and re-assembled in a new Li-ion battery. The non-fluorinated salt $LiClO_4$ (1 M) was used as an electrolyte in a v:v=1:1 mixture of EC/DMC to eliminate other fluorine sources and influences of electrolyte solvent decomposition. Unless otherwise noted, the cycle test for the Li-ion batteries was conducted using a "standard" cycle protocol, that is: the first charge (activation process) consists of two parts, constant current (CC) charge at 20 mA/$g_{MnO}$ to 4.8 V followed by a constant voltage (CV) charge with a cutoff of 10 mA/$g_{MnO}$. After the first charge, the cell was galvanostatically cycled between 1.5-4.8 V at 20 mA/$g_{MnO}$.

The resulting materials demonstrated expected cycle behavior (e.g., capacity and voltage) as compared to conventional LiF/MnO nanocomposites prepared by ball-milling techniques, indicating successful fluorination of MnO. However, regarding conventional LiF/MnO nanocomposites prepared by ball-milling techniques, it was found that a particle size of MnO below 10 nm was necessary for successful fluorine incorporation, and 48 hours of high-energy ball-milling was needed. In contrast, the average particle size of the MnO used for in the present example was ~100 nm, as determined by high resolution transmission electron microscopy (TEM), which is more suitable for use in practical battery cathodes where high tap (volumetric) energy densities are needed. Therefore, the stringent average particle size limitation of MnO in conventional ball-milling techniques is no longer critical using the methodologies described herein, and thus the highly energy-intensive ball-milling process can be avoided.

A similar LiF-formation strategy was shown to be applicable for NiO, as well. Compared with the pristine NiO, where only limited capacity can be obtained (<80 mAh/$g_{NiO}$, FIG. 7D), LiF—NiO exhibited a much larger discharge capacity during the first cycle (~185 mAh/$g_{NiO}$, FIG. 7E).

Example 4

The following example describes the electrochemical performance of LiF coated on a MnO/Vulcan carbon composite cathode.

Figure 8B:
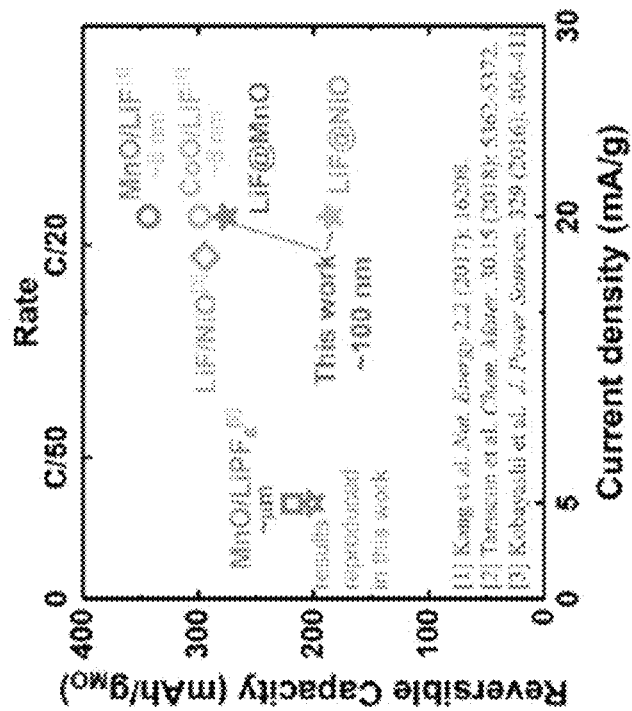
FIG. 8B shows, according to some embodiments, a Ragone plot of a LiF—MnO/Vulcan carbon electrode as compared to various LiF-metal oxides prepared by conventional methods.
Figure 8A:
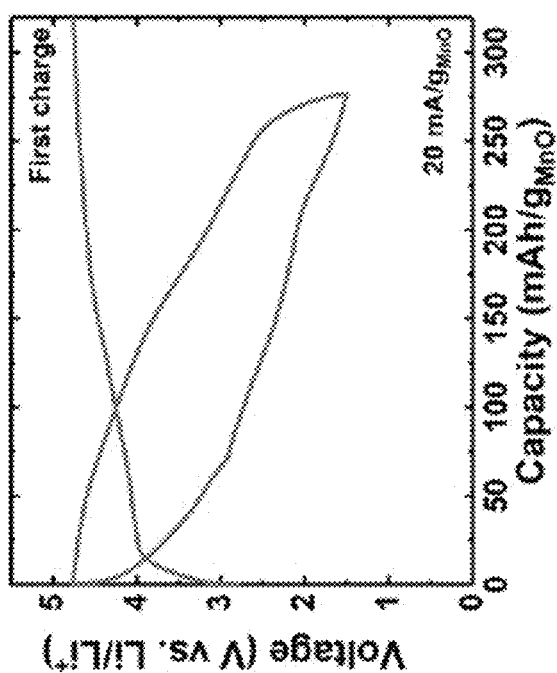
FIG. 8A shows, according to some embodiments, an electrochemical profile of the first charge and cycle for a LiF—MnO/Vulcan carbon electrode.

Using the methods described herein, LiF was coated on an electrode containing 55 wt. % of MnO and 35 wt. % of Vulcan carbon. A discharge capacity of 276 mAh/$g_{MnO}$ was measured for the electrode, as shown in FIG. 8A. The performance was compared with previous studies on LiF/metal oxide systems, as shown in FIG. 8B (capacity normalized to the weight of metal oxides). As described above in reference to Example 3, although the capacity of the LiF—MnO/Vulcan carbon electrode is slightly lower than the MnO/LiF composite system, a more practical particle size (e.g., ~100 nm) was used for LiF—MnO/Vulcan carbon, which is much larger than the 8 nm particles of the MnO/LiF composite system. In addition, the MnO/LiF composite system was subjected to high energy ball-milling for 48 hours to reduce the particle size, which is not necessary using the methods described herein.

Figure 9A:
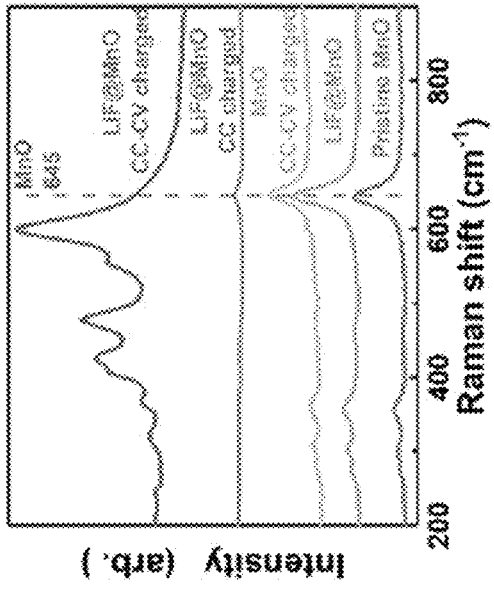
FIG. 9A shows, according to some embodiments, first charge and discharge profiles of a LiF—MnO/Vulcan carbon electrode with various charge procedures.

The lattice and electronic structure change of MnO was investigated in order to understand the reaction mechanism during the activation (e.g., first charge) process using constant voltage (CV) and constant charge (CC). The 4.8 V CV was the major step for Mn redox and F-incorporation in MnO. As is shown in FIG. 9A, lower voltage (4.7 V CC-CV) or lack of the CV (4.8 V CC) both resulted in insufficient activation of MnO, with limited capacity delivered in the subsequent discharge.

Figure 9B:
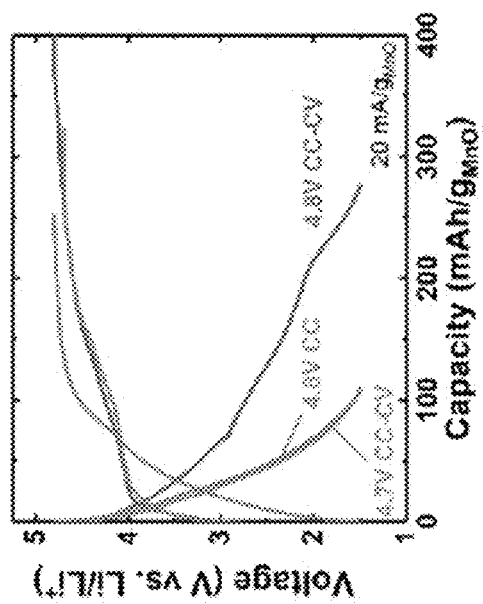
FIG. 9B shows, according to some embodiments, Raman spectra of a LiF—MnO/Vulcan carbon electrode before and after various charge procedures as compared to pristine MnO.

Consistent with the electrochemical test results, the structure of MnO lattice was found to change during the 4.8 V CV step. As shown in FIG. 9B, upon CC to 4.8 V, negligible structural change in MnO lattice was detected from Raman. However, after 4.8 V CV, a significant left shift of MnO peak (from ~645 $cm^{-1}$ to 600 $cm^{-1}$) was observed. The decreased frequency is reflective of the increased bond lengths, which may be attributed to the increased concentration of defects. The multiple peak position indicates various bonding environments of Mn, which may be attributed to the introduction of $F^-$ ions in the MnO lattice and the lattice distortion caused by the Jahn-Teller effect of $Mn^{3+}$. XRD also confirmed that MnO lattice structure starts to change during the CV charge step.

Figure 9C:
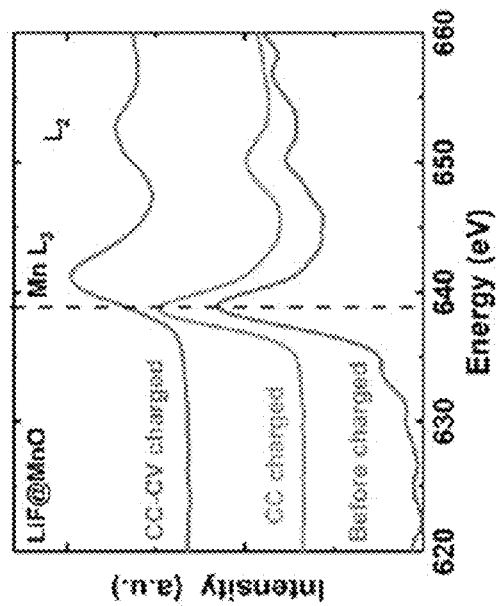
FIG. 9C shows, according to some embodiments, electron energy loss spectroscopy (EELS) of Mn L-edge for a LiF—MnO/Vulcan carbon electrode before and after various charge procedures.

The Mn valence state was also found to change during CV. As is shown in the EELS results (see FIG. 9C), the Mn L-edge showed negligible change after CC. However, after CC-CV, the Mn $L_3$ peak shifted to higher energy (from 639 eV to 641 eV), with a significant decrease in the ratio of the $L_3/L_2$ peak area, indicating the oxidization of Mn ions.

Figure 10B:
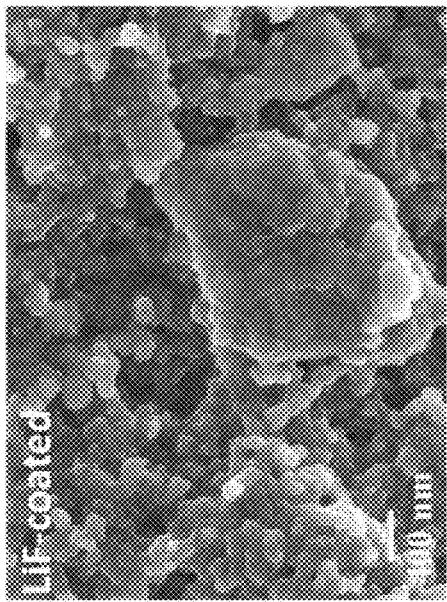
FIG. 10B shows, according to some embodiments, a SEM image of a LiF—MnO/Vulcan carbon electrode before charge.
Figure 10A:
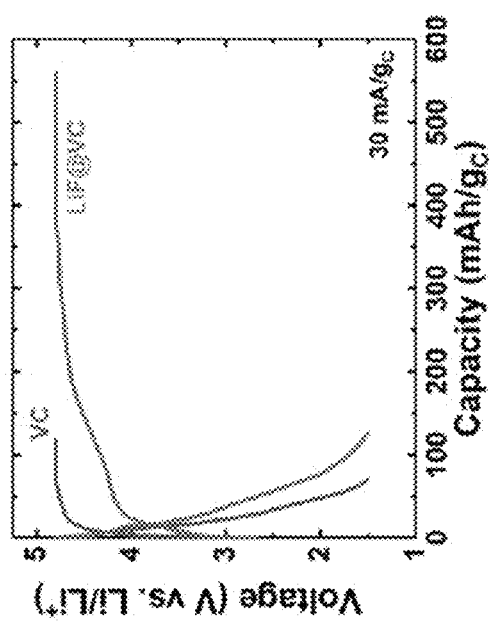
FIG. 10A shows, according to some embodiments, electrochemical profiles of the first two cycles of Vulcan carbon and a LiF-Vulcan carbon electrode.
Figure 10C:
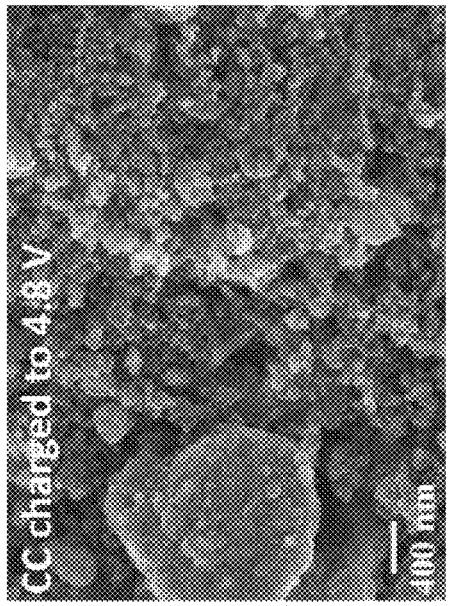
FIG. 10C shows, according to some embodiments, a SEM image of a LiF—MnO/Vulcan carbon electrode after charge.

Knowing that the reaction between LiF and MnO mainly occurs at the 4.8 V CV step, it was hypothesized that the reaction during CC could be related in part to the reaction between LiF and Vulcan carbon. The participation of the LiF coating in the reaction during CC was investigated using both electrochemical and morphology characterization. As is shown in FIG. 10A, a pristine Vulcan carbon electrode exhibited only a capacitive behavior, while a LiF-Vulcan carbon electrode exhibited a similar charge profile as that for the LiF—MnO/Vulcan carbon, with a voltage plateau at ~4 V. During discharge, the LiF-Vulcan carbon delivered a capacity of ~125 mAh/g, higher than that for the uncoated Vulcan carbon (~60 mAh/g). In addition, after CC, the morphology of the LiF coating layer changed significantly (see FIG. 10B and FIG. 10C), indicating that LiF reacted during the process.

To confirm that Vulcan carbon could contribute to CC capacity, the weight ratio of Vulcan carbon in the MnO electrode was varied and the charge capacity compared. Using the methods described herein, LiF coatings were formed on MnO electrodes with different carbon ratios (the discharge capacity were all approximately ~1100 mAh/$g_c$). The only exception was for the electrode containing 20 wt. % Vulcan carbon, where a lower rate (50 mA/$g_c$) was used to form LiF.

Figure 11B:
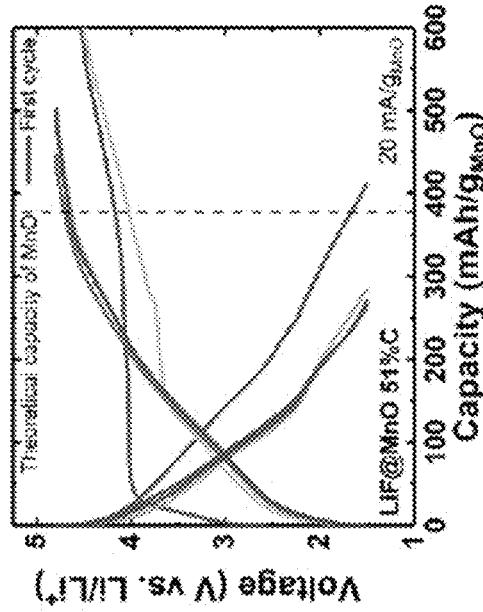
FIG. 11B shows, according to some embodiments, the cycle profile of a LiF—MnO/Vulcan carbon electrode containing 51 wt. % Vulcan carbon.
Figure 11A:
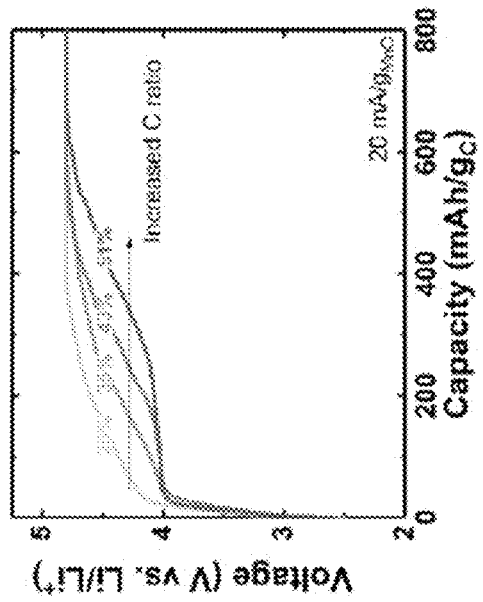
FIG. 11A shows, according to some embodiments, the first charge of a LiF—MnO/Vulcan carbon electrodes containing various amounts of Vulcan carbon.

As shown in FIG. 11A, an increased carbon ratio resulted in a longer 4 V plateau. However, the total CC capacities (to 4.8 V) were similar (~550 mAh/$g_c$) for the various carbon electrodes, except for the electrode containing 20 wt. % Vulcan carbon, which may be attributed to the larger size and smaller amount of LiF particles. The CC process is independent with MnO, but closely related with LiF and secondarily carbon. Interestingly, the charge capacities and the first discharge capacity of the electrode containing 51 wt. % Vulcan carbon were higher than 400 mAh/$g_{MnO}$ (see FIG. 11B), which is higher than the theoretical capacity of MnO (377 mAh/g), suggesting that the capacity was not only from Mn redox, but other reactions, for example a LiF-carbon reaction or a parasitic reaction, might also contribute to the excess capacity.

Figure 11C:
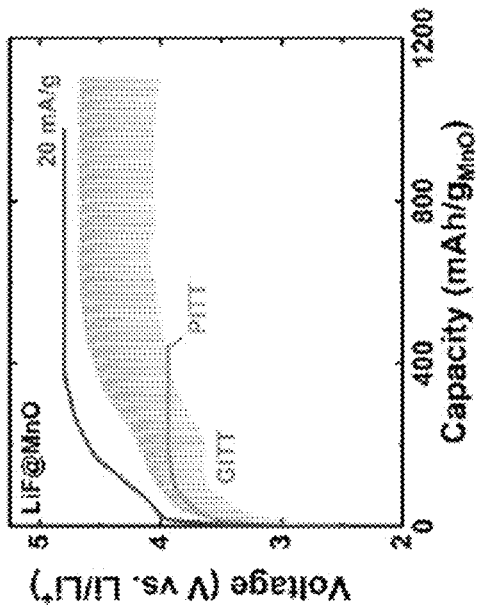
FIG. 11C shows, according to some embodiments, potentiostatic intermittent titration technique (PITT) and galvanostatic intermittent titration technique (GITT) profiles of the first charge of a LiF—MnO/Vulcan carbon electrode.

A potentiostatic intermittent titration technique (PITT) and galvanostatic intermittent titration technique (GITT) were conducted to probe the thermodynamic potential of the LiF splitting and F-incorporation process (see FIG. 11C). The PITT profile exhibited a plateau at 4 V during the first charge, indicating the electrochemically splitting of at least a portion of the coating (e.g., LiF) on carbon occurred at this voltage. The GITT profile exhibited a similar shape as the standard charge profile (20 mA/g), but with a long high voltage plateau at 4.7 V. The structural change of MnO occurs at the CV step, thus the thermodynamic voltage limitation for $F^-$ incorporating into MnO is 4.7 V.

Example 5

The following example describes the mechanism of electrode halogenation during cell cycling.

With the understanding that the MnO oxidation mainly occurs at the 4.8 V CV charge step, the reaction mechanism during the first CC charge, which contributes a large capacity (>300 mAh/$g_{MnO}$), was investigated further. The effect of total LiF coating amount was investigated by changing the carbon content in the electrode. As mentioned above and shown in FIG. 11A, the voltage plateau at ~4 V during CC charge is significantly lengthened as the cathode carbon content increased. Notably, similar CC charge profile was also observed for cathodes without MnO (i.e., the LiF-coated Vulcan carbon). The LiF-coated VC exhibits a voltage plateau at ~4 V, in contrast with the pristine VC electrode which only demonstrates a capacitive behavior. These findings indicate that the CC charge capacity, especially the 4 V plateau, may originate in part from the decomposition of the LiF coating layer.

Figure 11E:
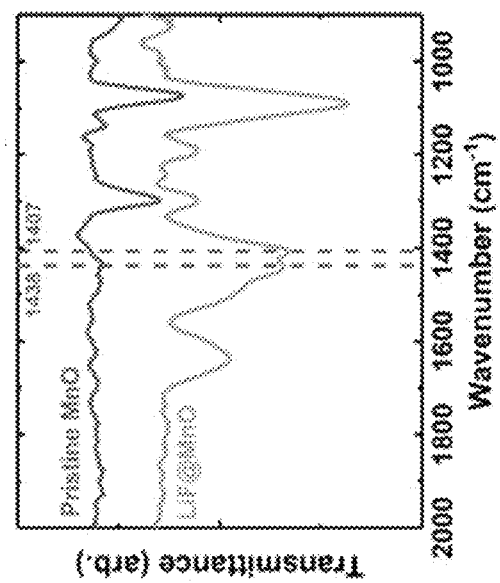
FIG. 11E shows, according to some embodiments, attenuated total reflectance infrared (transmittance) spectra of a pristine electrode and the as-synthesized LiF—MnO/Vulcan carbon electrode.
Figure 11D:
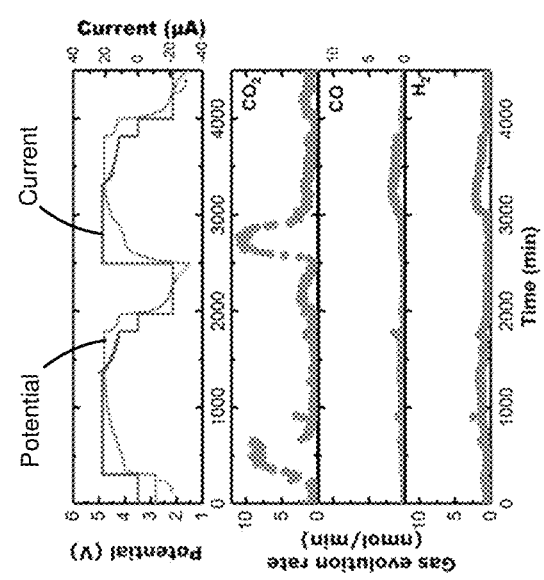
FIG. 11D shows, according to some embodiments, time-dependent online gas evolution curves in accordance with the electrochemical charge/discharge profile for a LiF—MnO/Vulcan carbon cell.

To provide additional insight into the oxidation mechanism of the coating layer, online gas chromatography measurements were conducted to monitor the gas species generated during cycling. The gas evolution rates were measured periodically every 15 minutes as shown in FIG. 11D. It was observed that there was a significant amount of $CO_2$ formed when the potential reached ~4 V. One possible reaction that explains the generation of $CO_2$ is $Li_2CO_3$ decomposition. $Li_2CO_3$ is a common contamination species for Li-ion cathodes, which can be induced from multiple sources, such as cathode materials getting in contact with $CO_2$ during storage, or excess $Li_2CO_3$ being added during cathode synthesis. The decomposition potential of $Li_2CO_3$ was shown to be different in different cathodes, but usually within the range of 3.8-4.2 V, which is similar to what we observed here (~4V). The existence of trace amount of $Li_2CO_3$ in the LiF coating was confirmed by attenuated total reflectance infrared (ATR-IR) spectroscopy (FIG. 11E), the origin of which might be attributed to electrolyte decomposition during $SF_6$ discharge. Similarly, the formation of $Li_2CO_3$ due to side reactions during discharge was also observed for Li—$O_2$ batteries with ether-based electrolyte.

The generation of $CO_2$ was stopped after passing the 4 V plateau, instead, CO and $H_2$ start to form under active current flow, indicating that the gas formation reaction is electrochemically triggered. Since the electrolyte solvent is the only cell component that contains hydrogen, therefore a major source for the gas evolution must be the electrolyte decomposition, which can be induced by the instability of either cathode- or anode-electrolyte interfaces. Two different reactions were considered to explain the gas generation process, that is one gas (CO) comes from the anode side reaction while another ($H_2$) comes from the cathode side reaction. There are several different reactions between EC and Li that can generate CO, considering that no hydrocarbon was observed, thus one possible pathway is EC decomposition to CO and alkoxy (—$OCH_2CH_2O$—). As for the cathode side, one possible reaction that generates $H_2$ is by fluoridation of EC, forming fluoroethylene carbonate (FEC) (i.e., EC+LiF→FEC+½ $H_2$+Li). This hypothesis is reasonable because FEC was detected by NMR from the electrolyte of the CC-CV charged LiF—MnO cell. Similarly, when using ball-milled LiF/MnO as cathode, CO and $H_2$ are also generated during charge, with FEC detected from the electrolyte of the charged cell. This indicates that the electrolyte decomposition (fluorination) is a general characteristic of this LiF/MnO system, regardless of the LiF morphology in the cathodes. One possible explanation is that the LiF decomposition potential is reduced (from ~6 V) to less than 4.8 V due to the nano-crystallinity, thus "free" F-ions can be generated at this potential. However, to drive the F-ions into MnO lattice to achieve MnO fluorination, high polarization is needed (~4.8 V) which is also accompanied with relatively sluggish kinetics (F-diffusion in the solid phase is needed). This provides opportunities for the F-ions to react with other cell components, such as electrolyte solvent, which is directly in contact with the as-generated F-ions. This process occurs due to the LiF splitting and/or the fluorination potential of MnO, but could be avoided using other systems with lower LiF splitting potentials.

Example 6

The following example describes the formation of a LiF coating on a LiMn$_2$O$_4$ spinel structure.

Figure 12B:
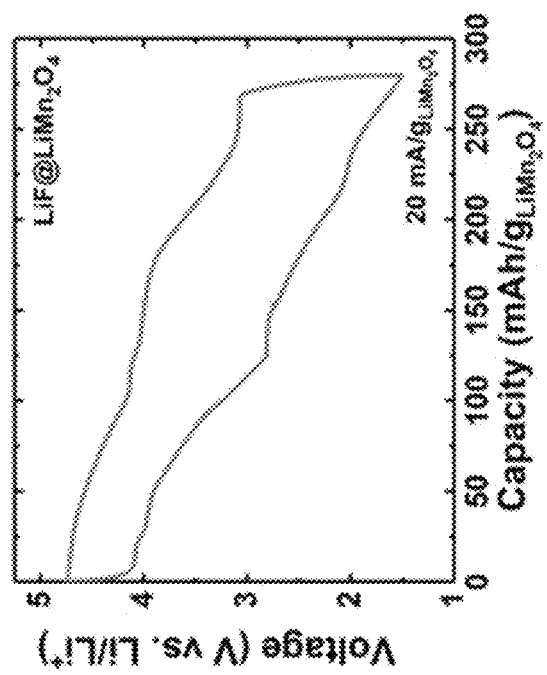
FIG. 12B shows, according to some embodiments, an electrochemical profile of the first cycle of a LiF—$LiMn_2O_4$/Vulcan carbon electrode.
Figure 12A:
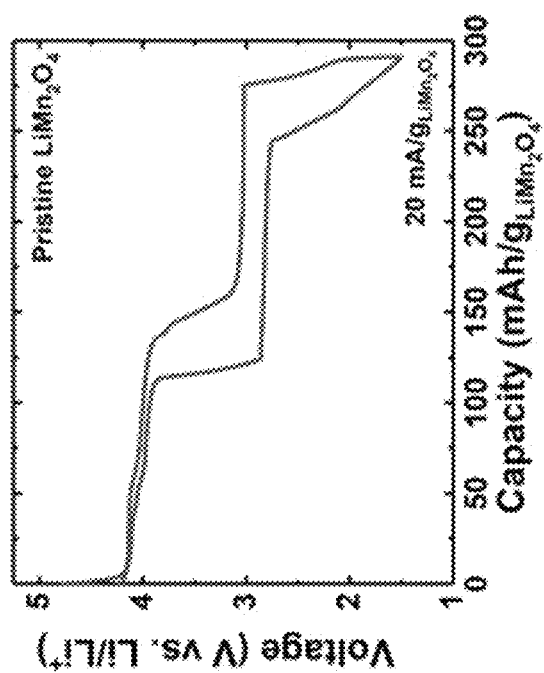
FIG. 12A shows, according to some embodiments, an electrochemical profile of the first cycle of a pristine $LiMn_2O_4$/Vulcan carbon electrode.

LiMn$_2$O$_4$ is a commercialized Li-ion cathode, which contains a three-dimensional Li diffusion network that allows fast Li diffusivity and also has advantageous such as low-costs, environmental friendliness, etc. As shown in FIG. 12A, two distinct voltage plateaus can be observed in the discharge profile of pristine LiMn$_2$O$_4$: a high voltage plateau at ~4.1 V and a low voltage plateau at ~2.8 V, the latter is accompanied with a first-order transition from the cubic phase to a tetragonal symmetry (due to the Jahn-Teller distortion of Mn$^{3+}$ ions). The phase transformation resulted in large structural instability and limited cyclability, therefore only the first (high) voltage plateau is being used in commercialized cells, which corresponds to an achievable capacity of ~120 mAh/g and a specific energy density of ~490 Wh/kg. LiF—LiMn$_2$O$_4$ was synthesized using the "standard" discharge protocol, and cycled the material following the "standard" cycle protocol, the electrochemical profile of which is shown in FIG. 12B. Instead of two voltage step, the LiF—LiMn$_2$O$_4$ exhibited a slopping discharge profile spanning from 4.1 V to 1.5 V. The slopping voltage profile indicates a less stringent boundary for the first-order transformation, which can probably be attributed to successful F-incorporation. Notably, the slopping voltage change is more suitable for practical application compared with two separated voltage steps, meaning it is possible to utilize the relatively low voltage part (i.e., <3V), resulting in a total energy density of ~810 Wh/kg.

Example 7

The following example described the formation of an LiF coating on graphite.

Figure 18B:
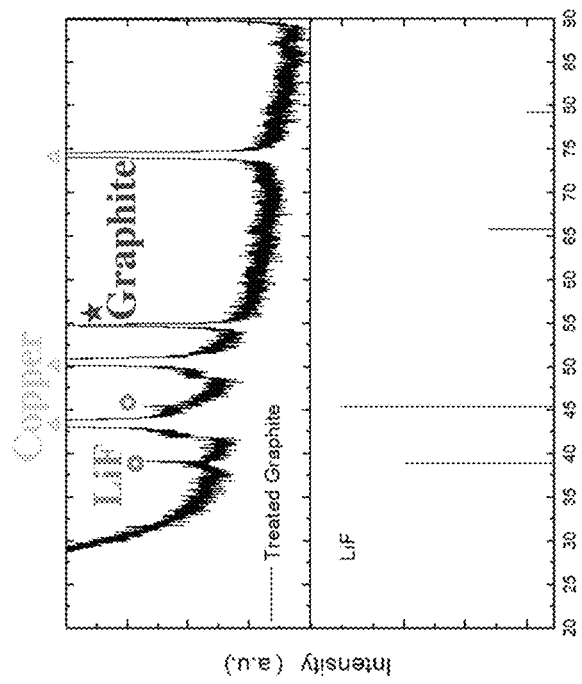
FIG. 18B shows, according to some embodiments, XRD data of LiF-graphite.
Figure 18A:
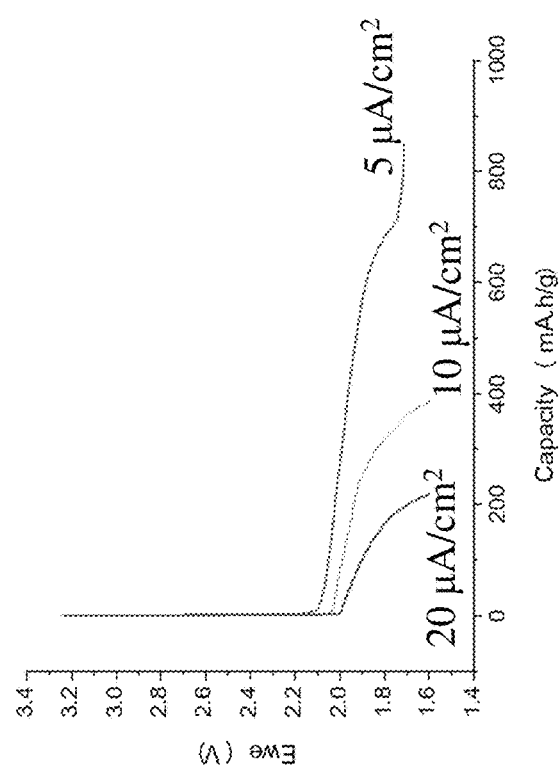
FIG. 18A shows, according to some embodiments, galvanostatic discharge profile for Li—$SF_6$ on graphite.
Figure 18C:
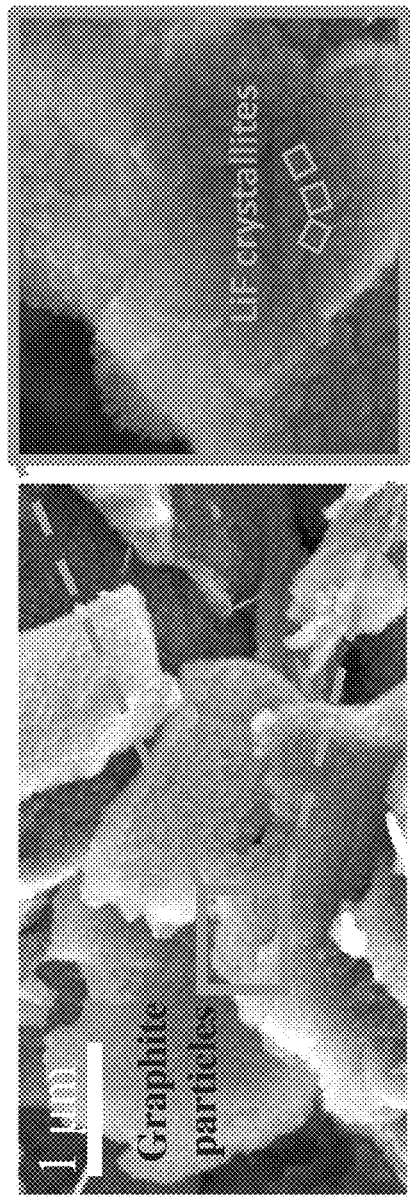
FIG. 18C shows, according to some embodiments, an SEM image of LiF-graphite.
Figure 18D:
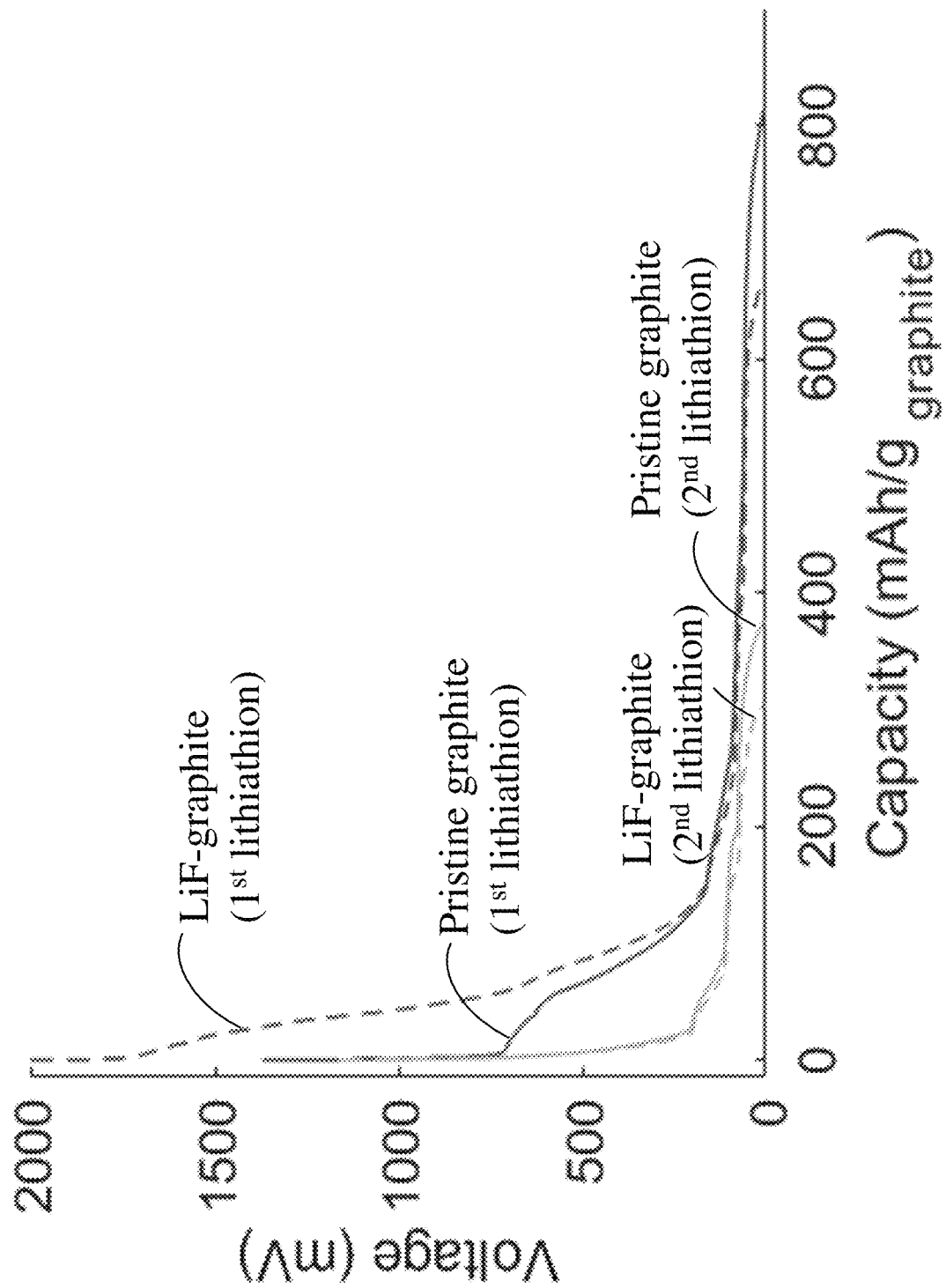
FIG. 18D shows, according to some embodiments, an electrochemical profile of the first cycle of a pristine graphite electrode compared to LiF-graphite.

As shown in FIG. 18A, LiF was formed on a graphite cathode during discharge of a Li-graphite electrochemical cell at several current densities in the presence of SF$_6$. The presence of LiF was confirmed using XRD and SEM, as shown in FIGS. 18B and 18C, respectively. After formation of LiF on graphite, the graphite was then lithiated during cycling, as shown in FIG. 18D.

Example 8

The following example describes the formation of LiF coatings on substrates using fluorinated liquids.

Due to the limited polarization of the fluorinated liquid C$_6$F$_{13}$I, all the electrolyte salts investigated (LiClO$_4$, LiPF$_6$, LiBF$_4$, LiTFSI, LiCF$_3$SO$_3$, and LiNO$_3$) showed negligible solubility in pure C$_6$F$_{13}$I, making it necessary to use a co-solvent to improve the salt solvation in the Li—C$_6$F$_{13}$I battery. Therefore, two parameters were determined before the detailed investigation of the cell performances: The Li stability in the electrolyte and the influence of the co-solvent species.

The electrochemical active fluorinated liquid species (C$_6$F$_{13}$I) is both in the electrolyte and in contact with Li metal, thus it is critical to prevent the chemical reaction between the electrolyte and Li. As for the co-solvent, DMSO was used because it is known to be more reactive with Li compared with other solvents. Li metal showed excellent stability in pure C$_6$F$_{13}$I: after soaking in pure C$_6$F$_{13}$I for three days, negligible change was observed for the Li foil, indicating the formation of a relatively stable passivating solid electrolyte interphase (SEI) on the Li surface. Pre-stabilized Li was prepared by soaking Li foil in C$_6$F$_{13}$I for three days. Subsequently, the pre-stabilized Li and pristine Li (for comparison) were both soaked in 1 M C$_6$F$_{13}$I/DMSO electrolyte to examine the stability of the Li. After three days, the electrolyte with stabilized Li exhibited a slight color fade, but the solvent remained clear and the Li showed negligible change. In contrast, precipitates were formed in the electrolyte with pristine Li indicating the undergoing chemical reaction between Li and electrolyte. Therefore, it was concluded that the Li stabilized by C$_6$F$_{13}$I demonstrates improved Li stability in the C$_6$F$_{13}$I/DMSO electrolyte.

Figure 13A:
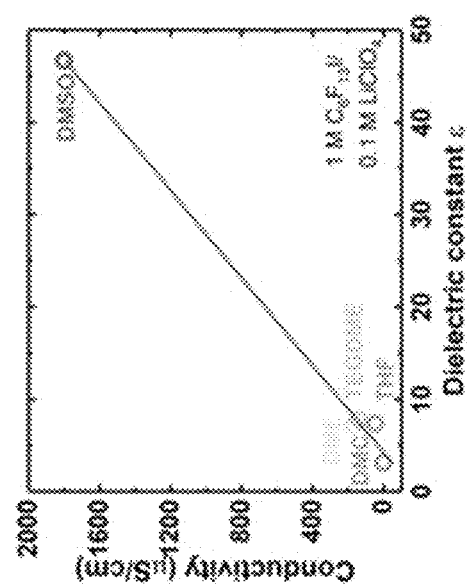
FIG. 13A shows, according to some embodiments, galvanostatic discharge profiles of Li—$C_6F_{13}$I cells with different co-solvents.
Figure 13B:
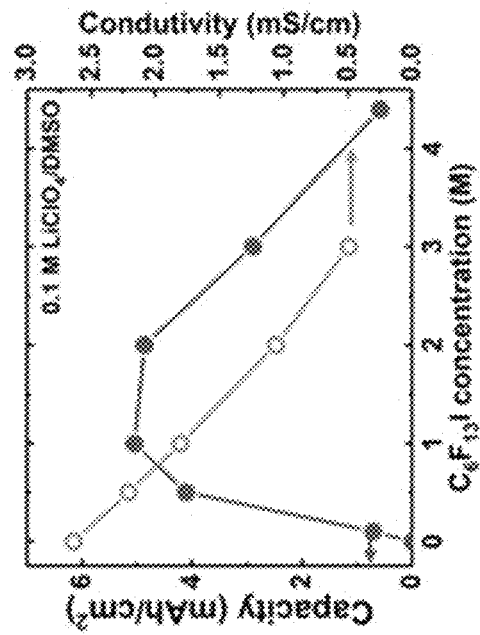
FIG. 13B shows, according to some embodiments, electrolyte conductivity as a function of the co-solvent dielectric constant.
Figure 13C:
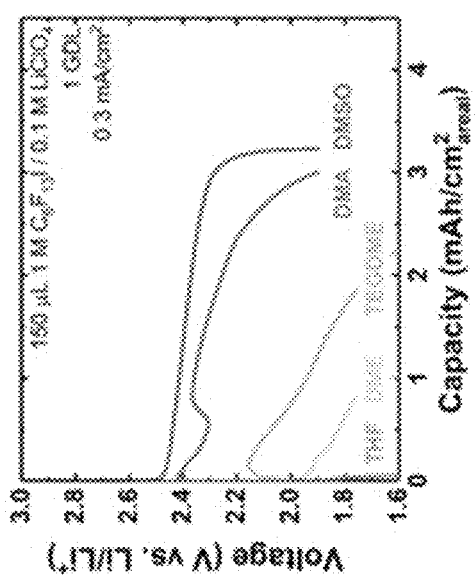
FIG. 13C shows, according to some embodiments, galvanostatic discharge profiles of Li—$C_6F_{13}$I cells with different $C_6F_{13}$I concentrations in DMSO electrolyte.
Figure 13D:
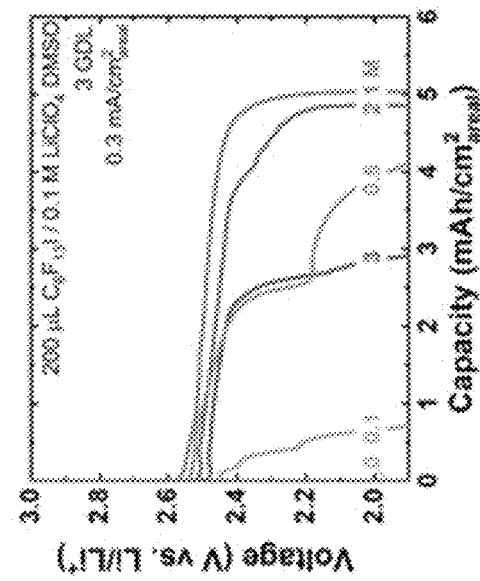
FIG. 13D shows, according to some embodiments, Li—$C_6F_{13}$I cell discharge capacities and electrolyte conductivities as a function of $C_6F_{13}$I concentration.

To optimize the electrolyte co-solvent, the electrochemical performances of Li—C$_6$F$_{13}$I batteries was investigated with the following different co-solvent species: DMSO, dimethylacetamide (DMA), tetraethylene glycol dimethyl ether (TEGDME), dimethyl ether (DME), and tetrahydrofuran (THF). As is shown in FIG. 13A, when discharged with 150 microliters of electrolyte with a C$_6$F$_{13}$I concentration of 1 M, the cell with DMSO exhibited the highest discharge capacity (3.2 mAh cm$^{-2}$). As a comparison, cells with DMA discharged at a ~60 mV lower potential but can deliver a similar capacity (~3.0 mAh cm$^{-2}$). Cells with glymes showed much lower capacities (2.2 mAh cm$^{-2}$ and 1.0 mAh cm$^{-2}$ for TEGDME and DME, respectively) and the discharge potentials were lower than 2.2 V. Additionally, cells with THF only showed limited (<0.1 mAh cm$^{-2}$) capacities. To explain the performance trends of the co-solvents, we considered the solvent dielectric constant ($\varepsilon$). From FIG. 13B, a strong correlation between $\varepsilon$ and total achievable capacity was observed (i.e., solvents with a higher $\varepsilon$ exhibited a higher discharge capacity). However, if the $\varepsilon$ of the solvent is too high, such as PC and EC ($\varepsilon$=64.9 and 89.8, respectively), the C$_6$F$_{13}$I is no longer miscible with the solvents, thus is not suitable to be used. Therefore, solvents with medium-high $\varepsilon$ will be more favorable when used as Li—C$_6$F$_{13}$I battery electrolyte co-solvent. In addition to the dielectric constant, we also screened solvent parameters such as Gutmann donor number (DN) and acceptor number (AN). Higher DN and AN are related to higher discharge capacities (such as DMSO and DMA), which could probably be attributed to the better Li$^+$ and F$^-$ solvation Optimal C$_6$F$_{13}$I concentrations were investigated in DMSO. The galvanostatic discharge profiles of Li—C$_6$F$_{13}$I batteries with C$_6$F$_{13}$I concentrations (in DMSO) ranging from 0.1 M to 3 M are shown in FIG. 13C. When the C$_6$F$_{13}$I concentration is 1 M or higher, one voltage plateau was observed from the discharge profile, which corresponds to the capacity calculated based on 1e$^-$ transfer per molecule. However, at lower concentrations (0.5 M and 0.1 M), the discharge profile showed two plateaus instead (with the first plateau capacity roughly equal to the capacity assuming 1-$^-$ transfer), indicating that at least two-electron transfers were achieved at lower concentrations. The achievable capacities of the Li—C$_6$F$_{13}$I cell as a function of reactant concentration is shown in FIG. 13D, from which it can be observed that the discharge capacity reached the maximum when the C$_6$F$_{13}$I concentration is 1 M. Further increasing the reactant concentration resulted in a decrease in capacity, which could be attributed to the decreased electrolyte conductivity at higher C$_6$F$_{13}$I concentrations. As is shown in FIG. 13D, the conductivity of the electrolyte decreased from 2.2 mS/cm to 0.5 mS/cm as the C$_6$F$_{13}$I concentration increased from 0.5 M to 3 M.

Figure 14A:
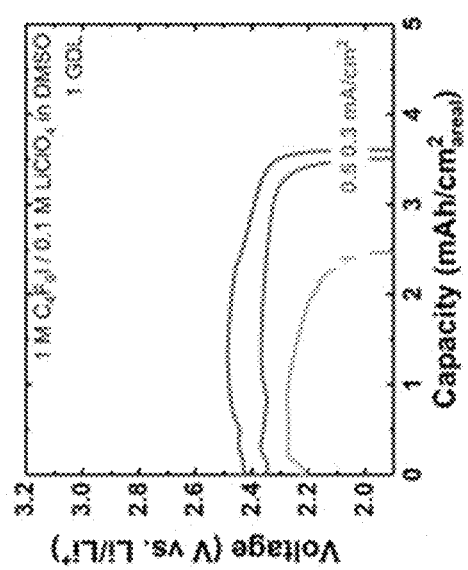
FIG. 14A shows, according to some embodiments, a galvanostatic discharge profile of Li—$C_6F_{13}$I.
Figure 14B:
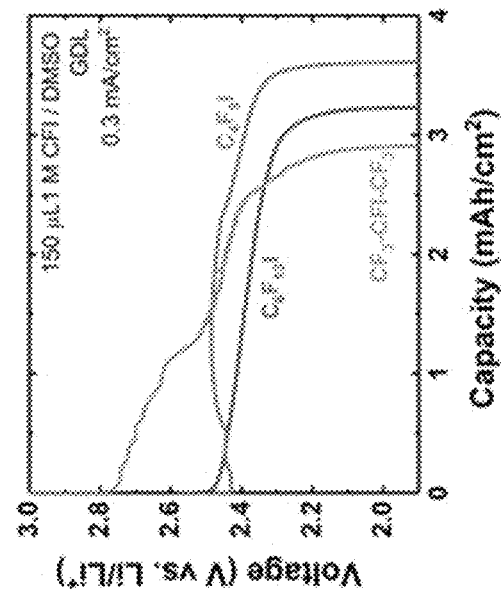
FIG. 14B shows, according to some embodiments, a galvanostatic discharge profile of Li—$C_4F_9$I.
Figure 14C:
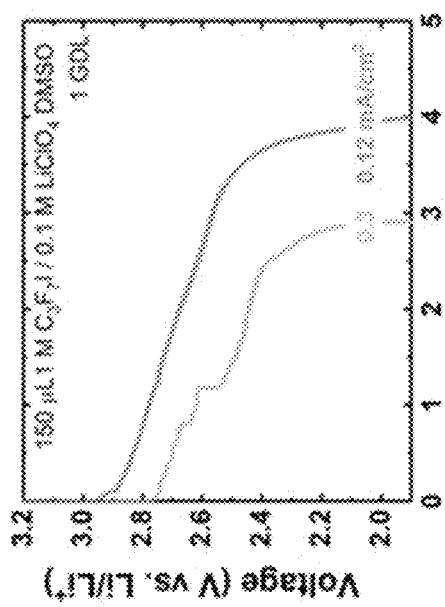
FIG. 14C shows, according to some embodiments, a galvanostatic discharge profile of Li—$C_3F_7$I.
Figure 14D:
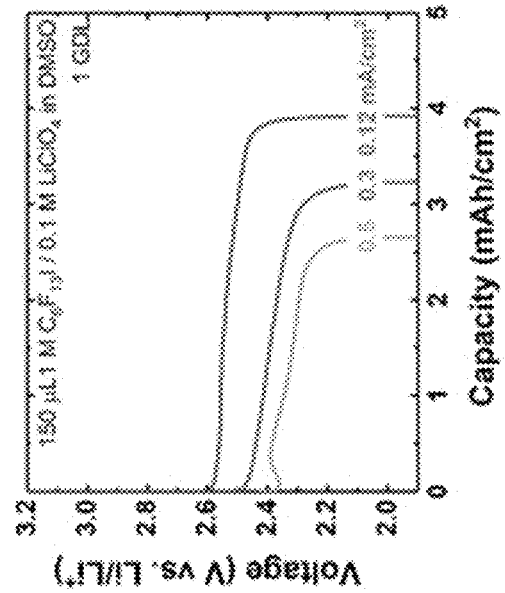
FIG. 14D shows, according to some embodiments, galvanostatic discharge profiles of Li—$C_6F_{13}$I, Li—$C_4F_9$I, and Li—$C_3F_7$I.

The fluorinated liquids C$_6$F$_{13}$I, C$_4$F$_9$I, and C$_3$F$_7$I (CFIs) were used to generate Li—CFI batteries, which were tested using 1 M CFI/DMSO as electrolyte and pre-stabilized Li as anode. As shown in FIGS. 14A-14C, when using gas diffusion layer (GDL) as cathode, discharge capacities of close to or higher than 3 mAh/cm$^2$ were achieved for all three Li—CFI cells at a relatively high current density (0.3 mA/cm$^2$). At a lower current density of 0.12 mA/cm$^2$, discharge capacities of 4 mAh/cm$^2$ were delivered for $C_3F_7I$ and $C_6F_{13}I$. As for the high rate regime, a capacity of higher than 2.5 mAh/cm$^2$ was obtained even when the current density was increased to as high as 0.5 mA/cm$^2$ (for $C_6F_{13}I$) or 1 mA/cm$^2$ (for $C_4F_9I$). Although the three CFIs showed similar areal discharge capacity, however, the gravimetric capacities (normalized to the weight of the CFI, which is the entity kept constant in total amount among the different systems) increased when the carbon chain length is decreased (i.e., $C_3F_7I$ exhibited the largest gravimetric capacity ~102 mAh/g$_{CFI}$). The discharge voltage also showed dependence on the carbon chain length: CFI that contains less carbon tends to have a higher discharge potential, for example, the average discharge voltage (at 0.3 mA/cm$^2$) for $C_6F_{13}I$, $C_4F_9I$, and $C_3F_7I$ is 2.38, 2.44, and 2.52 V, respectively (FIG. 14D).

Figure 15B:
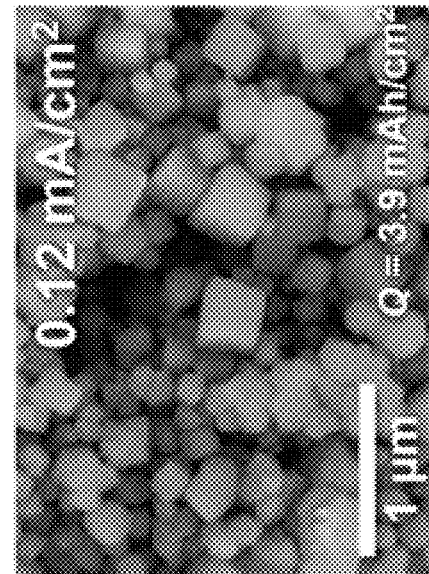
FIG. 15B shows, according to some embodiments, an SEM image of the Li—$C_6F_{13}$I cell fully discharged at 0.12 mA/cm$^2$.
Figure 15D:
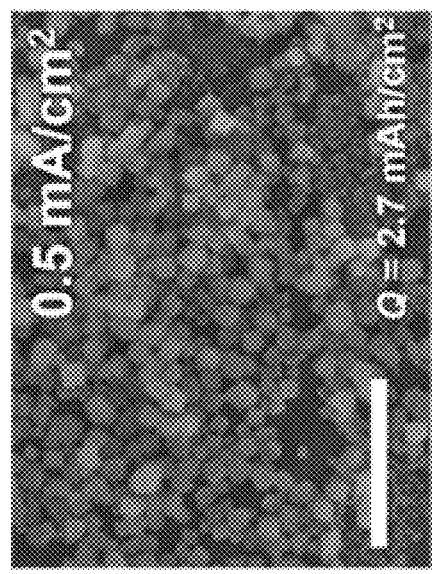
FIG. 15D shows, according to some embodiments, an SEM image of the Li—$C_6F_{13}$I cell fully discharged at 0.5 mA/cm$^2$.
Figure 15A:
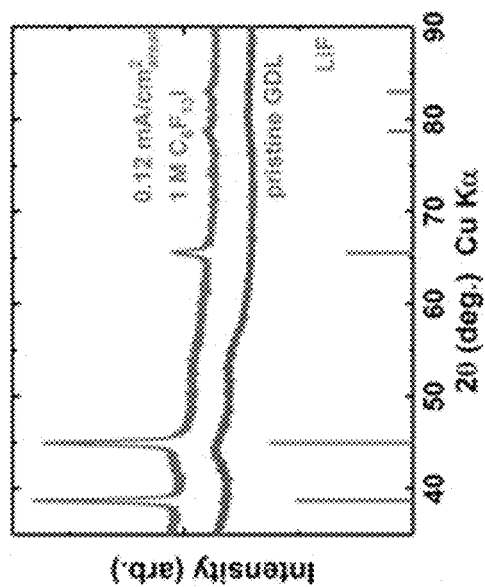
FIG. 15A shows, according to some embodiments, XRD data of the pristine and discharged Li—$C_6F_{13}$I cell.
Figure 15C:
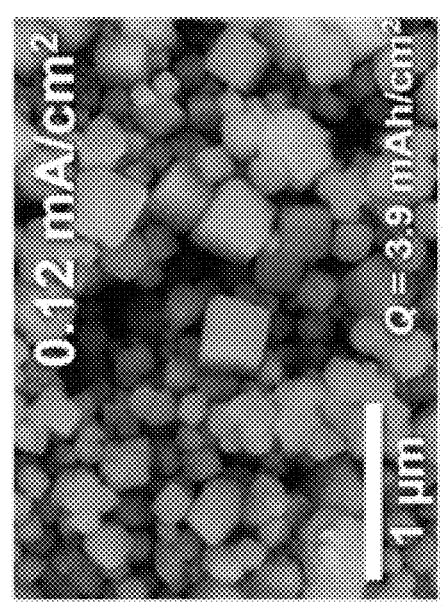
FIG. 15C shows, according to some embodiments, an SEM image of the Li—$C_6F_{13}$I cell fully discharged at 0.3 mA/cm$^2$.

To understand the origin of the outstanding rate capability of the Li—CFI cells, scanning electron microscopy (SEM) and X-ray diffraction (XRD) was used to characterize the morphology and crystallinity of the discharge products (using Li—$C_6F_{13}I$ cell as an example). As is shown in FIG. 15A, the crystallized phase that was detected from XRD is LiF. Notably, the morphology of the LiF formed on cathode in Li—$C_6F_{13}I$ cell is significantly different from that formed in Li—$SF_6$ cell (where LiF is also the only detectable in the crystallized phase): A two-dimensional flat LiF coating as was observed for Li—$SF_6$ cells, while a three-dimensional (3D) cubic LiF coating was formed on the surface of the carbon electrode in Li—$C_6F_{13}I$ cells (FIGS. 15B-15D). Similar 3D morphology was only observed in Li—$SF_6$ cell when the fluoride binding reagent was added into the electrolyte to increase the LiF solubility, indicating that the growth of LiF in Li—CFI cells might be a solution mediated process, which can contribute to the good rate performance. In addition, the particle size of the LiF formed was closely related to the discharge current density. The size of the LiF particles was decreased from 177+/−55 nm to 72+/−29 nm, as the discharge rate increased from 0.12 to 0.5 mA/cm$^2$.

Figure 16B:
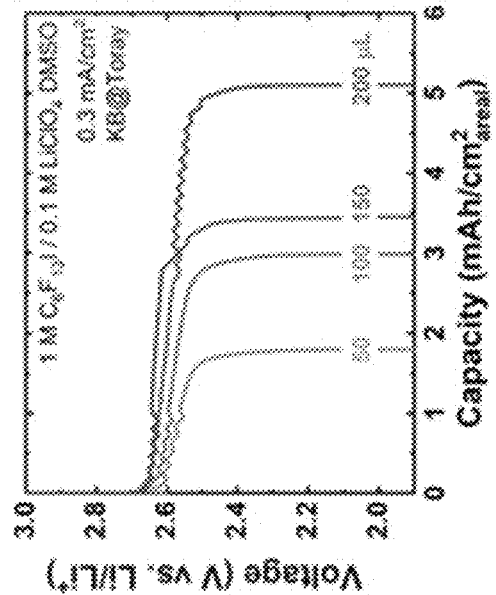
FIG. 16B shows, according to some embodiments, galvanostatic discharge profiles of Li—$C_6F_{13}$I cells with different electrolyte volumes.
Figure 16A:
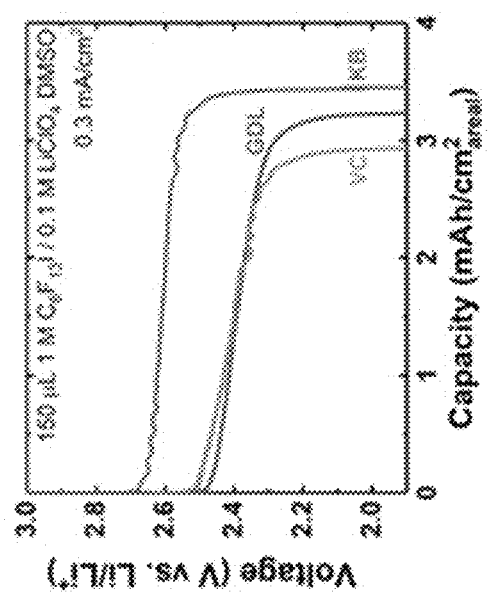
FIG. 16A shows, according to some embodiments, galvanostatic discharge profiles of Li—$C_6F_{13}$I cells with different carbon electrodes.
Figure 16C:
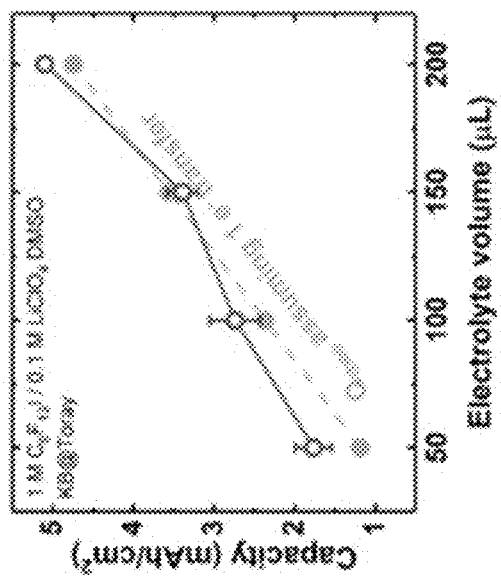
FIG. 16C shows, according to some embodiments, the discharge capacities as a function of the electrolyte volume for cells in FIG. 16B.

Three different carbon cathodes were tested: GDL, Vulcan carbon (VC), and Ketjen black (KB), the specific area of which are 1, 100 and 1400 m$^2$/g, respectively. As is shown in FIG. 16A, when discharged with high surface area electrodes, the average voltage of the Li—$C_6F_{13}I$ cell tends to increase. For example, the discharge voltage with KB electrodes is ~0.2 V higher than that with GDL. Interestingly, the discharge capacity normalized to the geometric area of the electrodes remained similar with different carbon cathodes (3-3.5 mAh/cm$^2$ for all three cells), indicating that, except for the electrode surfaces, the capacity might also be limited by the reactants available. To test this hypothesis, the electrolyte volume utilized in the cell was changed from 50 to 200 microliters with the carbon cathode kept the same (KB). The discharge profile is shown in FIG. 16B, and the comparison between the attained capacity and the theoretical capacity (calculated assuming one-electron transfer per $C_6F_{13}I$ molecule) is shown in FIG. 16C. It was observed that the discharge capacities generally proportionate to the electrolyte volume (i.e., total amount of $C_6F_{13}I$) and are similar to the theoretical capacities obtained from cell reactions with one-electron transfer (per $C_6F_{13}I$). Therefore, it is reasonable to conclude that one contribution for the cell termination is the consumption of the $C_6F_{13}I$ reactants, and that at the investigated discharge condition, $C_6F_{13}I$ can only be partially reduced through a one-electron transfer process.

Figure 17B:
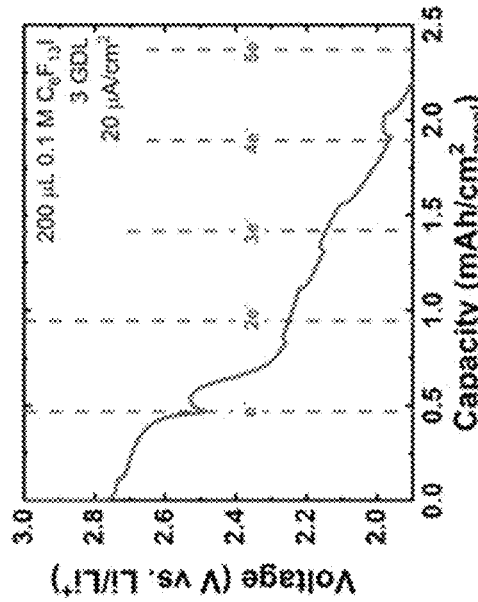
FIG. 17B shows, according to some embodiments, galvanostatic discharge profiles of a Li—$C_6F_{13}$I cell with three pieces of GDL stacked together.

Multi-electron transfer are important in achieving high energy densities, therefore strategies to get access to the second and more electron transfers were investigated. The kinetic effect in the current system was first evaluated by discharging the cell at a close-to-equilibrium current density (20 μA/cm$^2$). An additional voltage plateau showed up at ~2.5 V, the capacity of which corresponds to a ~1 electron transfer (FIG. 17A), indicating that the second electron transfer is indeed accessible, but a high kinetic overpotential is required at high current densities, causing the voltage to drop directly to the cutoff. The thermodynamic limits of the $C_6F_{13}I$ discharge was then investigated. As shown in FIG. 17B, with a $C_6F_{13}I$ concentration lowered to 0.1 M, and a low discharge rate of 20 μA/cm$^2$, the discharge profile exhibits three plateaus: the first two plateaus each correspond to a capacity of one-electron transfer, and the third plateau with a capacity of 2-3 electron transfer, making a total capacity a bit higher than the theoretical capacity assuming 4e$^-$ transfer per $C_6F_{13}I$ molecule. The ability to achieve >2e$^-$ transfer at low concentrations can be attributed to the less overpotential induced by electrode passivation. At a concentration of 0.1 M, though 200 microliters of electrolyte were used (compared with 50 microliters for the 1 M case), the total $C_6F_{13}I$ amount is still 60% less, therefore less amount of passivating LiF was formed after two e$^-$ transfer. In addition, more DMSO solvent is available for LiF solvation, thus decreasing the degree of oversaturation during LiF nucleation and growth, which would favor the formation of larger LiF particles. The effect of DMSO amount on the LiF morphology may also explain our early observation that two-electron transfer was observed at a high current density (~0.3 mA/cm$^2$) for low CFI concentrations (e.g., 0.5 M). Therefore, large overpotential could cause the voltage to drop quickly to the cutoff before activating the multi-electron transfer reactions.

Figure 17D:
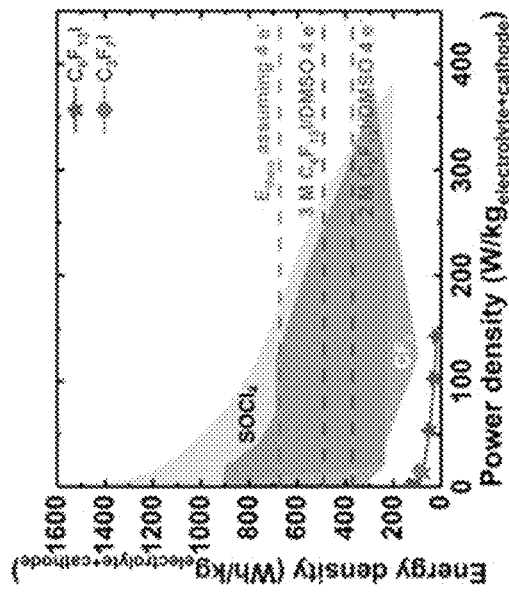
FIG. 17D shows, according to some embodiments, a Ragone plot comparing the Li—CFI cell performance with Li—$CF_x$ and Li—$SOCl_2$ batteries.
Figure 17A:
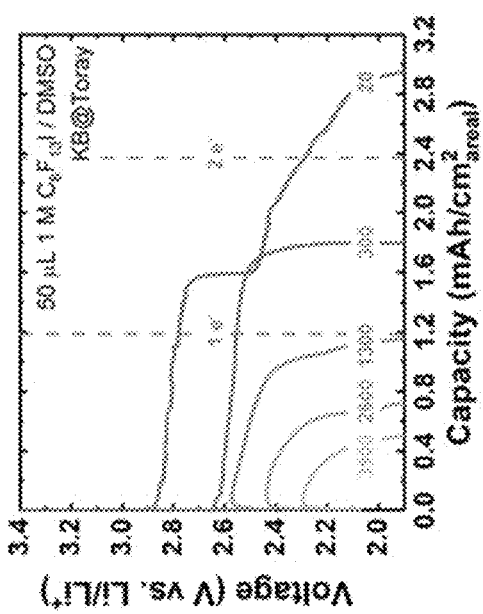
FIG. 17A shows, according to some embodiments, full rate capability of Li—$C_6F_{13}$I cells at different discharge rates.
Figure 17C:
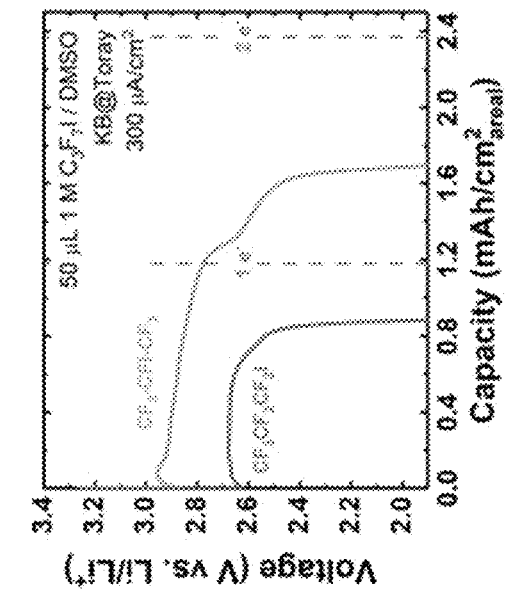
FIG. 17C shows, according to some embodiments, galvanostatic discharge profiles of Li—$C_3F_7$I mad with two different $C_3F_7$I isomers.

An additional factor that can affect the kinetics is the molecular structure of the CFI. For example, the binding environment of the iodine atom is found to significantly influence the cell discharge voltage. As shown in FIG. 17C, the two $C_3F_7I$ isomers exhibit different discharge behavior: the one with iodine connected to the middle carbon can deliver a ~0.2 V higher discharge potential and an almost 2× higher capacity than the one with iodine connected to the carbon at the end. In FIG. 17D, the performance of Li—CFI batteries is compared with the Li—$CF_x$ and Li—$SOCl_2$ batteries (shaded region). To make a fair comparison, the energy densities and power densities of the cells are all normalized to the weight of the cathode and electrolyte. The dashed lines indicate the potential Li—CFI cell performance if higher CFI concentration and 4e$^-$ transfer reaction can be achieved. This demonstrates that the Li—CFI batteries can be a strong competitor to the current commercialized Li primary batteries on the performance metrics, not to mention additional safety advantages.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A sealed electrochemical cell, comprising:
   a first electrode comprising an alkali metal;
   a second electrode comprising a halogenation layer; and
   a halogenated compound, wherein the halogenation layer comprises a reaction product between the alkali metal that has been oxidized and the halogenated compound that has been reduced, and wherein at least a portion of the halogenation layer is amorphous.

2. The sealed electrochemical cell of claim 1, wherein the sealed electrochemical cell is a primary battery.

3. The sealed electrochemical cell of claim 1, wherein the second electrode comprises carbon, a metal, a metal oxide, a metal sulfide, and/or a metal fluoride.

4. The sealed electrochemical cell of claim 3, wherein the second electrode comprises MnO and/or NiO.

5. The sealed electrochemical cell of claim 3, wherein the second electrode comprises graphite, graphene, a carbon gas diffusion layer, and/or carbon powder.

6. The sealed electrochemical cell of claim 3, wherein the second electrode comprises Bi, Fe, and/or Co.

7. The sealed electrochemical cell of claim 3, wherein the second electrode comprises $FeF_2$ and/or $CoF_2$.

8. The sealed electrochemical cell of claim 1, wherein the halogenated compound is a fluorinated gas.

9. The sealed electrochemical cell of claim 8, wherein the fluorinated gas is $SF_6$ and/or $NF_3$.

10. The sealed electrochemical cell of claim 1, wherein the halogenated compound is a fluorinated liquid.

11. The sealed electrochemical cell of claim 10, wherein the fluorinated liquid is $C_6F_{13}I$, $C_4F_9I$, $C_3F_7I$, and/or $C_6H_5SF_5$.

12. The sealed electrochemical cell of claim 1, wherein the alkali metal is Li.

13. The sealed electrochemical cell of claim 1, wherein the halogenation layer comprises an alkali metal salt.

14. The sealed electrochemical cell of claim 13, wherein the alkali metal salt is an alkali metal fluoride.

15. The sealed electrochemical cell of claim 14, wherein the alkali metal fluoride is LiF.

16. The sealed electrochemical cell of claim 1, wherein the sealed electrochemical cell further comprises an electrolyte.

17. The sealed electrochemical cell of claim 16, wherein the electrolyte comprises a halogen-binding agent.

18. The sealed electrochemical cell of claim 17, wherein the halogen-binding agent is tris(pentafluorophenyl) borane, tri(hexafluoroisopropyl)borate, tripropyl borate, and/or 2-(pentafluorophenyl)tetrafluoro-1,3,benzodioxaborole.

19. The sealed electrochemical cell of claim 17, wherein the halogenation layer is porous.

20. The sealed electrochemical cell of claim 16, wherein the electrolyte comprises a fluorinated liquid.

21. The sealed electrochemical cell of claim 1, wherein the halogenation layer has a thickness of less than or equal to 1 micrometer.

22. The sealed electrochemical cell of claim 1, wherein the halogenation layer comprises a plurality of particles having an average particle size of greater than or equal to 10 nm and less than or equal to 500 nm.

23. The sealed electrochemical cell of claim 1, wherein at least a portion of the halogenation layer is crystalline.

24. A sealed electrochemical cell, comprising:
a first electrode comprising an alkali metal;
a second electrode comprising a halogenation layer and/or a plurality of halogen ions incorporated on and/or in the second electrode; and
a halogenated compound, wherein the halogenation layer comprises a reaction product between the alkali metal that has been oxidized and the halogenated compound that has been reduced, and wherein at least a portion of the halogenation layer is amorphous.

25. The sealed electrochemical cell of claim 24, wherein at least a portion of the halogenation layer is crystalline.

* * * * *